(12) United States Patent
Moon et al.

(10) Patent No.: US 12,393,276 B2
(45) Date of Patent: Aug. 19, 2025

(54) VIBRATION APPARATUS, DISPLAY APPARATUS INCLUDING THE SAME, AND VEHICULAR APPARATUS INCLUDING THE DISPLAY APPARATUS

(71) Applicant: LG Display Co., Ltd., Seoul (KR)

(72) Inventors: Saseong Moon, Paju-si (KR); SunBok Song, Paju-si (KR); MinHo Sohn, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/422,609

(22) Filed: Jan. 25, 2024

(65) Prior Publication Data

US 2024/0256045 A1  Aug. 1, 2024

(30) Foreign Application Priority Data

Jan. 30, 2023  (KR) .................. 10-2023-0012117

(51) Int. Cl.
*G06F 3/01* (2006.01)
*G06F 3/041* (2006.01)
*G06F 3/14* (2006.01)

(52) U.S. Cl.
CPC .............. *G06F 3/016* (2013.01); *G06F 3/041* (2013.01); *G06F 3/1423* (2013.01)

(58) Field of Classification Search
CPC .................................. G06F 3/016; G06F 3/041
USPC ......................................................... 345/173
See application file for complete search history.

(56) References Cited

U.S. PATENT DOCUMENTS

| | | | |
|---|---|---|---|
| 2019/0047418 A1* | 2/2019 | Yoshimura | G02B 27/0149 |
| 2021/0076135 A1* | 3/2021 | Choi | H04R 1/403 |
| 2021/0109396 A1* | 4/2021 | Lee | G02B 5/3083 |
| 2023/0244220 A1* | 8/2023 | Matsumoto | G05B 19/42 700/264 |

OTHER PUBLICATIONS

Yoo, "Design of Ultrasonic Welding Horn", Journal of KWJS, vol. 26, No. 1, Feb. 2008, 3 pages.

* cited by examiner

*Primary Examiner* — Calvin C Ma
(74) *Attorney, Agent, or Firm* — Morgan, Lewis & Bockius LLP

(57) ABSTRACT

A vibration apparatus includes a vibration generating part and a press structure configured at a rear surface of the vibration generating part and configured to apply pressure to the vibration generating part. A display apparatus and a vehicular apparatus having the vibration apparatus are provided. The vibration apparatus may provide an ultrasonic vibration or an ultrasonic haptic to a user when a user touch is applied thereto.

43 Claims, 15 Drawing Sheets

511a(511)

▨ : 511a3
☐ : 511a4

ITM: DIS2, DIS3, DIS4, DIS5

VIBRATION APPARATUS, DISPLAY APPARATUS INCLUDING THE SAME, AND VEHICULAR APPARATUS INCLUDING THE DISPLAY APPARATUS

CROSS-REFERENCE TO RELATED APPLICATIONS

This application claims the benefit of and priority to Korean Patent Application No. 10-2023-0012117 filed on Jan. 30, 2023, the entirety of which is incorporated herein by reference for all purposes as if fully set forth herein.

BACKGROUND

Technical Field

The present disclosure relates to a vibration apparatus, a display apparatus including the same, and a vehicular apparatus including the vibration apparatus.

Discussion of the Related Art

As information-oriented society advances, the needs for display apparatuses for displaying an image are variously increasing.

Electronic devices using a display apparatus as a display screen provide a user interface of a touch screen type, for convenience of a user input. Display apparatuses capable of touch interface processing are advancing to provide more various functions.

Display apparatuses including a touch panel or display apparatuses with touch screen integrated therein, which are capable of touch sensing based on a touch pen (or a stylus pen) as well as finger touch sensing based on a finger or an object other than the finger, are being widely used.

Recently, haptic technology, which provides a haptic feedback to a user when the user touches a screen of a display apparatus, is being developed. Display apparatuses to which the haptic technology is applied generate an attractive force for stimulating a tangoreceptor of a human body, and stimulate a tactile sense of a user by using the attractive force, thereby enabling the user to recognize a touch and a texture of the touch.

SUMMARY

The inventors of the present disclosure have recognized the problems and disadvantages of the related art and have performed extensive research and experiments for implementing a vibration apparatus and an apparatus including the same, which may provide an ultrasonic vibration or an ultrasonic haptic to a user when a user touch is applied thereto. Based on the extensive research and experiments, the inventors of the present disclosure have invented a new vibration apparatus, a display apparatus including the same, and a vehicular apparatus including the vibration apparatus, which may provide an ultrasonic vibration or an ultrasonic haptic to a user.

Accordingly, embodiments of the present disclosure are directed to a vibration apparatus, a display apparatus, and a vehicular apparatus including the display apparatus that substantially obviate one or more of the problems due to limitations and disadvantages of the related art.

One or more aspects of the present disclosure are directed to providing a vibration apparatus, a display apparatus including the same, and a vehicular apparatus including the vibration apparatus, which may increase an intensity of an ultrasonic generated based on a vibration of a display member.

One or more aspects of the present disclosure are directed to providing a vibration apparatus, a display apparatus including the same, and a vehicular apparatus including the display apparatus, which may generate an out-plane vibration mode.

One or more aspects of the present disclosure is directed to providing a vibration apparatus, a display apparatus including the same, and a vehicular apparatus including the vibration apparatus, which may vibrate a display member in an out-plane vibration mode to provide an ultrasonic vibration or an ultrasonic haptic to a user.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a vibration apparatus may comprise a vibration generating part, and a press structure configured at a rear surface of the vibration generating part and configured to apply pressure to the vibration generating part.

In another aspect, a display apparatus may comprise a display member configured to display an image, and one or more vibration generating apparatuses configured to vibrate the display member. The one or more vibration generating apparatuses may comprise a vibration generating part, and a press structure configured at a rear surface of the vibration generating part and configured to apply pressure to the vibration generating part.

In another aspect, a vehicular apparatus may comprise an instrument panel module in a dashboard, the instrument panel module including a first display, a driver seat, a passenger seat, and an infotainment module in one or more of the dashboard, the driver seat, and the passenger seat, the infotainment module including one or more second displays. The one or more of the first display and the one or more second displays may comprise a display member configured to display an image, and one or more vibration generating apparatuses configured to vibrate the display member. The one or more vibration generating apparatuses may comprise a vibration generating part, and a press structure configured at a rear surface of the vibration generating part and configured to apply pressure to the vibration generating part.

In a vibration apparatus according to one or more aspects of the present disclosure, a mechanical quality factor of a vibration generating portion may increase to increase the amount of displacement or a displacement width, and thus, an intensity of an ultrasonic generated based on a vibration of a display member may increase.

A vibration apparatus according to one or more aspects of the present disclosure may generate an out-plane vibration mode.

An apparatus and a vehicular apparatus each including a vibration apparatus according to one or more aspects of the present disclosure may vibrate a display member in an out-plane vibration mode of the vibration apparatus to provide an ultrasonic vibration or an ultrasonic haptic to a user.

According to one or more aspects of the present disclosure, a connection process (or attachment process) and connection quality (or attachment performance) between a display member and a vibration apparatus may be improved.

According to one or more aspects of the present disclosure, as a signal supply member and a vibration apparatus are provided as one body, the signal supply member and the vibration apparatus may be configured as one part (or one component), and thus, an effect of uni-materialization may be obtained.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate aspects and aspects of the disclosure and together with the description serve to explain principles of the disclosure.

Figure 1:
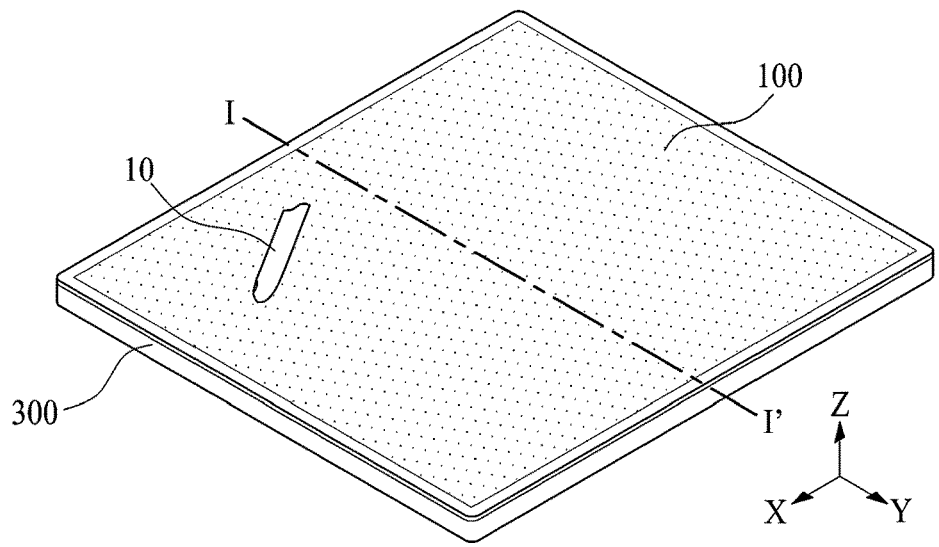
FIG. 1 is a perspective view illustrating a display apparatus according to an aspect of the present disclosure.

Throughout the drawings and the detailed description, unless otherwise described, the same drawing reference numerals should be understood to refer to the same elements, features, or structures. The sizes, lengths, and thicknesses of layers, regions and elements, and depiction thereof may be exaggerated for clarity, illustration, and/or convenience.

DETAILED DESCRIPTION

Reference is now made in detail to aspects of the present disclosure, examples of which may be illustrated in the accompanying drawings. In the following description, when a detailed description of well-known functions, structures or configurations may unnecessarily obscure aspects of the present disclosure, a detailed description of such known functions or configurations may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure may be thorough and complete to assist those skilled in the art to understand the inventive concepts without limiting the protected scope of the present disclosure.

Shapes (e.g., sizes, lengths, widths, heights, thicknesses, locations, radii, diameters, and areas), dimensions, ratios, angles, numbers, and the like disclosed herein, including those illustrated in the drawings aspect, are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

Where a term like "comprise," "have," "include," "contain," "constitute," "made of," "formed of" or the like is used with respect to one or more elements, one or more other elements may be added unless a term such as "only" or the like is used. The terms used in the present disclosure are merely used aspect in order to describe example aspects, and are not intended to limit the scope of the present disclosure. The terms of a singular form may include plural forms unless the context clearly indicates otherwise.

The word "exemplary" is used to mean serving as an example or illustration, unless otherwise specified. Aspects are example aspects. Aspects are example aspects. "Aspects," "examples," "aspects," and the like should not be construed as preferred or advantageous over other implementations. An aspect, an example, an example aspect, an aspect, or the like may refer to one or more aspects, one or more examples, one or more example aspects, one or more aspects, or the like, unless stated otherwise. Further, the term "may" encompasses all the meanings of the term "can."

In one or more aspects, unless explicitly stated otherwise, element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts may be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first," "second," or the like may be used herein to describe various elements (e.g., layers, films, regions, components, sections, or the like), these elements should not be limited by these terms, for example, to any particular order, precedence, or number of elements. These terms are used only to distinguish one element from another. For example, a first element could be termed a second element, and, similarly, a second element could be termed a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element or layer, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms may mean a wider range of lines or directions within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, a third item" may represent (i) a combination of items provided by two or more of the first item, the second item, and the third item or (ii) only one of the first item, the second item, or the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); or some combination of A, B, and C (e.g., A and B; A and C; or B and C); and all of A, B, and C. Furthermore, an expression "A/B" may be understood as A and/or B. For example, an expression "A/B" can refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as different from one another. In another example, an expression "different from one another" may be understood as different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various aspects of the present disclosure may be partially or entirely coupled to or combined with each other, may be technically associated with each other, and may be operated, linked, or driven together in various ways. Aspects of the present disclosure may be implemented or carried out independently of each other, or may be implemented or carried out together in a co-dependent or related relationship. In one or more aspects, the components of each apparatus according to various aspects of the present disclosure may be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example aspects.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

X-axis direction", "Y-axis direction" and "Z-axis direction" should not be construed by a geometric relation only of a mutual vertical relation and may have broader directionality within the range that elements of the present disclosure may act functionally.

In the present disclosure, "a display apparatus" may include a display apparatus such as display modules (or display members) including a display panel and a driver for driving the display panel. Moreover, the display modules may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including display modules such as a liquid crystal display module and a light emitting display module (for example, an organic light emitting display module) or the like.

Therefore, in the present disclosure, examples of the apparatus may include a display apparatus itself, such as a liquid crystal display module or an organic light emitting display module, a quantum dot display module, an electrophoretic display module, a micro light emitting diode display module, an electrophoretic display module, or the like, and a set device which is a final consumer device or an application product including the liquid crystal display module or the organic light emitting display module, the quantum dot display module, the electrophoretic display module, the micro light emitting diode display module, the electrophoretic display module, or the like, but embodiments of the present disclosure are not limited thereto. Examples of the apparatus may include a display apparatus itself, such as a flexible liquid crystal display module, a flexible organic light emitting display module, a flexible quantum dot display module, a flexible electrophoretic display module, a flexible micro light emitting diode display module, a flexible electrophoretic display module, or the like.

A display panel applied to one or more aspects of the present disclosure may use any types of display panels such as a liquid crystal display panel, an organic light emitting display panel, a quantum dot display panel, an electrophoretic display panel, an electrophoretic display panel and a micro light emitting diode display panel, or the like, but aspects of the present disclosure are not limited. For example, the display panel may be a display panel capable of generating a sound by being vibrated by a vibration apparatus according to an aspect of the present disclosure. A display panel applied to a display apparatus according to an aspect of the present disclosure is not limited a shape or a size of the display panel.

According to one or more aspects of the present disclosure, when the display panel is the liquid crystal display panel, the liquid crystal display panel may include a plurality of gate lines, a plurality of data lines, and a plurality of pixels respectively provided in the intersection area of the gate lines and the data lines. Moreover, the liquid crystal display panel may be configured to include a first substrate including a thin film transistor (TFT) which is a switching element for adjusting a light transmittance of each of the plurality of pixels, a second substrate including a color filter and/or a black matrix or the like, and a liquid crystal layer between the first substrate and the second substrate, without being limited thereto.

According to another aspect of the present disclosure, when the display panel is the organic light emitting display panel, the organic light emitting display panel may include a plurality of gate lines, a plurality of data lines, and a plurality of pixels respectively provided in the intersection area of the gate lines and the data lines. Moreover, the organic light emitting display panel may include a substrate including a TFT which is an element for selectively applying a voltage to each of the plurality of pixels, an organic light emitting device layer on the substrate, and an encapsulation layer (or an encapsulation substrate) disposed at the substrate to cover the organic light emitting device layer, or the like. The encapsulation substrate may protect the TFT and the organic light emitting device layer or the like from an external impact and may reduce or prevent water or oxygen from penetrating into the organic light emitting device layer. Furthermore, the organic light emitting device layer may further include an inorganic light emitting layer (for example, a nano-sized material layer) and/or a quantum dot light emitting layer, or the like. As another aspect of the present disclosure, the organic light emitting device layer may be changed to a micro light emitting diode.

In the present disclosure, a display apparatus including a vibration apparatus may be applied to vehicles. A display apparatus including a vibration apparatus may be applied to vehicles by being implemented as a user interface apparatus, such as a central control panel or the like a sound apparatus, or a display apparatus in automobiles, without being limited thereto. For example, the user interface apparatus for vehicles may be configured between two front seats so that a sound generated based on a vibration of the display module may be transmitted to interior of a vehicle. Therefore, an audio experience within a vehicle may be improved in comparison with a case where speakers are disposed at interior sides of the vehicle. Aspects are not limited thereto. As an example, display apparatus including a vibration apparatus may be configured at any position in the vehicle, such as, in front of any of the front seats or the backseats, at the doors, at the car roof, or the like.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings.

Figure 2:
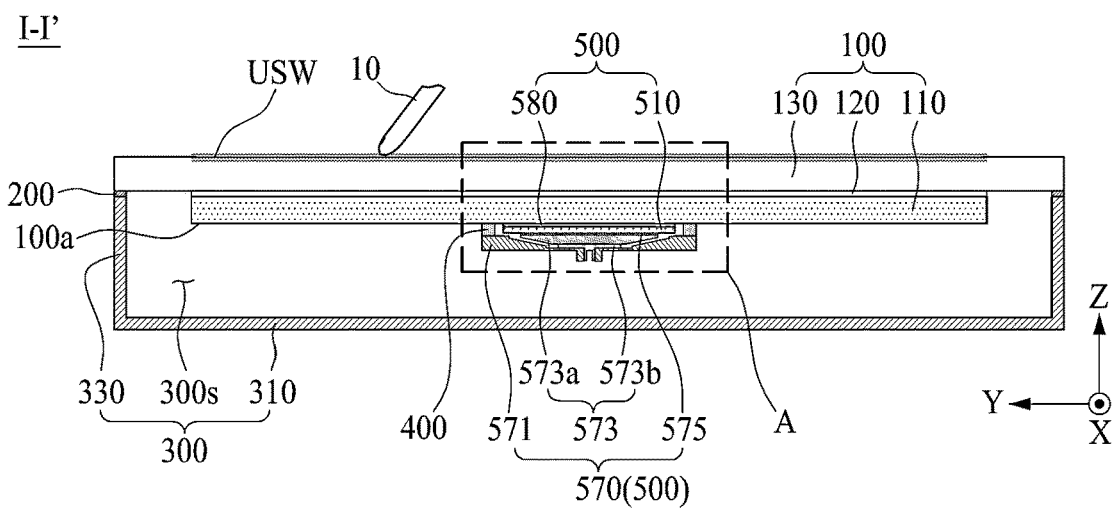
FIG. 2 is a cross-sectional view of a display apparatus taken along line I-I' illustrated in FIG. 1 according to an aspect of the present disclosure.

FIG. 1 is a perspective view illustrating a display apparatus according to an aspect of the present disclosure. FIG. 2 is a cross-sectional view of a display apparatus taken along line I-I' illustrated in FIG. 1 according to an aspect of the present disclosure.

With reference to FIGS. 1 and 2, a display apparatus according to an aspect (or a first aspect) of the present disclosure may be configured to sense one or more of a finger touch based on a finger 10 or an object other than a finger and a touch based on a touch pen (or a stylus pen). For example, the display apparatus according to an aspect of the present disclosure may be a display apparatus added a touch panel or a display apparatus with touch screen integrated therein. For example, the display apparatus according to an aspect of the present disclosure may be used as a display apparatus for mobile electronic devices such as mobile phones, smartphones, smart watches, tablet personal computers (PCs), or watch phones, smart televisions, electronic whiteboards, bidirectional information transfer transparent displays, bidirectional digital signage, netbook computers, monitors, or refrigerators, or the like, but aspects of the present disclosure are not limited thereto.

The display apparatus according to an aspect of the present disclosure may include a display member 100 and a vibration apparatus 500.

The display member 100 may be configured to display an image. As an example, the display member 100 may be configured to display an image and output (or generate) an ultrasonic vibration or an ultrasonic haptic, based on a vibration of the vibration apparatus 500. For example, the display member 100 may be used as a vibration plate of the vibration apparatus 500. Aspects are not limited thereto. As an example, display apparatus may include a separate vibration plate other than the display member 100.

The display member 100 may include a display panel 110 and a touch panel 120, but aspects are not limited thereto.

The display panel 110 may be configured to display an image. For example, the display panel 110 may include a plurality of pixels configured to display an image. The image may include an electronic image, a digital image, a still image, or a video image or the like. For example, the display panel 110 may be an organic light emitting display panel including a plurality of pixels which implement a black/white or color image, but a type of the display panel is not limited thereto. For example, the display panel 110 may include a liquid crystal display panel, an electrophoresis display panel, a micro light emitting diode display panel, an electro-wetting display panel, or a quantum dot light emitting display panel or the like. Hereinafter, an example where the display panel 110 is an organic light emitting display panel will be described, but aspects of the present disclosure are not limited thereto.

The organic light emitting display panel may include a base substrate, a display part, and a plate member, without being limited thereto.

The base substrate may be configured as one or more of a glass material and a plastic material, without being limited thereto. As an example, the base substrate may be configured as one or more of an organic material, a metal material, and other inorganic materials. The display part may include a pixel array part having a plurality of pixels which is disposed respectively at a pixel area provided by a plurality of gate lines and/or a plurality of data lines. Each of the plurality of pixels may include an organic light emitting layer. The plate member may be configured to cover the display part. As an example, the plate member may be attached to the display part by an adhesive member, or may be deposited on the display part without an adhesive member, without being limited thereto. The plate member may protect the display part or the display panel from an external impact and may reduce or prevent external water or moisture from penetrating into the organic light emitting layer or the organic light emitting device layer.

The display panel 110 according to an aspect of the present disclosure may further include an encapsulation layer. The encapsulation layer may be configured between the display part and the adhesive member to directly surround the display part. The encapsulation layer may be configured to reduce or prevent external water or moisture from penetrating into the organic light emitting layer or the organic light emitting device layer. The encapsulation layer may be formed in an inorganic material layer or an organic material layer, or may be formed in a multilayer structure where an inorganic material layer and an organic material layer are alternately stacked, but aspects of the present disclosure are not limited thereto. For example, the encapsulation layer may be omitted based on a structure of the display panel 110.

The touch panel (or a touch screen) 120 may be configured to sense a user touch applied to the display member 100. For example, the touch panel 120 may be configured to sense a user touch based on a touch pen or a finger 10. The touch panel 120 may be connected to the display panel 110. For example, the display panel 110 may be an organic light emitting display panel with a touch screen integrated therein.

The touch panel 120 according to an aspect of the present disclosure may be configured to cover a front surface of the display panel 110. For example, the touch panel 120 may be disposed to cover a front surface of base substrate or a front surface of the plate member, without being limited thereto.

The touch panel 120 according to another aspect of the present disclosure may be configured between the display part of the display panel 110 and the plate member, but aspects of the present disclosure are not limited thereto. For example, the touch panel 120 may be disposed within the pixel array part of the display panel 110. In this case, the touch panel 120 may be an in-cell touch panel, a touch electrode layer, or a touch sensor layer, but aspects of the present disclosure are not limited thereto. The touch panel 120 may include an electrode structure corresponding to a mutual-capacitance type configured so that a plurality of touch driving electrodes and a plurality of touch sensing electrodes cross each other or a self-capacitance type configured with only a plurality of touch sensing electrodes, but aspects of the present disclosure are not limited thereto.

The display member 100 according to an aspect of the present disclosure may further include a front member 130 at the front surface of the display panel 110.

The front member 130 may configure a foremost structure of the display apparatus and may protect a screen of the display panel 110. The front member 130 may be disposed at the front surface of the display panel 110. For example, the front member 130 may cover the front surface (or the screen) of the display panel 110, and thus, may protect the display panel 110 and the touch panel 120 from an external impact. For example, the front member 130 may be disposed at a front surface of the touch panel 120. For example, the touch panel 120 may be disposed between the front member 130 and the display panel 110. For example, the touch panel 120 may be connected or attached to a rear surface of the front member 130, without being limited thereto.

The front member 130 according to an aspect of the present disclosure may include a transparent material. As an example, the front member 130 according to according to an exemplary aspect of the present disclosure may include a transparent plastic material, a glass material, or a reinforced glass material, but aspects of the present disclosure are not limited thereto. For example, the front member 130 may include a front structure, a front window, a cover window, a glass window, a cover screen, a screen cover, or a window glass or the like, but aspects of the present disclosure are not limited thereto.

The display apparatus according to an aspect of the present disclosure may further include a supporting member 300. The supporting member 300 may be configured or disposed at a rear surface 100a of the display member 100. The supporting member 300 may be configured to cover or surround the rear surface 100a of the display member 100. Aspects are not limited thereto. As an example, the supporting member 300 may be configured to expose a portion of the rear surface 100a of the display member 100.

The supporting member 300 may include an internal space 300s which covers the rear surface 100a of the display member 100. For example, the supporting member 300 may have a box shape. For example, the supporting member 300 may have a box shape where one side (or an upper side) of the internal space 300s is opened.

The supporting member 300 according to an aspect of the present disclosure may include a first supporting portion 310 and a second supporting portion 330.

The first supporting portion 310 may be at the rear surface 100a of the display member 100. For example, the first supporting part 310 may be configured to cover the rear surface 100a of the display member 100. For example, the first supporting portion 310 may be configured to cover the rear surface 100a of the display panel 110. The first supporting portion 310 may be spaced apart from the rear surface 100a of the display member 100 (or display panel 110). For example, the first supporting portion 310 may be spaced apart from the rear surface 100a of the display member 100 (or display panel 110) with an internal space 300S therebetween. For example, the first supporting part 310 may be a bottom portion, a bottom plate, a supporting plate, a housing plate, or a housing bottom portion, or the like, but aspects of the present disclosure are not limited thereto.

The second supporting portion 330 may be at a periphery portion of the display member 100. For example, the second supporting part 330 may be connected to a periphery portion of the first supporting part 310. For example, the second supporting part 330 may include a structure where the periphery portion of the first supporting part 310 is bent. For example, the second supporting part 330 may be a lateral portion, a sidewall, a supporting sidewall, a housing lateral surface, or a housing sidewall, or the like, but aspects of the present disclosure are not limited thereto.

The second supporting part 330 may be integrated into the first supporting part 310. For example, the first supporting part 310 and the second supporting part 330 may be integrated as one body, and thus, the internal space 300s surrounded by the second supporting part 330 may be provided on the first supporting part 310. Accordingly, the supporting member 300 may include a box shape where one side (or one portion or an upper side or an upper portion) is opened by the first supporting part 310 and the second supporting part 330.

The display apparatus according to an aspect of the present disclosure may further include a coupling member 200 between the display member 100 and the supporting member 300, but aspects of the present disclosure are not limited thereto.

The supporting member 300 may be coupled to or connected to the display member 100 by the coupling member 200. The supporting member 300 may be connected or coupled to the display member 100 by the coupling member 200. The supporting member 300 may be connected or coupled to a rear periphery portion of the display member 100 by the coupling member 200. For example, the supporting member 300 may be connected or coupled to a rear periphery portion of the front member 130 by the coupling member 200, but aspects of the present disclosure are not limited thereto. For example, the supporting member 300 may be connected or coupled to a rear periphery portion of the front member 130 by the coupling member 200 and may be configured to surround lateral surfaces of each of the touch panel 120 and the display panel 110. Aspects are not limited thereto. As an example, the supporting member 300 may be connected with or coupled to a rear edge portion of the display panel 110 by using the coupling member 200 and may surround a lateral surface of the vibration apparatus 500.

According to an aspect of the present disclosure, the front member 130 of the display member 100 may be omitted. In this case, the coupling member 200 may be configured between the display panel 110 and the supporting member 300. For example, when the front member 130 is omitted, the coupling member 200 may be disposed between a rear periphery portion of the display panel 110 and a front periphery portion of the first supporting part 310, but aspects of the present disclosure are not limited thereto.

The vibration apparatus 500 may be configured at the rear surface 100a of the display member 100. For example, the vibration apparatus 500 may be configured to vibrate the display member 100. For example, the vibration apparatus 500 may vibrate the display member 100 to generate (or output) an ultrasonic USW. The vibration apparatus 500 may vibrate based on a driving signal applied from a driving circuit part to vibrate the display member 100, and thus, may generate (or output) an ultrasonic vibration or an ultrasonic haptic. For example, the vibration apparatus 500 may vibrate the display member 100 to generate (or output) the ultrasonic vibration to a surface (or screen) of the display member 100. For example, when a user touches the surface (or screen) of the display member 100 with a finger 10 or a touch pen, or other objects, the vibration apparatus 500 may generate (or output) the ultrasonic USW so that the user recognizes the ultrasonic vibration or the ultrasonic haptic through the finger 10 or the touch pen, or other objects. For example, the finger 10 of the user or the touch pen may be a haptic object. In the following descriptions, a haptic object 10 may be the finger 10 by the user or the touch pen, without being limited thereto.

The ultrasonic USW which is generated (or output) based on a vibration of the display member 100 by a vibration of the vibration apparatus 500 may generate a squeeze film effect. The squeeze film effect may be referred to as surface ultrasonic lubrication, and the surface ultrasonic lubrication may change a friction coefficient (or a frictional force) between the haptic object 10 and the display member 100 through changing of a surface friction coefficient of the display member 100 to implement fine texture or roughness recognizable by the user. Accordingly, when there is a user touch, the vibration apparatus 500 may generate the ultrasonic USW corresponding to a haptic driving signal to change the friction coefficient (or the frictional force) between the haptic object 10 and the display member 100, and thus, may provide a virtual texture effect to the haptic object, thereby providing the user with a virtual texture which is equal or similar to an actual texture. Aspects are not limited thereto. As an example, the vibration apparatus 500 may also providing the user with a virtual texture which is different from an actual texture.

The vibration apparatus 500 may include a piezoelectric material or an electroactive material which have a piezoelectric characteristic. For example, the vibration apparatus 500 may be an active vibration member, a vibration generating apparatus, a vibration generating device, an ultrasonic vibration apparatus, an ultrasonic generating apparatus, an ultrasonic generating device, a haptic vibration apparatus, a haptic vibration device, a haptic generating apparatus, or a haptic generating device, but aspects of the present disclosure are not limited thereto.

The vibration apparatus 500 according to an aspect of the present disclosure may include one or more vibration generating parts 510 and a press structure 570, but aspects of the present disclosure are not limited thereto.

The one or more vibration generating parts 510 may be configured to vibrate the display member 100. The one or more vibration generating parts 510 may include a piezoelectric material having a piezoelectric characteristic. The one or more vibration generating parts 510 may be configured as a ceramic-based piezoelectric material capable of implementing a relatively strong vibration, or may be configured as a piezoelectric ceramic having a perovskite-based crystalline structure, without being limited thereto. For example, the one or more vibration generating parts 510 may be a vibration device, a vibration generating device, a vibration film, a vibration generating film, a vibrator, a vibration generator, an active vibrator, an active vibration generator, an actuator, an exciter, a film actuator, a film exciter, an ultrasonic actuator, or an active vibration member, or the like, but aspects of the present disclosure are not limited thereto.

The one or more vibration generating parts 510 may autonomously vibrate (or displace or drive) based on a vibration (or displacement or driving) of the piezoelectric material based on a driving signal applied to the piezoelectric material. The one or more vibration generating parts 510 may alternately repeat contraction and/or expansion by a piezoelectric effect (or a piezoelectric characteristic) to vibrate (or displace or drive). For example, the one or more vibration generating parts 510 may alternately and repeatedly perform contraction and/or expansion based on an inverse piezoelectric effect to vibrate (or displace or drive) in an in-plane vibration mode. For example, the in-plane vibration mode may be a horizontal-direction vibration or a lateral-direction vibration. For example, the in-plane vibration mode may be a horizontal-direction vibration or a lateral-direction vibration with respect to the display member 100, but aspects of the present disclosure are not limited thereto.

The one or more vibration generating parts 510 may vibrate based on the driving signal to generate (or output) the ultrasonic USW having a frequency of 20 kHz or more, without being limited thereto. For example, the driving signal may be an ultrasonic driving signal or a haptic driving signal, but aspects of the present disclosure are not limited thereto. As an example, the one or more vibration generating parts 510 may vibrate to generate (or output) the ultrasonic USW having a frequency lower than 20 kHz.

As an example, the driving signal according to an aspect of the present disclosure may have a frequency of 20 kHz or more. For example, the driving signal may have a frequency which is higher than a resonance frequency of the one or more vibration generating parts 510, to generate ultrasonic resonance. As an example, the driving signal may have a frequency which is equal to or lower than a resonance frequency of the one or more vibration generating parts 510. As an example, the driving signal may also have a frequency lower than 20 kHz.

The driving signal according to another aspect of the present disclosure may include an ultrasonic signal and a texture signal, to provide a virtual texture by a squeeze film effect to the user. For example, the ultrasonic signal may have a frequency of 20 kHz or more. For example, the texture signal may have a low frequency signal or a virtual texture signal. As an example, the texture signal may have a frequency of 100 Hz to 600 Hz. For example, the texture signal may have one or more frequencies of 100 Hz to 600 Hz based on a texture (or surface roughness) of a textured object. For example, the textured object may include one or more materials of paper, plastic, rubber, fabric, cloth, glass, mirror, wood, or metal, or the like, but aspects of the present disclosure are not limited thereto. As an example, the texture signal may have a frequency lower than 100 Hz or higher than 600 Hz.

The driving signal according to another aspect of the present disclosure may be an amplitude modulation signal of an ultrasonic signal using a low frequency signal, but aspects of the present disclosure are not limited thereto. For example, the driving signal may be generated by the amplitude modulation of the ultrasonic signal based on the low frequency signal having one or more of 100 Hz to 600 Hz, but aspects of the present disclosure are not limited thereto. Accordingly, a user may recognize a virtual texture corresponding to the frequency of the texture signal instead of a texture of the display member 100, based on a variation of the friction coefficient (or the friction force) between the display member 100 and the haptic object based on the ultrasonic USW included in a frequency of the texture signal.

The press structure 570 may be configured to apply pressure to the vibration generating part 510. The press structure 570 may be configured to compress the vibration generating part 510. For example, the press structure 570 may apply pressure to the vibration generating part 510 in a thickness direction Z of the vibration generating part 510 to increase a mechanical quality factor of the vibration generating part 510. For example, the mechanical quality factor may denote a factor value for converting stress (or pressure), transferred or applied to a piezoelectric material, into an electric charge. Therefore, when pressure is applied to the vibration generating part 510 by the press structure 570, as stress (or pressure) transferred or applied to the piezoelectric material of the vibration generating part 510 increases, the amount of displacement (or displacement width) of the vibration generating part 510 may increase. For example, the press structure 570 may apply pressure to the vibration generating part 510 and may thus adjust a resonance frequency of the vibration generating part 510 to correspond to a resonance frequency of the display member 100 or be equal to the resonance frequency of the display member 100, thereby increasing the amount of displacement (or displacement width) of the display member 100 to increase an intensity of the ultrasonic USW generated based on a vibration of the display member 100, but aspects of the present disclosure are not limited thereto.

The press structure 570 according to an aspect of the present disclosure may be configured at the rear surface 100a of the display member 100. For example, the press structure 570 may be configured at the rear surface 100a of the display member 100 to fully or partially surround the vibration generating part 510. For example, the press structure 570 may be configured at the rear surface 100a of the display member 100 to fully or partially cover the vibration generating part 510. The press structure 570 may be configured to apply pressure to the vibration generating part 510 based on a screw ram scheme, without being limited thereto.

The press structure 570 may be coupled or fixed to the rear surface 100a of the display member 100. As an example, the press structure 570 may be coupled or fixed to the rear surface 100a of the display member 100 by a fixing member 400. The fixing member 400 may be coupled or fixed between a periphery portion of the press structure 570 and the rear surface 100a of the display member 100. The fixing member 400 may be coupled or fixed between the rear surface 100a of the display member 100 and the periphery portion of the press structure 570 spaced apart from the vibration generating part 510. The vibration generating part 510 may be fully or partially surrounded by the press structure 570 and the fixing member 400, but aspects of the present disclosure are not limited thereto.

The fixing member 400 according to an aspect of the present disclosure may include a material that has a good adhesive force or attaching force between the press structure 570 and the display member 100. The fixing member 400 may be configured to reduce, minimize or prevent the transfer of a vibration of the display member 100 to the press structure 570. The fixing member 400 may include a material characteristic suitable for blocking a vibration. For example, the fixing member 400 may include a material having elasticity for vibration absorption (or impact absorption). The fixing member 400 according to an aspect of the present disclosure may be configured as polyurethane materials or polyolefin materials, but aspects of the present disclosure are not limited thereto. For example, the fixing member 400 may include one or more of an adhesive, a double-sided adhesive, a double-sided tape, a double-sided foam tape, a double-sided foam pad, and a double-sided cushion tape.

The display apparatus or the vibration apparatus 500 according to an aspect of the present disclosure may further include a connection member 580.

The connection member 580 may be connected or coupled between the vibration generating part 510 and the rear surface 100a of the display member 100. For example, the connection member 580 may be connected or coupled between the vibration generating part 510 and the rear surface 100a of the display panel 110, but aspects of the present disclosure are not limited thereto.

The connection member 580 may include a material or an adhesive material for reducing, preventing or minimizing the loss of a vibration (or vibration force or displacement force) transferred to the display member 100, based on a vibration of the vibration generating part 510. For example, the connection member 580 may include a material having a modulus or a Young's modulus which is equal or similar to the vibration generating part 510. As an example, the connection member 580 may include a material having a modulus or a Young's modulus which is greater than that of the fixing member 400.

The connection member 580 according to an aspect of the present disclosure may have a modulus of 1 GPa (gigapascal) or more. For example, the connection member 580 may have a modulus of 1 GPa to 10 GPa, but aspects of the present disclosure are not limited thereto. For example, when the display apparatus according to an aspect of the present disclosure is applied to a vehicular apparatus and the connection member 580 includes a material or an adhesive material having a modulus of 1 GPa or more, the transfer efficiency of a vibration force (or displacement force) transferred from the vibration generating part 510 to the display member 100 may increase, and the transfer efficiency of a vibration force (or displacement force) transferred from the vibration generating part 510 to the display member 100 may not decrease in a high temperature environment and a low temperature environment, but aspects of the present disclosure are not limited thereto.

The material or the adhesive material of the connection member 580 according to an aspect of the present disclosure may include epoxy or cyanoacrylate, but aspects of the present disclosure are not limited thereto.

The material or the adhesive material of the connection member 580 according to another aspect of the present disclosure may include a pressure sensitive adhesive (PSA), an optically cleared adhesive (OCA), an optically cleared resin (OCR), an epoxy resin, an acrylic resin, a silicone resin, or a urethane resin, or the like, but aspects of the present disclosure are not limited thereto. For example, the connection member 580 may include an acrylic-based adhesive material (or substance) having a characteristic where an adhesive force is better and hardness is higher.

Aspects are not limited thereto. As an example, the connection member 580 according to another exemplary aspect of the present disclosure may have a modulus of less than 1 GPa. As an example, when the display apparatus according to an aspect of the present disclosure is applied to a non-vehicular apparatus instead of a vehicular apparatus, the connection member 580 according to another aspect of the present disclosure may have a modulus of less than 1 GPa. For example, the connection member 580 may have a modulus of 10 MPa (megapascal) or less. For example, the connection member 580 may have a modulus of 1 MPa to 10 MPa, but aspects of the present disclosure are not limited thereto. For example, when the connection member 580 has a modulus of less than 1 GPa or 10 MPa or less, the connection member 580 may have a thickness of 0.1 mm (millimeter) or more and 0.5 mm (millimeter) or less so as to reduce, prevent or minimize the loss, caused by a relatively low modulus, of a vibration (or vibration force) transferred from the vibration generating part 510 to the display member 100, but aspects of the present disclosure are not limited thereto. For example, the connection member 580 may include one or more of a double-sided adhesive, a double-sided tape, a double-sided foam tape, a double-sided foam pad, and an adhesive, but aspects of the present disclosure are not limited thereto.

The connection member 580 according to another aspect of the present disclosure may include a material or an adhesive material which is high in thermal conductance or large in thermal capacity, so as to dissipate heat, occurring in vibration of the vibration generating part 510, to the display member 100. As an example, the connection member 580 according to another exemplary aspect of the present disclosure may include a material or an adhesive material which is higher in thermal conductance or larger in thermal capacity than the fixing member 400. For example, the connection member 580 may be a heat dissipation member. For example, the connection member 580 may include a heat transfer particle. For example, the heat transfer particle may increase a vibration (or vibration force) transferred from the vibration generating part 510 to the display member 100, or may increase a heat transfer rate of heat transferred from the vibration generating part 510 to the display member 100. The heat transfer particle may include metal materials, metal nanoparticles, or metal nanowires, but aspects of the present disclosure are not limited thereto.

According to another aspect of the present disclosure, in a case where the vibration generating part 510 is maintained with being adhered or pressed to the display member 100 by pressing of the press structure 570, the connection member 580 may be omitted, but aspects of the present disclosure are not limited thereto.

Figure 3:
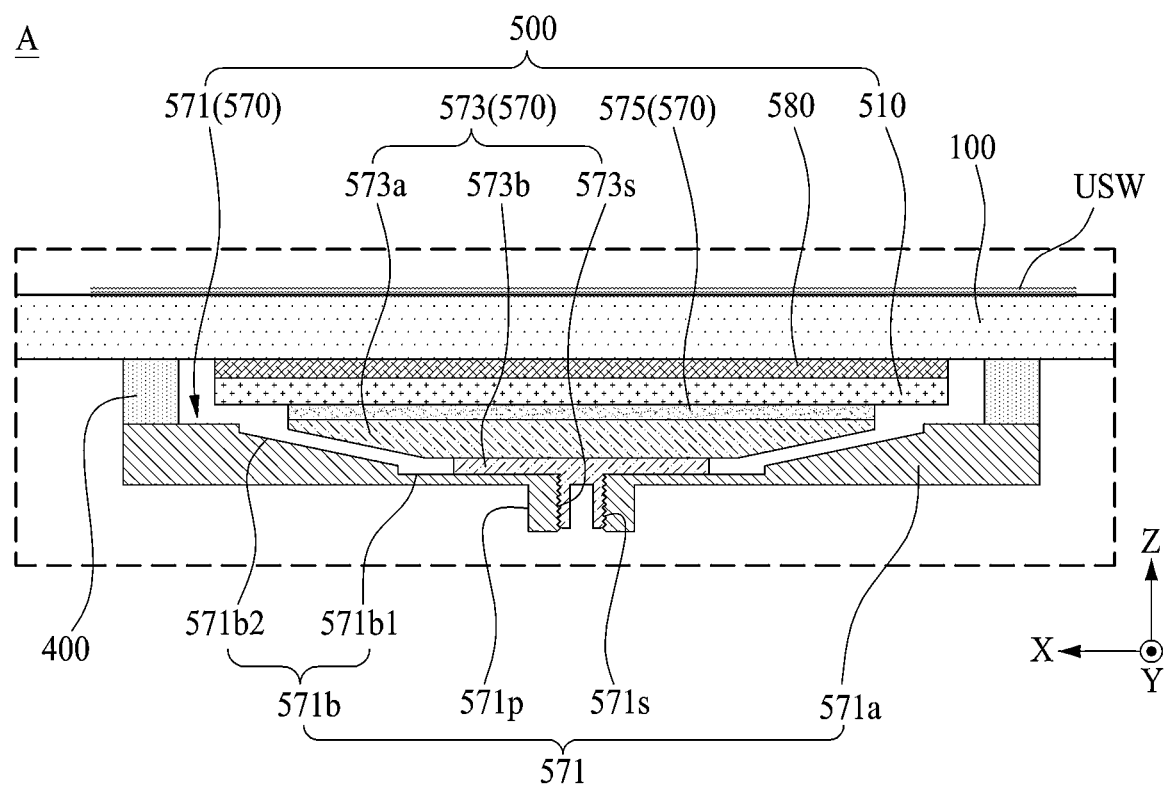
FIG. 3 is an enlarged view of a portion 'A' illustrated in FIG. 2 according to an aspect of the present disclosure.
Figure 4:
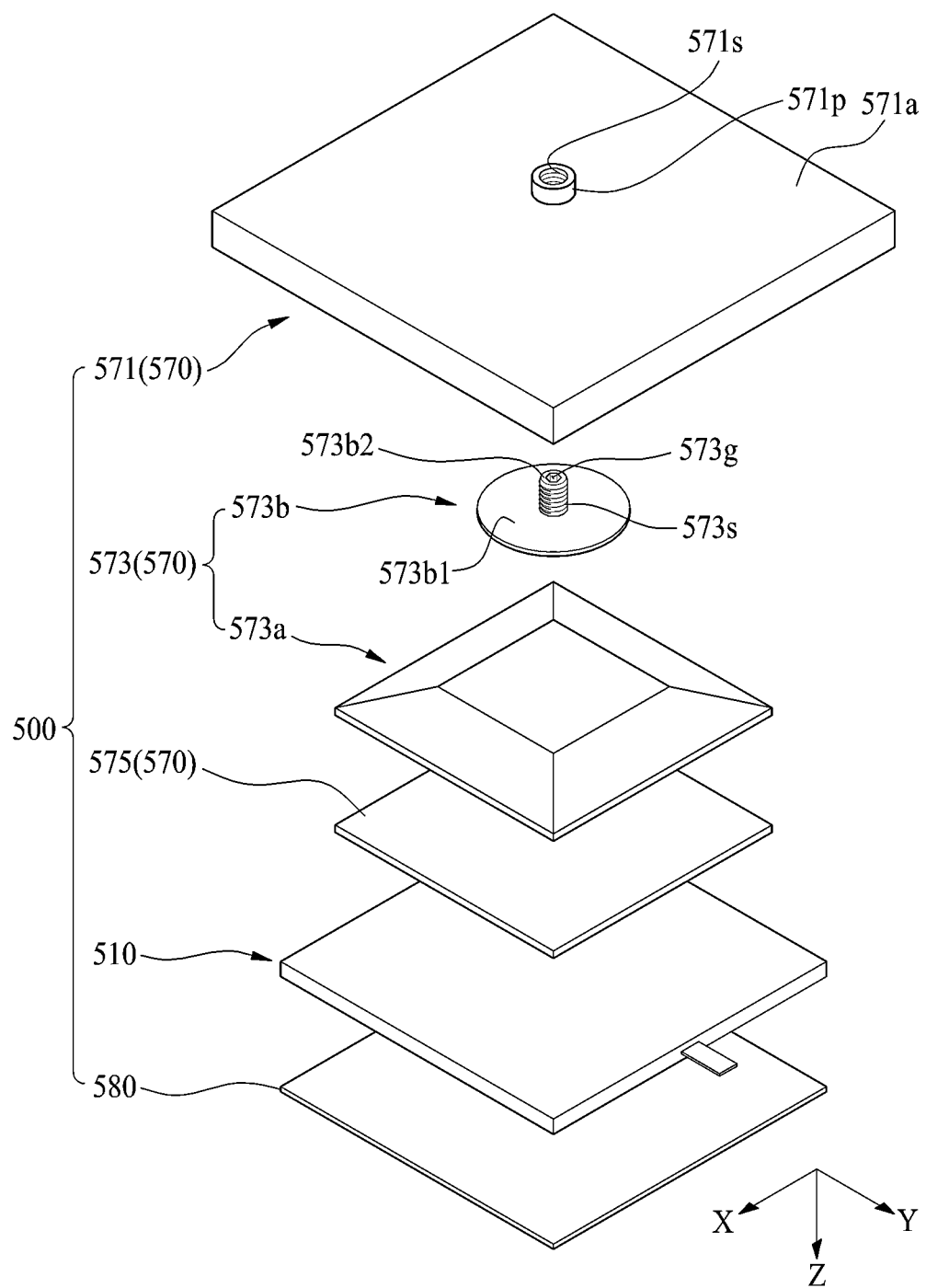
FIG. 4 is an exploded perspective view illustrating a vibration apparatus according to an aspect of the present disclosure.

FIG. 3 is an enlarged view of a portion 'A' illustrated in FIG. 2 according to an aspect of the present disclosure. FIG. 4 is an exploded perspective view illustrating a vibration apparatus according to an aspect of the present disclosure. FIGS. 3 and 4 are diagrams for describing a press structure according to an aspect of the present disclosure.

With reference to FIGS. 2 to 4, a press structure 570 according to an aspect of the present disclosure may include a base structure 571 and a press part 573.

The base structure 571 may be configured at a rear surface of the vibration generating part 510. The base structure 571 may be configured to fully or partially surround the vibration generating part 510. The base structure 571 may fully or partially surround the rear surface of the vibration generating part 510 and may be connected or coupled to the rear surface 100a of the display member 100, for example, by the fixing member 400.

The base structure 571 may include a material having stiffness which may support or endure pressure (or compression force) applied to the vibration generating part 510.

For example, the base structure 571 may be configured as a metal material. For example, the base structure 571 may include one or more materials of stainless steel, aluminum (Al), and an Al alloy, but aspects of the present disclosure are not limited thereto. As an example, the base structure 571 may be configured as any of inorganic materials and organic materials, such as ceramics or plastics, having stiffness. For example, the base structure 571 may be a supporting structure, a supporting cover, a stiff cover, a rigid cover, a lid, or an enclosure, but aspects of the present disclosure are not limited thereto.

The base structure 571 according to an aspect of the present disclosure may include a base frame 571a, an accommodating portion 571b, and a first protrusion portion 571p, but aspects of the present disclosure are not limited thereto.

The base frame 571a may be disposed or configured at the rear surface of the vibration generating part 510. The base frame 571a may have a size which is greater than the vibration generating part 510 and may be configured to cover the rear surface of the vibration generating part 510. The base frame 571a may be coupled or fixed to the rear surface 100a of the display member 100, for example, by the fixing member 400.

The accommodating portion 571b may be configured to accommodate (or receive) the press part 573. The accommodating portion 571b may be configured to be concave from a first surface (or front surface) of the base frame 571a. For example, the accommodating portion 571b may be configured between the base frame 571a and the press part 573. For example, the accommodating portion 571b may include a floor surface (or a bottom surface) 571b1 and a slope surface 571b2. The floor surface 571b1 may be configured to be concave from the first surface (or front surface) of the base frame 571a overlapping a center portion of the vibration generating part 510. The slope surface 571b2 may be configured to be inclined between the floor surface 571b1 and the first surface (or front surface) of the base frame 571a. As an example, the slope surface 571b2 may be configured to be inclined between the floor surface 571b1 and the first surface (or front surface) of the base frame 571a adjacent to the fixing member 400. For example, the accommodating portion 571b may have a cross-sectional structure having a trapezoid shape, but aspects of the present disclosure are not limited thereto. For example, the accommodating portion 571b may have a cross-sectional structure having a trapezoid shape, which includes an upper side (or an upper portion) corresponding to the floor surface 571b1 and an inclined side corresponding to the slope surface 571b2. For example, the accommodating portion 571b may have a tetragonal truncated cone shape or an inverse tetragonal truncated cone shape, without being limited thereto. As an example, a triangular truncated cone shape, a polygonal truncated cone shape, a circular truncated cone shape or an inverse triangular truncated cone shape, an inverse polygonal truncated cone shape, an inverse circular truncated cone shape are also possible.

The first protrusion portion 571p may protrude from the base frame 571a. The first protrusion portion 571p may protrude from a second surface, which is opposite to a first surface, of the base frame 571a. For example, the first protrusion portion 571p may protrude from a center portion of the second surface of the base frame 571a. For example, the first protrusion portion 571p may overlap the center portion of the vibration generating part 510, without being limited thereto. For example, the first protrusion portion 571p may include a hollow portion. For example, the first protrusion portion 571p may have a ring shape or a cylindrical shape, but aspects of the present disclosure are not limited thereto. As an example, the hollow portion may overlap the center portion of the vibration generating part 510, while the first protrusion portion 571p overlap or does not overlap the center portion of the vibration generating part 510, without being limited thereto.

The first protrusion portion 571p may be configured to include a hole 571s. The hole 571 may be a screw hole. For example, the first protrusion portion 571p may include a screw thread formed at the hollow portion. For example, the first protrusion portion 571p may be a nut portion including a nut structure.

The press part 573 may be configured between the vibration generating part 510 and the base structure 571 to apply pressure to the vibration generating part 510. The press part 573 may be configured between the vibration generating part 510 and the base structure 571 to enable the movement (or elevation) in a thickness direction Z of the vibration generating part 510. The press part 573 may be accommodated (or inserted) into the accommodating portion 571b of the base structure 571 and may be configured to apply pressure to the vibration generating part 510, based on the screw ram scheme, but aspects of the present disclosure are not limited thereto.

The press part 573 according to an aspect of the present disclosure may include a press member 573a and a rotation member 573b.

The press member 573a may be configured at a rear surface of the vibration generating part 510 to apply pressure to the vibration generating part 510. The press member 573a may be configured between the vibration generating part 510 and the base structure 571 to apply pressure to the vibration generating part 510. The press member 573a may be configured between the vibration generating part 510 and the base frame 571a. The press member 573a may be configured between the vibration generating part 510 and the floor surface 571b1 of the accommodating portion 571b in the base frame 571a, but aspects of the present disclosure are not limited thereto.

The press member 573a may include a material having a relatively higher modulus (or Young's modulus) than the vibration generating part 510. The press member 573a may include a thermal conductive material which may dissipate heat occurring in vibration of the vibration generating part 510. For example, the press member 573a may be configured as a metal material, without being limited thereto. For example, the base structure 571 may include one or more materials of stainless steel, aluminum (Al), and an Al alloy, but aspects of the present disclosure are not limited thereto. For example, the press member 573a may be a press plate, a press frame, or a press block, but aspects of the present disclosure are not limited thereto.

The press member 573a may have a shape or a structure which may apply uniform pressure to the vibration generating part 510. For example, the press member 573a may have a same planar shape as a planar shape of the vibration generating part 510, but aspects of the present disclosure are not limited thereto.

The press member 573a may include a structure or a shape which may be accommodated (or inserted) into the accommodating portion 571b of the base structure 571. For example, the press member 573a may have a cross-sectional structure having a trapezoid shape, which includes an upper side (or an upper portion) adjacent to the floor surface 571b of the base structure 571. For example, the press member 573a may have a tetragonal truncated cone shape or an inverse tetragonal truncated cone shape. For example, the press member 573a may include a first surface (or lower surface) adjacent to the vibration generating part 510, a second surface (or upper surface) parallel to the first surface, and a slope surface (or lateral surface) between the first surface and the second surface. Aspects are not limited thereto. As an example, the press member 573a may have, etc., without being limited thereto.

The rotation member 573b may be configured to press the press member 573a or move (or forward and backward move) the press member 573a. The rotation member 573b may rotate based on the scram ram scheme to press the press member 573a or move the press member 573a. The rotation member 573b may be configured between the press member 573a and the base structure 571 to press the press member 573a or move (or forward and backward move) the press member 573a. The rotation member 573b may be configured between the press member 573a and the accommodating portion 571b in the base frame 571a. For example, the rotation member 573b may be configured between the press member 573a and the floor surface 571b1 of the accommodating portion 571b in the base frame 571a. For example, the rotation member 573b may be configured to enable rotation and movement between the press member 573a and the floor surface 571b1 of the accommodating portion 571b in the base frame 571a, but aspects of the present disclosure are not limited thereto.

With reference to FIGS. 3 and 4, the press part 573 or the rotation member 573b may include a plate 573b1 and a second protrusion portion 573b2.

The plate 573b1 may be disposed between the base structure 571 and the press member 573a, or may be rotatably and movably disposed between the base structure 571 and the press member 573a. The plate 573b1 may be disposed between the floor surface 571b of the accommodating portion 571b and the press member 573, or may be rotatably and movably disposed between the floor surface 571b of the accommodating portion 571b and the press member 573a. For example, the plate 573b1 may be a rotation plate, a rotation frame, or a rotation block, but aspects of the present disclosure are not limited thereto. For example, the rotation member 573b or the plate 573b1 may be configured in a metal material which is a same as or different from the press member 573a, without being limited thereto.

The plate 573b1 may be configured in a rotatable shape between the base structure 571 and the press member 573a. For example, the plate 573b1 may have a circular shape, a tetragonal shape, or a polygonal shape, but may have a circular shape based on the easiness of rotation and a rotation space.

A first surface (or a front surface) of the plate 573b1 may contact a second surface (or a rear surface) of the press member 573a. The first surface of the plate 573b1 may directly contact the second surface (or rear surface) of the press member 573a. As an example, the plate 573b1 may have a size smaller than, equal to or greater than that of the lower surface of the vibration generating part 510.

The second protrusion portion 573b2 may protrude from the plate 573b1 and may include a screw thread 573s. For example, the second protrusion portion 573b2 may protrudes from the plate 573b1 and may include a screw thread 573s which is fastened to the hole 571s in the first protrusion portion 571p of the base structure 571. The second protrusion portion 573b2 may protrude from the second surface (or rear surface) of the plate 573b1 adjacent to the floor surface 571b of the base structure 571. The second protrusion portion 573b2 may protrude to have a circular pillar shape from the second surface of the plate 573b1, but aspects of the present disclosure are not limited thereto.

A screw thread 573s may be formed at an outer circumference surface of the second protrusion portion 573b2. For example, a size (or diameter) of the second protrusion portion 573b2 may be formed to be equal to a size of the hole 571s in the first protrusion portion 571p of the base structure 571, in a horizontal direction perpendicular to the Z direction. For example, a size (or diameter) of the second protrusion portion 573b2 may be formed to be equal to a size of the hole 571s in the first protrusion portion 571p of the base structure 571 in the Z direction, or to be different from a size of the hole 571s in the first protrusion portion 571p of the base structure 571 in the Z direction. For example, the second protrusion portion 573b2 may be a bolt portion including a bolt structure, without being limited thereto. The screw thread 573s of the second protrusion portion 573b2 may be fastened to the first protrusion portion 571p of the base structure 571.

The press part 573 or the rotation member 573b may further include a groove 573g in the second protrusion portion 573b2. For example, the groove 573g may be an angled groove, such as a polygonal groove. For example, the groove 573g may be concavely formed in the second protrusion portion 573b2 to have a three or more-angled polygonal shape. The groove 573g may be exposed at the outside of the base structure 571 by or through the hole 571s of the first protrusion portion 571p in the base structure 571, or may be covered by a separate removable member.

The second protrusion portion 573b2 screw-coupled to the first protrusion portion 571p may rotate in a forward direction or a reverse direction, based on a rotation of a tool inserted into (or fastened to) the groove 573g. The plate 573b1 may move in a thickness direction of the vibration generating part 510 while rotating based on a rotation of the second protrusion portion 573b2. For example, with respect to the thickness direction of the vibration generating part 510, the plate 573b1 may forward move while rotating based on a forward-direction rotation of the second protrusion portion 573b2 and may backward move based on a reverse-direction rotation of the first protrusion portion 571p. Moreover, the plate 573b1 may maintain a position which is rotated by screw coupling between the first protrusion portion 571p and the second protrusion portion 573b2, but aspects of the present disclosure are not limited thereto.

Therefore, the press member 573 may move (or forward and backward move) based on a rotation and movement (or forward and backward movement) of the rotation member 573b, and thus, may apply pressure to the vibration generating part 510 or may release pressure applied to the vibration generating part 510. For example, the press member 573 may move forward toward the vibration generating part 510, based on a forward-direction rotation and forward movement of the rotation member 573b, and thus, may apply pressure to the vibration generating part 510 and may maintain a state where pressure is applied to the vibration generating part 510.

According to an aspect of the present disclosure, a tetragonal truncated cone shape of the accommodating portion 571b and the press part 573 of the base structure 571 may be configured for slimming of the vibration apparatus 500. For example, when slimming of the vibration apparatus 500 is not needed, the accommodating portion 571b of the base structure 571 may be omitted, and the press member 573a of the press part 573 may be configured in a plate shape, but aspects of the present disclosure are not limited thereto.

The press structure 570 according to an aspect of the present disclosure may further include a buffer member 575.

The buffer member 575 may be disposed or configured between the vibration generating part 510 and the press part 573. The buffer member 575 may be disposed or configured between the vibration generating part 510 and the press member 573a of the press part 573. For example, the buffer member 575 may be disposed or configured between a rear surface of the vibration generating part 510 and a first surface of the press member 573a. The buffer member 575 may be configured in a shape corresponding to the press member 573a. The buffer member 575 may have a size corresponding to the press member 573a. Aspects are not limited thereto. As an example, the buffer member 575 may be configured in a shape different from that of the press member 573a. As an example, the buffer member 575 may have a size different from that of the press member 573a. As an example, the buffer member 575 may have a size greater than that of the press member 573a.

The buffer member 575 may be configured to reduce, minimize or prevent a transfer of a vibration generated at the vibration generating part 510 to the press part 573 (or the press member 573a). The buffer member 575 may include a material characteristic suitable for blocking a vibration. The buffer member 575 may include a material having elasticity for vibration absorption (or impact absorption). For example, the buffer member 575 may include a material having a different modulus (or Young's modulus) from the press member 573a. For example, the buffer member 575 may have a modulus of less than 1 GPa. For example, the buffer member 575 may have a modulus of 10 MPa or less. For example, the buffer member 575 may have a modulus of 1 MPa to 10 MPa, but aspects of the present disclosure are not limited thereto. As an example, the buffer member 575 may include the same or similar material as the fixing member 400, without being limited thereto.

The buffer member 575 according to an aspect of the present disclosure may be configured as silicone materials, rubber materials, polyurethane materials, or polyolefin materials, but aspects of the present disclosure are not limited thereto. For example, the buffer member 575 may be a damping member or a vibration absorption member, but aspects of the present disclosure are not limited thereto.

In the display apparatus according to an aspect of the present disclosure, pressure (or compression force) may be applied to the vibration generating part 510 by the press structure 570, and thus, a mechanical quality factor of the vibration generating part 510 may increase and the amount of displacement (or displacement width) of the vibration generating part 510 may increase, whereby the amount of displacement (or displacement width) of the display member 100 based on a vibration of the vibration generating part 510 may increase to increase an intensity of an ultrasonic USW generated based on a vibration of the display member 100. Accordingly, the display apparatus according to an aspect of the present disclosure may increase (or maximize) a squeeze film effect obtained by a vibration of the display member 100 based on a vibration of the vibration generating part 510, and thus, the recognition by a user on an ultrasonic vibration or an ultrasonic haptic and/or a virtual texture may be enhanced, but aspects of the present disclosure are not limited thereto.

Figure 5:
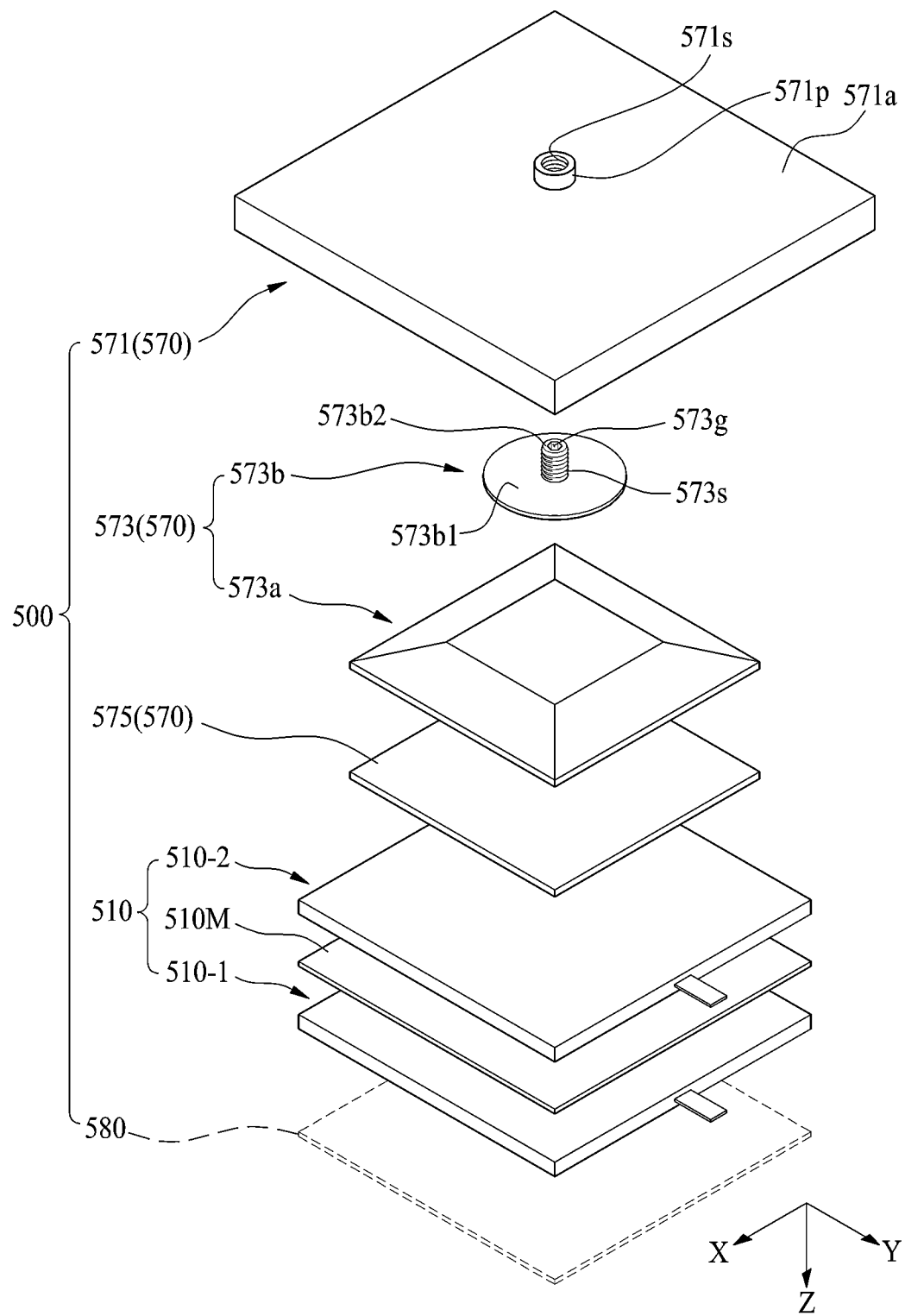
FIG. 5 is an exploded perspective view illustrating a vibration apparatus according to another aspect of the present disclosure.

FIG. 5 is an exploded perspective view illustrating a vibration apparatus according to another aspect of the present disclosure. FIG. 5 illustrates an aspect implemented by modifying the vibration generating part in the vibration apparatus illustrated in FIG. 4 according to another aspect of the present disclosure. In the following descriptions, therefore, the other elements except the vibration generating part and relevant elements are referred to by like reference numerals, and thus, repeated descriptions thereof are omitted or briefly given.

With reference to FIGS. 2 and 5, in the vibration apparatus 500 according to another aspect of the present disclosure, a vibration generating part 510 may include two or more vibration generating parts 510-1 and 510-2. For example, the vibration generating part 510 according to another aspect of the present disclosure may include a first vibration generating part 510-1 and a second vibration generating part 510-2.

The first vibration generating part 510-1 and the second vibration generating part 510-2 may overlap or be stacked with each other to be displaced (or driven or vibrated) in a same direction to increase or maximize an amplitude displacement of the vibration apparatus 500 and/or an amplitude displacement of the display member 100. For example, the first vibration generating part 510-1 and the second vibration generating part 510-2 may have substantially a same size, but aspects of the present disclosure are not limited thereto. For example, the first vibration generating part 510-1 and the second vibration generating part 510-2 may have substantially a same size within an error range of a manufacturing process. Therefore, the first vibration generating part 510-1 and the second vibration generating part 510-2 may maximize an amplitude displacement of the vibration apparatus 500 and/or an amplitude displacement of the display member 100, but aspects of the present disclosure are not limited thereto.

According to an aspect of the present disclosure, any one of the first vibration generating part 510-1 and the second vibration generating part 510-2 may be connected or coupled to a rear surface 100a of the display member 100 by a connection member 580. For example, the second vibration generating part 510-2 may be connected or coupled to the rear surface 100a of the display member 100 by the connection member 580.

According to another aspect of the present disclosure, any one of the first vibration generating part 510-1 and the second vibration generating part 510-2 may be directly contact or be adhered to the rear surface 100a of the display member 100 without the connection member 580, based on pressing of the press structure 570. For example, the second vibration generating part 510-2 may be directly contact or be adhered to the rear surface 100a of the display member 100 without the connection member 580, based on pressing of the press structure 570, but aspects of the present disclosure are not limited thereto.

The vibration generating part 510 according to another aspect of the present disclosure may further include an intermediate adhesive member 510M. The intermediate adhesive member 510M may be disposed or connected between the first vibration generating part 510-1 and the second vibration generating part 510-2, but aspects of the present disclosure are not limited thereto.

The intermediate adhesive member 510M according to another aspect of the present disclosure may be configured as a material including an adhesive layer which is good in attaching force or adhesive force, with respect to each of the first vibration generating part 510-1 and the second vibration generating part 510-2. For example, the intermediate adhesive member 510M may include a double-sided adhesive, a foam pad, a double-sided tape, a double-sided foam tape, a double-sided foam pad, or an adhesive, or the like, but aspects of the present disclosure are not limited thereto. For example, an adhesive layer of the intermediate adhesive member 510M may include epoxy, acrylic, silicone, or urethane, but aspects of the present disclosure are not limited thereto. For example, the adhesive layer of the intermediate adhesive member 510M may include a urethane-based material (or substance) having relatively ductile characteristic. Accordingly, the vibration loss caused by displacement interference between the first vibration generating part 510-1 and the second vibration generating part 510-2 may be reduced or minimized, or each of the first vibration generating part 510-1 and the second vibration generating part 510-2 may be freely displaced (or vibrated or driven), but aspects of the present disclosure are not limited thereto.

The vibration generating part 510 according to another aspect of the present disclosure may include the first vibration generating part 510-1 and the second vibration generating part 510-2 which are stacked to vibrate (or displace or drive) in a same direction, and thus, the amount of displacement and/or an amplitude displacement may be maximized or increased. Accordingly, the amount of displacement (or a bending force) and/or an amplitude displacement of the display member 100 may be maximized or increased.

In the display apparatus including the vibration generating part 510 according to another aspect of the present disclosure, the amount of displacement (or displacement width) of the vibration generating part 510 may more increase, and thus, the amount of displacement (or displacement width) of the display member 100 based on a vibration of the vibration generating part 510 may more increase, thereby more increasing an intensity of the ultrasonic USW generated based on a vibration of the display member 100. Accordingly, the display apparatus including the vibration generating part 510 according to another aspect of the present disclosure may increase (or maximize) a squeeze film effect obtained through a vibration of the display member 100 based on a vibration of the vibration generating part 510, and thus, the recognition of a user on an ultrasonic vibration or an ultrasonic haptic and/or a virtual texture may be further enhanced.

Figure 6:
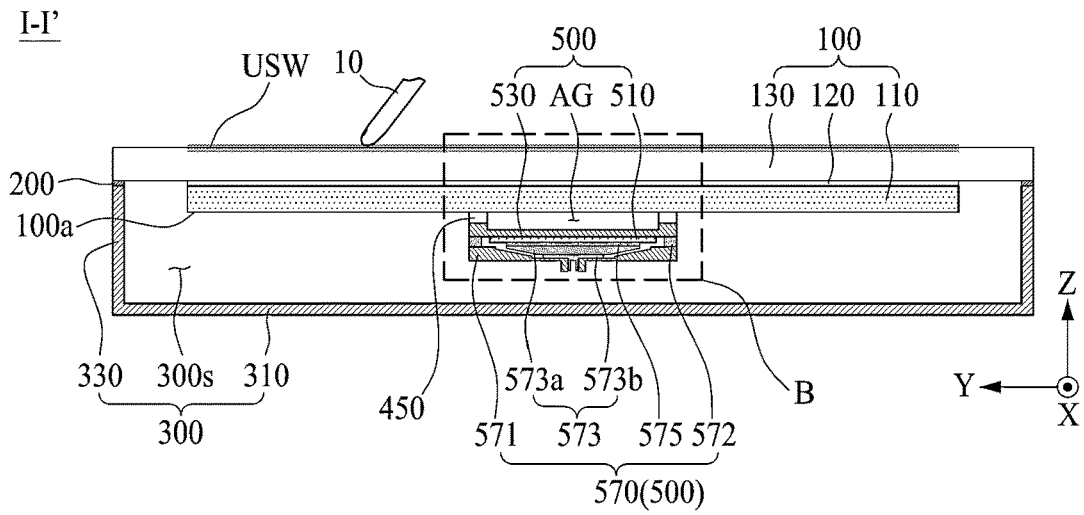
FIG. 6 is another cross-sectional view of a display apparatus taken along line I-I' illustrated in FIG. 1 according to another aspect of the present disclosure.
Figure 7:
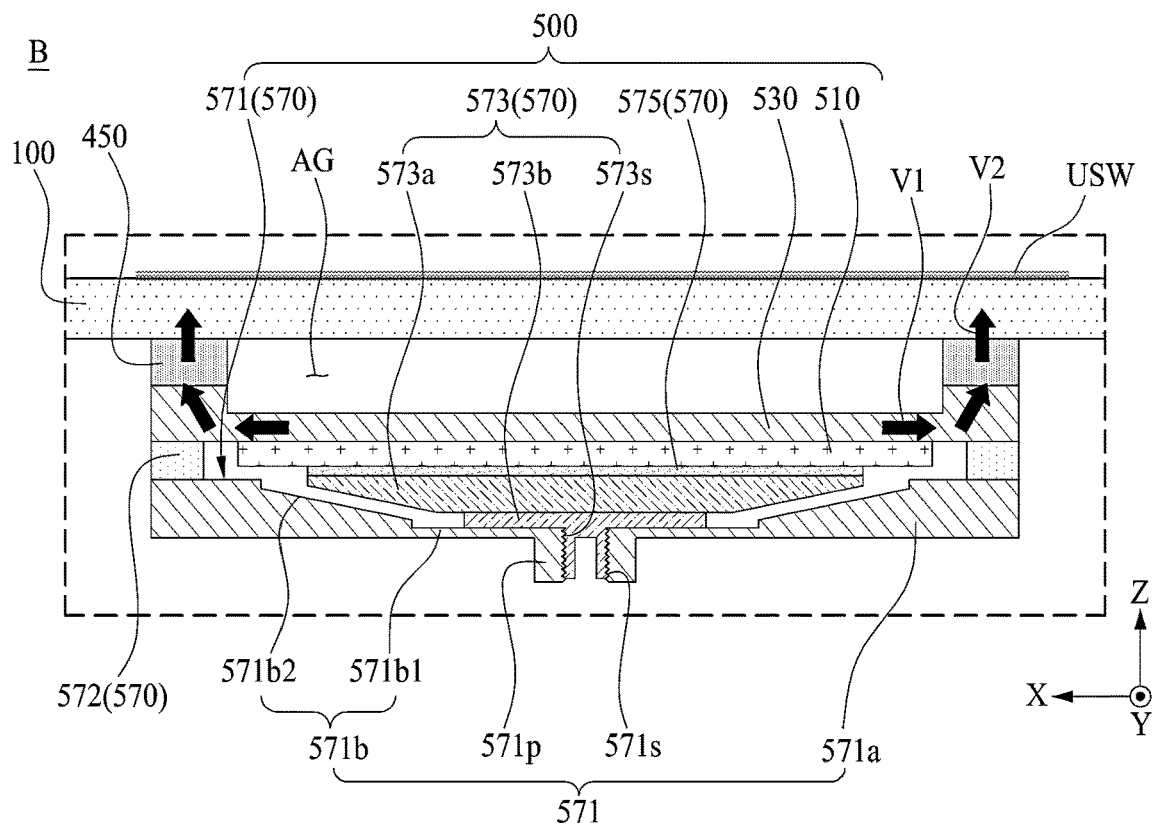
FIG. 7 is an enlarged view of a portion 'B' illustrated in FIG. 6 according to another aspect of the present disclosure.
Figure 8:
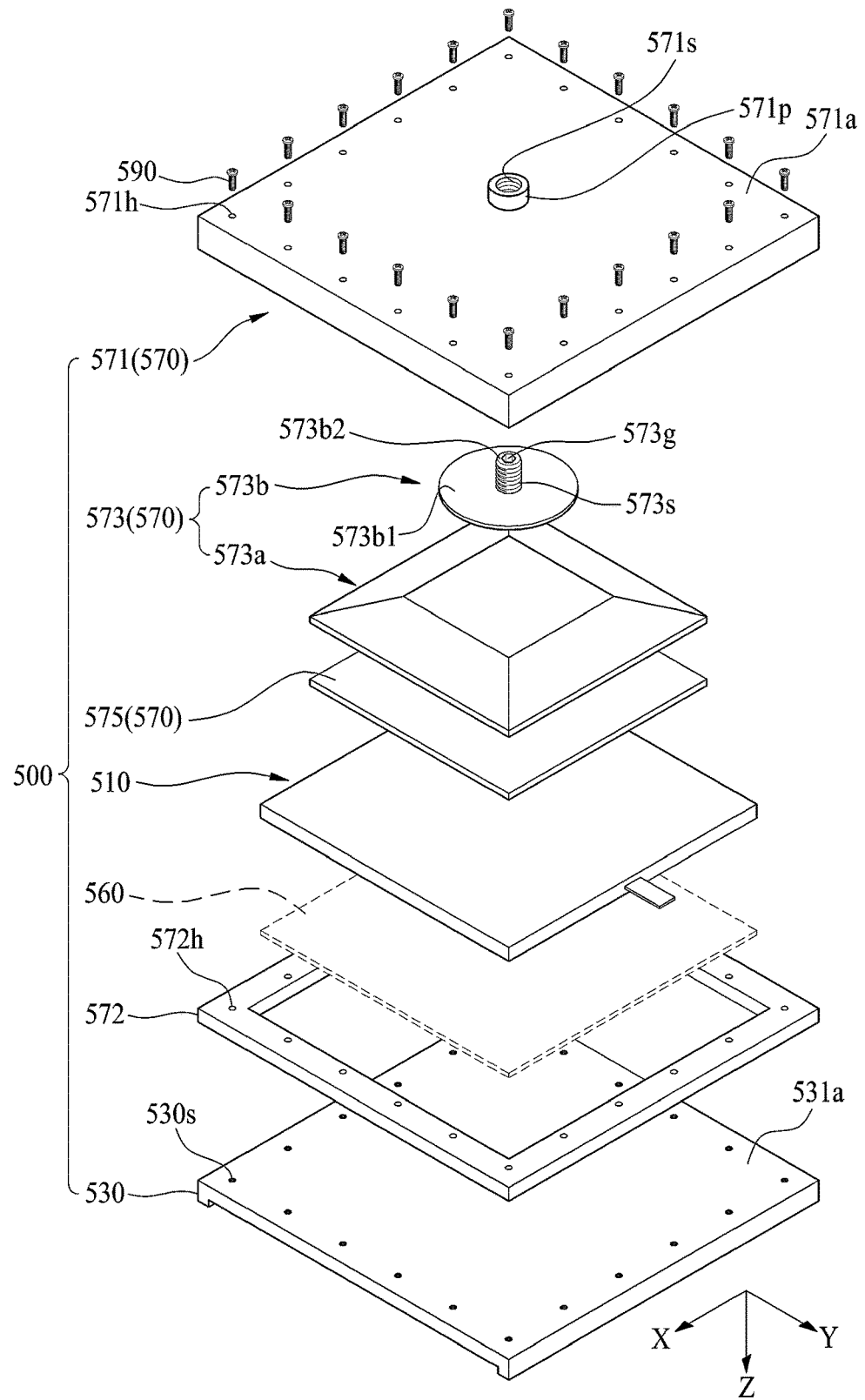
FIG. 8 is an exploded perspective view illustrating a vibration apparatus according to another aspect of the present disclosure.
Figure 9:
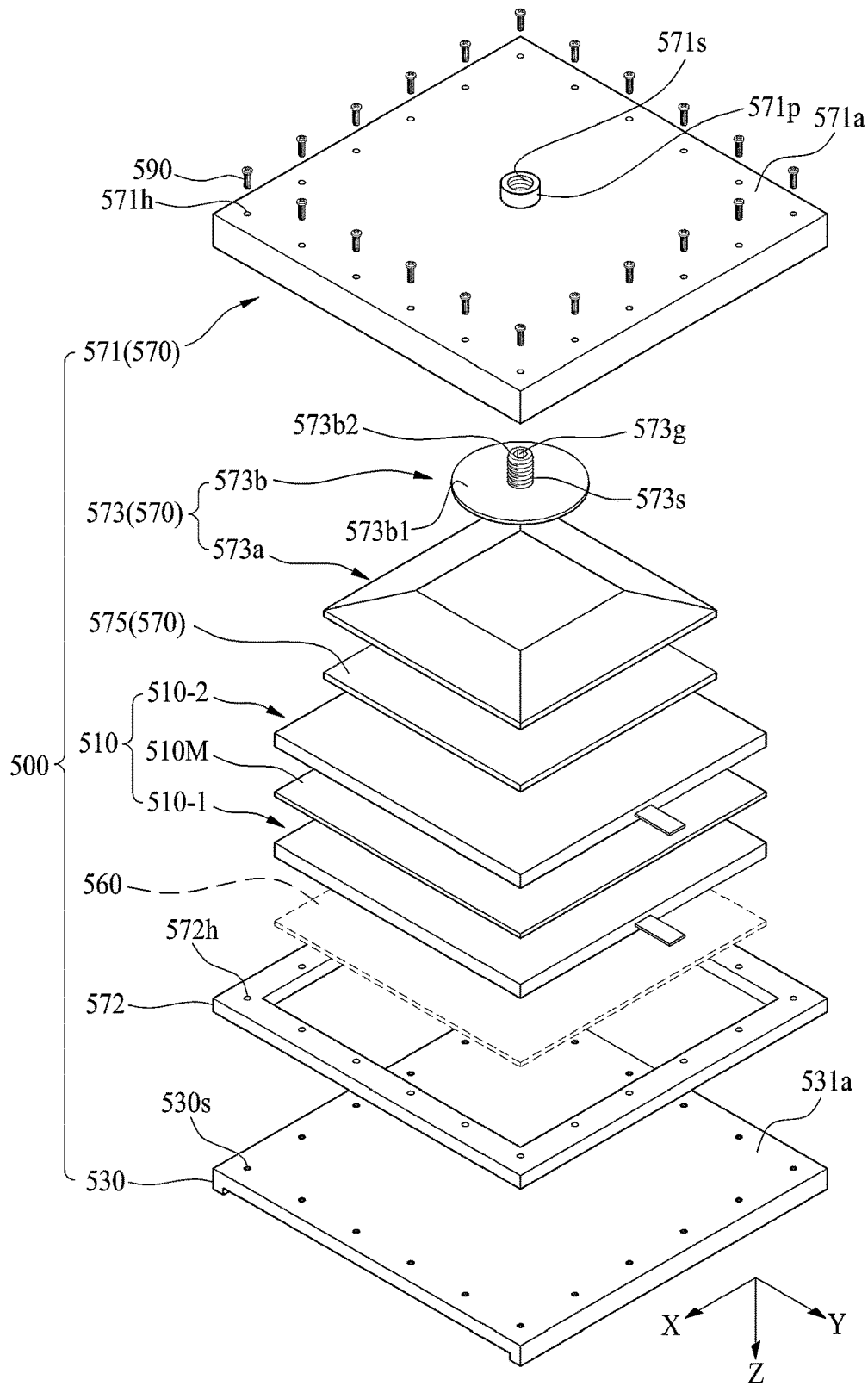
FIG. 9 is an exploded perspective view illustrating a vibration apparatus according to another aspect of the present disclosure.

FIG. 6 is another cross-sectional view of a display apparatus taken along line I-I' illustrated in FIG. 1 according to another aspect of the present disclosure. FIG. 7 is an enlarged view of a portion 'B' illustrated in FIG. 6 according to another aspect of the present disclosure. FIG. 8 is an exploded perspective view illustrating a vibration apparatus according to another aspect of the present disclosure. FIG. 9 is an exploded perspective view illustrating a vibration apparatus according to another aspect of the present disclosure. FIGS. 6 to 9 illustrate an aspect implemented by modifying the vibration apparatus of the display apparatus described above with reference to FIGS. 1 to 5. In the following descriptions, therefore, the other elements except the vibration apparatus and relevant elements are referred to by like reference numerals, and thus, repeated descriptions thereof are omitted or briefly given.

With reference to FIGS. 6 to 9, in a display apparatus according to another aspect (or a second aspect) of the present disclosure, a vibration apparatus 500 may be configured to generate an out-plane vibration mode. For example, the vibration apparatus 500 may vibrate the display member 100 in the out-plane vibration mode to provide an ultrasonic vibration or an ultrasonic haptic to a user. For example, the out-plane vibration mode may be a vertical-direction vibration, a thickness-direction vibration, or a longitudinal-direction vibration. For example, the out-plane vibration mode may be a vertical-direction vibration, a thickness-direction vibration, or a longitudinal-direction vibration with respect to the display member 100. For example, the display member 100 may be supplied with an out-plane vibration from the vibration apparatus 500 to vibrate (or displace), and thus, may generate (or output) an ultrasonic USW.

The vibration apparatus 500 according to another aspect of the present disclosure may include one or more vibration generating parts 510, a vibration transfer part 530, and a press structure 570. The one or more vibration generating parts 510 may include a piezoelectric material having a piezoelectric characteristic. The one or more vibration generating parts 510 may be configured to vibrate the display member 100 through the vibration transfer part 530, but aspects of the present disclosure are not limited thereto.

Except for that the one or more vibration generating parts 510 according to an aspect of the present disclosure are connected to the vibration transfer part 530, the one or more vibration generating parts 510 may be a same as or substantially a same as the one or more vibration generating parts 510 described above with reference to FIGS. 2 and 3, and thus, repeated descriptions thereof are omitted or briefly given.

The one or more vibration generating parts 510 according to another aspect of the present disclosure, as illustrated in FIG. 9, may include a first vibration generating part 510-1 and a second vibration generating part 510-2.

The first vibration generating part 510-1 and the second vibration generating part 510-2 may overlap or be stacked with each other to be displaced (or driven or vibrated) in a same direction to increase or maximize an amplitude displacement of the vibration apparatus 500 and/or an amplitude displacement of the display member 100. The first vibration generating part 510-1 and the second vibration generating part 510-2 may be a same or substantially a same as the first vibration generating part 510-1 and the second vibration generating part 510-2 described above with reference to FIG. 5, and thus, repeated descriptions thereof are omitted or briefly given.

The vibration transfer part 530 may be connected to the press structure 570 and may be configured to support the one or more vibration generating parts 510. The vibration transfer part 530 may be configured to transfer vibrations of the one or more vibration generating parts 510 to the display member 100. For example, the vibration transfer part 530 may be a vibration conversion member, a vibration mode conversion member, or a converter, but aspects of the present disclosure are not limited thereto.

The vibration transfer part 530 according to an aspect of the present disclosure may be configured to convert the in-plane vibration mode, transferred to the display member 100, into the out-plane vibration mode based on vibrations of the one or more vibration generating parts 510. For example, the vibration transfer part 530 may be configured to convert an ultrasonic vibration direction (or lateral-direction vibration), transferred to the display member 100, into a thickness-direction vibration (or longitudinal-direction vibration) of the display member 100 based on vibrations of the one or more vibration generating parts 510. For example, the vibration transfer part 530 may convert the vibrations of the one or more vibration generating parts 510 into a thickness-direction vibration of the display member 100 or a normal-direction vibration of the display member 100 with respect to a surface of the vibration generating part 510 and may allow the normal-direction vibration or the thickness-direction vibration of the display member 100 to be transferred to the display member 100, thereby increasing the efficiency of a squeeze film effect generated based on a vibration of the display member 100, but aspects of the present disclosure are not limited thereto.

The vibration transfer part 530 may be configured as a material having relatively high stiffness or a material having a Young's modulus or a modulus of 1 GPa or more, so as to transfer vibrations of the one or more vibration generating parts 510 to the display member 100. Aspects are not limited thereto.

As an example, the vibration transfer part 530 according to an aspect of the present disclosure may be configured as a metal material or a plastic material, or other organic or inorganic materials.

According to an aspect of the present disclosure, the metal material of the vibration transfer part 530 may include any one or more materials of stainless steel, aluminum (Al), an Al alloy, a magnesium (Mg), a Mg alloy, copper (Cu) alloy, and a magnesium-lithium (Mg—Li) alloy, but aspects of the present disclosure are not limited thereto.

According to an aspect of the present disclosure, the vibration transfer part 530 may be configured as a plastic material such as plastic or styrene material, but aspects of the present disclosure are not limited thereto. For example, the plastic material of the vibration transfer part 530 may be configured as polycarbonate (PC), polyethylene terephthalate (PET), polyarylate (PAR), polyethylene naphthalate (PEN), polysulfone (PSF), polyethersulfone (PES), or cyclo-olefin copolymer (COC), or the like, but aspects of the present disclosure are not limited thereto. For example, the styrene material may be an ABS material. The ABS material may be acrylonitrile, butadiene, and styrene.

The vibration apparatus 500 or the vibration transfer part 530 according to an aspect of the present disclosure may be connected or coupled to the display member 100 by the connection member 450. For example, the vibration apparatus 500 or the vibration transfer part 530 may be connected to or supported at a rear surface 100a of the display member 100 by the connection member 450. For example, the vibration apparatus 500 or the vibration transfer part 530 may be connected to or supported at the rear surface 100a of the display panel 110 by the connection member 450. For example, the connection member 450 may be a second connection member or a second adhesive member, but aspects of the present disclosure are not limited thereto.

The connection member 450 may include a material or an adhesive material for reducing, preventing or minimizing the loss of a vibration (or vibration force or displacement force) transferred to the display member 100, based on a vibration of the vibration apparatus 500 or the vibration transfer part 530. For example, the connection member 450 may include a material or an adhesive material having a modulus or a Young's modulus which is equal or similar to the vibration transfer part 530, so as to transfer a vibration of the vibration transfer part 530 to the display member 100 without loss. Aspects are not limited thereto. As an example, the connection member 450 may include a material or an adhesive material having a modulus or a Young's modulus which is different from the vibration transfer part 530.

The connection member 450 according to an aspect of the present disclosure may have a modulus of 1 GPa (gigapascal) or more, without being limited thereto. For example, the connection member 450 may have a modulus of 1 GPa to 10 GPa, but aspects of the present disclosure are not limited thereto. For example, when the display apparatus according to an aspect of the present disclosure is applied to a vehicular apparatus and the connection member 450 includes a material or an adhesive material having a modulus of 1 GPa or more, the transfer efficiency of a vibration force (or displacement force) transferred from the vibration apparatus 500 or the vibration transfer part 530 to the display member 100 may increase, and the transfer efficiency of a vibration force (or displacement force) transferred from the vibration apparatus 500 or the vibration transfer part 530 to the display member 100 may not decrease in a high temperature environment and a low temperature environment.

The material or the adhesive material of the connection member 450 according to an aspect of the present disclosure may include epoxy or cyanoacrylate, but aspects of the present disclosure are not limited thereto.

The material or the adhesive material of the connection member 450 according to another aspect of the present disclosure may include a pressure sensitive adhesive (PSA), an optically cleared adhesive (OCA), an optically cleared resin (OCR), an epoxy resin, an acrylic resin, a silicone resin, or a urethane resin, or the like, but aspects of the present disclosure are not limited thereto. For example, the connection member 450 may include an acrylic-based adhesive material (or substance) having a characteristic where an adhesive force is better and hardness is higher.

As an example, the connection member 450 according to another exemplary aspect of the present disclosure may have a modulus of less than 1 GPa. As an example, when the display apparatus according to an aspect of the present disclosure is applied to a non-vehicular apparatus instead of a vehicular apparatus, the connection member 450 according to another aspect of the present disclosure may have a modulus of less than 1 GPa. For example, the connection member 450 may have a modulus of 10 MPa (megapascal) or less. For example, the connection member 450 may have a modulus of 1 MPa to 10 MPa, but aspects of the present disclosure are not limited thereto. For example, when the connection member 450 has a modulus of less than 1 GPa or 10 MPa or less, the connection member 450 may have a thickness of 0.1 mm (millimeter) or more and 0.5 mm (millimeter) or less so as to reduce, prevent or minimize the loss, caused by a relatively low modulus, of a vibration (or vibration force) transferred from the vibration apparatus 500 or the vibration transfer part 530 to the display member 100, but aspects of the present disclosure are not limited thereto.

The connection member 450 according to another aspect of the present disclosure may include a material or an adhesive material which is high in thermal conductance or large in thermal capacity, so as to dissipate heat, occurring in vibration of the vibration apparatus 500, to the display member 100. For example, the connection member 450 may be a heat dissipation member. For example, the connection member 450 may include a heat transfer particle. For example, the heat transfer particle may increase a vibration (or vibration force) transferred from the vibration apparatus 500 to the display member 100, or may increase a heat transfer rate of heat transferred from the vibration apparatus 500 to the display member 100. The heat transfer particle may include metal materials, metal nanoparticles, or metal nanowires, but aspects of the present disclosure are not limited thereto.

The connection member 450 according to an aspect of the present disclosure may have a thickness for reducing or preventing a physical contact between the vibration apparatus 500 and the display member 100. For example, the connection member 450 may be adjusted based on heat transfer efficiency (or thermal capacity) transferred from the vibration apparatus 500 to the display member 100. For example, the connection member 450 may be adjusted based on one or more of the thickness for reducing or preventing the physical contact between the vibration apparatus 500 and the display member 100 and a thickness for increasing or maximizing heat transfer efficiency (or thermal capacity) transferred from the vibration apparatus 500 to the display member 100, but aspects of the present disclosure are not limited thereto.

The display apparatus according to an aspect of the present disclosure may further include an air gap AG between the display member 100 and the vibration generating part 510.

The air gap AG may be configured between the display member 100 and the vibration apparatus 500 (or the vibration transfer part 530). For example, the vibration apparatus 500 or the vibration transfer part 530 may be disposed at the rear surface 100*a* of the display member 100 with the air gap AG therebetween. The air gap AG may allow the vibration apparatus 500 and the display member 100 to independently vibrate without depending on each other. Moreover, the air gap AG may enable a smooth vibration of the vibration apparatus 500 in vibration of the vibration apparatus 500 and a free strain of the display member 100 based thereon, and thus, may increase a vibration width of the display member 100, thereby increasing an intensity of an ultrasonic USW generated based on a vibration of the display member 100, but aspects of the present disclosure are not limited thereto.

The press structure 570 may be configured to apply pressure to the vibration generating part 510 at a rear surface 531*a* of the vibration transfer part 530. The press structure 570 may be configured to compress the vibration generating part 510. For example, the press structure 570 may apply pressure to the vibration generating part 510 in a thickness direction Z of the vibration generating part 510 to increase a mechanical quality factor of the vibration generating part 510. But aspects of the present disclosure are not limited thereto The press structure 570 according to an aspect of the present disclosure may be configured at the rear surface 531*a* of the vibration transfer part 530. For example, the press structure 570 may be configured at the rear surface 531*a* of the vibration transfer part 530 to surround the vibration generating part 510. For example, the press structure 570 may be configured at the rear surface 531*a* of the vibration transfer part 530 to fully or partially cover the vibration generating part 510. The press structure 570 may be configured to apply pressure to the vibration generating part 510 based on a screw ram scheme. Therefore, the press structure 570 may apply pressure to the vibration generating part 510 at the rear surface 531*a* of the vibration transfer part 530 to increase a mechanical quality factor of the vibration generating part 510, thereby increasing the amount of displacement (or displacement width) of the vibration generating part 510. Accordingly, the amount of displacement (or displacement width) of the vibration generating part 510 may increase, and thus, an intensity of the ultrasonic USW generated based on a vibration of the display member 100 may increase.

The press structure 570 according to another aspect of the present disclosure may include a base structure 571 and a press part 573.

The base structure 571 may be configured at a rear surface of the vibration generating part 510. The base structure 571 may be configured to fully or partially surround the vibration generating part 510. The base structure 571 may be configured at the rear surface 531*a* of the vibration transfer part 530 to fully or partially surround the rear surface of the vibration generating part 510. But aspects of the present disclosure are not limited thereto. The base structure 571 may include a base frame 571*a*, an accommodating portion 571*b*, and a first protrusion portion 571*p*. The base frame 571*a*, the accommodating portion 571*b*, and the first protrusion portion 571*p* may be a same or substantially a same as the base frame 571*a*, the accommodating portion 571*b*, and the first protrusion portion 571*p* of the base structure 571 described above with reference to FIGS. 2 and 3, and thus, repeated descriptions thereof are omitted. The descriptions of each of the base frame 571*a*, the accommodating portion 571*b*, and the first protrusion portion 571*p* described above with reference to FIGS. 2 and 3 may be included in descriptions of each of the base frame 571*a*, the accommodating portion 571*b*, and the first protrusion portion 571*p* illustrated in FIGS. 6 to 8. But aspects of the present disclosure are not limited thereto.

The press structure 570 according to another aspect of the present disclosure may include a gasket 572.

The gasket 572 may be disposed or interposed between the vibration transfer part 530 and the base structure 571. The gasket 572 may be disposed or interposed between the vibration transfer part 530 and the base structure 571 to fully or partially surround the vibration generating part 510. The gasket 572 may be disposed or interposed between a periphery portion of the base structure 571 and a periphery portion of the rear surface 531*a* of the vibration transfer part 530. For example, the gasket 572 may be disposed or interposed between a periphery portion of the base frame 571*a* and the periphery portion of the rear surface 531*a* of the vibration transfer part 530. For example, the gasket 572 may have a shape corresponding to the periphery portion of the base frame 571*a*, without being limited thereto. For example, the gasket 572 may have a band shape (or a ring shape) corresponding to the periphery portion of the base frame 571*a*, without being limited thereto. For example, the gasket 572 may have a tetragonal band shape, a tetragonal ring shape, or a tetragonal closed loop shape. Aspects are not limited thereto. As an example, the gasket 572 may have a triangular ring shape, a polygonal ring shape, a circular ring shape, etc., without being limited thereto. For example, the gasket 572 may be a sealing member, a closed member, a damping member, or a vibration absorption member, but aspects of the present disclosure are not limited thereto.

The gasket 572 may form a gap space between the vibration transfer part 530 and the base structure 571. For example, the gasket 572 may form a closed space between the vibration transfer part 530 and the base structure 571. For example, the gasket 572 may maintain an impedance component based on air acting on the vibration transfer part 530 when the vibration generating part 510 is vibrating. For example, air around the vibration transfer part 530 may resist a vibration of the vibration transfer part 530 and may act as an impedance component having a reactance component and a resistance based on a frequency. Therefore, the gasket 572 may configure the closed space between the vibration transfer part 530 and the base structure 571, and thus, may maintain an impedance component (or an air impedance or an elastic impedance) acting on the vibration transfer part 530 based on air, thereby enhancing a generation (or an output) characteristic of ultrasonic USW.

The gasket 572 according to an aspect of the present disclosure may be configured to reduce, minimize or prevent the transfer of a vibration of the vibration transfer part 530 to the base structure 571. The gasket 572 may include a material characteristic suitable for blocking the vibration transferred from the vibration transfer part 530 to the base structure 571. For example, the gasket 572 may include a material having elasticity for vibration absorption (or impact absorption). For example, the gasket 572 may be configured as a same material as the buffer member 575 described above with reference to FIGS. 2 and 3, but aspects of the present disclosure are not limited thereto. For example, the gasket 572 may be configured as silicone materials, rubber materials, polyurethane materials, or polyolefin materials, but aspects of the present disclosure are not limited thereto.

The press part 573 may be configured between the vibration generating part 510 and the base structure 571 so as to apply pressure to the vibration generating part 510 in the rear surface 531a of the vibration transfer part 530. The press part 573 may be configured between the vibration generating part 510 and the base structure 571 so as to enable the movement (or elevation) in a thickness direction Z of the vibration generating part 510. The press part 573 may be accommodated (or inserted) into the accommodating portion 571b of the base structure 571 and may be configured to apply pressure to the vibration generating part 510, based on the screw ram scheme. But aspects of the present disclosure are not limited thereto.

The press part 573 according to an aspect of the present disclosure may include a press member 573a and a rotation member 573b. The press member 573a and the rotation member 573b may be a same or substantially a same as the press member 573a and the rotation member 573b described above with reference to FIGS. 2 and 3, and thus, repeated descriptions thereof are omitted. The descriptions of each of the press member 573a and the rotation member 573b described above with reference to FIGS. 2 and 3 may be included in descriptions of each of the press member 573a and the rotation member 573b illustrated in FIGS. 6 to 8. But aspects of the present disclosure are not limited thereto.

The press structure 570 according to another aspect of the present disclosure may further include a buffer member 575.

The buffer member 575 may be disposed or configured between the vibration generating part 510 and the press part 573. The buffer member 575 may be disposed or configured between the vibration generating part 510 and the press member 573a of the press part 573. The buffer member 575 may be a same or substantially a same as the buffer member 575 described above with reference to FIGS. 2 and 3, and thus, repeated descriptions thereof are omitted or briefly given. The descriptions of the buffer member 575 described above with reference to FIGS. 2 and 3 may be included in descriptions of the buffer member 575 illustrated in FIGS. 6 to 8.

The vibration apparatus 500 according to another aspect of the present disclosure may further include a plurality of fastening members 590.

The plurality of fastening members 590 may be configured to couple the vibration transfer part 530 to the press structure 570. The plurality of fastening members 590 may be configured to fix or couple the press structure 570 to the rear surface 531a of the vibration transfer part 530. For example, each of the plurality of fastening members 590 may be a screw or bolt, but aspects of the present disclosure are not limited thereto.

Each of the plurality of fastening members 590 may pass through the base structure 571 and the gasket 572 of the press structure 570 and may be fastened to the vibration transfer part 530. The base structure 571 may further include a plurality of first through holes 571h passing through the base frame 571a. The gasket 572 may further include a plurality of second through holes 572h respectively corresponding to the plurality of first through holes 571h. The vibration transfer part 530 may further include a plurality of fastening holes 530s respectively corresponding to the plurality of first through holes 571h. A head of each of the plurality of fastening members 590 may be disposed at a rear surface of the press structure 570, and a screw thread of each of the plurality of fastening members 590 may pass through corresponding first and second through holes 571h and 572h and may be fastened to a corresponding fastening hole 530s. Accordingly, the vibration transfer part 530 and the press structure 570 may be coupled to each other with the gasket 572 therebetween by the plurality of fastening members 590, and thus, the press structure 570 may be coupled or fixed to the vibration transfer part 530. For example, the plurality of first through holes 571h may be a plurality of first holes, but aspects of the present disclosure are not limited thereto. For example, the plurality of second through holes 572h may be a plurality of second holes, but aspects of the present disclosure are not limited thereto. For example, the plurality of fastening holes 530s may be a plurality of third holes, but aspects of the present disclosure are not limited thereto.

According to another aspect of the present disclosure, each of the plurality of fastening members 590 may be omitted, and in this case, the gasket 572 may be replaced with a substantially same material as the fixing member 400 described above with reference to FIGS. 2 and 3, and the vibration transfer part 530 and the press structure 570 may be coupled to each other by the gasket 572.

According to another aspect of the present disclosure, each of the plurality of fastening members 590 and the gasket 572 may be omitted, and in this case, the vibration transfer part 530 and the press structure 570 may be coupled or fixed to each other through welding, magnetic force, or other means for coupling the vibration transfer part 530 and the press structure 570.

The display apparatus or the vibration apparatus 500 according to an aspect of the present disclosure may further include an adhesive member 560.

The adhesive member 560 may be disposed or configured between the vibration transfer part 530 and the one or more vibration generating parts 510. For example, the one or more vibration generating parts 510 may be adhered to or connected to the first surface (or rear surface) 531a of the vibration transfer part 530 by the adhesive member 560. For example, the adhesive member 560 may be a third connection member or a third adhesive member, but aspects of the present disclosure are not limited thereto.

The adhesive member 560 may be configured as a material or an adhesive material having a relatively high modulus (or Young's modulus) in order to transmit vibrations of the one or more vibration generating parts 510 to the vibration transfer part 530. The adhesive member 560 may be configured as a substantially same material or adhesive material as the connection member 580 described above with reference to FIGS. 2 and 3, but aspects of the present disclosure are not limited thereto.

According to another aspect of the present disclosure, in a case where the one or more vibration generating parts 510 are maintained with being adhered or pressed to the vibration transfer part 530 by pressing of the press structure 570, the adhesive member 560 may be omitted, but aspects of the present disclosure are not limited thereto.

The display apparatus according to another aspect of the present disclosure, as illustrated in FIG. 7, may include the vibration transfer part 530 which converts a vibration V1 of the one or more vibration generating parts 510 into a normal-direction vibration with respect to a surface of the vibration generating part 510 or a thickness-direction vibration (or longitudinal-direction vibration) of the display member 100 and transfers the converted normal-direction vibration or the converted thickness-direction vibration to the display member 100, and thus, may increase the efficiency of a squeeze film effect generated based on a vibration of the display member 100. Accordingly, a vibration displacement (or vibration efficiency) of a thickness-direction of the display member 100 may be enhanced based on a longitudinal-direction vibration transferred through the vibration transfer part 530, and an intensity of the ultrasonic USW generated based on a vibration of the display member 100 may increase, thereby increasing (or maximizing) a squeeze film effect obtained based on a vibration of the display member 100. Therefore, the recognition by a user on an ultrasonic vibration or an ultrasonic haptic and/or a virtual texture may be enhanced.

Figure 10:
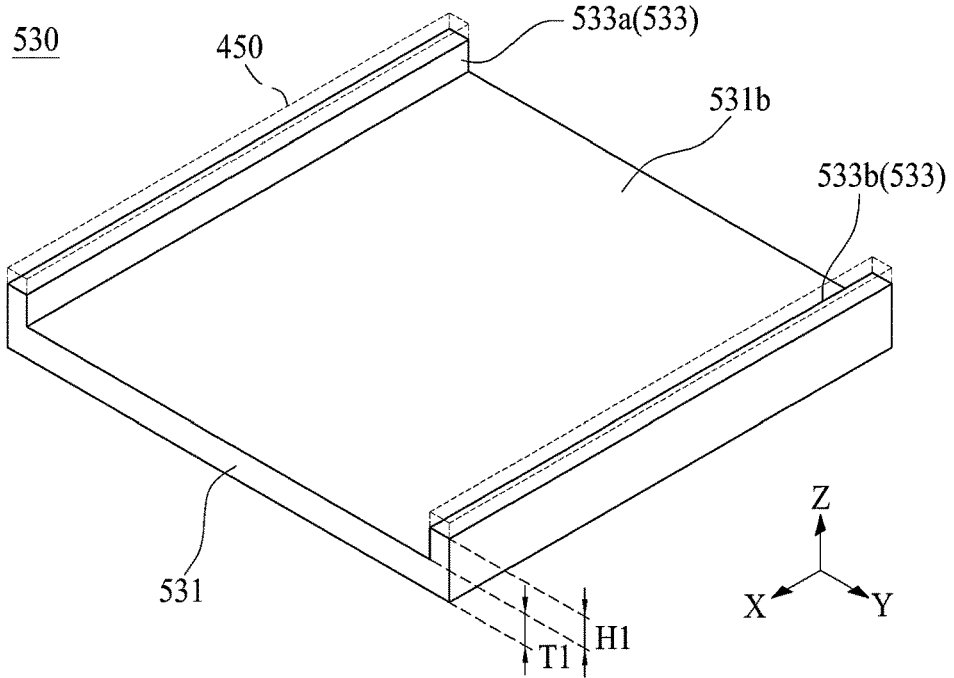
FIG. 10 is a perspective view illustrating a vibration transfer part according to an aspect of the present disclosure.

FIG. 10 is a perspective view illustrating a vibration transfer part according to an aspect of the present disclosure. FIG. 10 illustrates the vibration transfer portion illustrated in FIGS. 6 to 9 according to an aspect of the present disclosure.

With reference to FIGS. 6, 7, and 10, a vibration transfer part 530 according to an aspect of the present disclosure may include a base member 531 and a vibration transfer member 533.

The base member 531 may be configured to support one or more vibration generating parts 510. The base member 531 may have a size which is equal to the vibration generating part 510 or is greater than the one or more vibration generating parts 510. The base member 531 may have a same shape as the vibration generating part 510, but aspects of the present disclosure are not limited thereto.

The base member 531 may be adhered to a first surface (or front surface) of the one or more vibration generating parts 510. As an example, the base member 531 may be adhered to a first surface (or front surface) of the one or more vibration generating parts 510 by an adhesive member 560. For example, a first surface (or rear surface) 531a of the base member 531 may be adhered to a first surface (or front surface) of the vibration generating part 510 by the adhesive member 560. Therefore, the base member 531 may vibrate based on vibrations of the one or more vibration generating parts 510. For example, the base member 531 may be a base plate, a vibration plate, or a vibration transfer plate, but aspects of the present disclosure are not limited thereto. For example, the adhesive member 560 may be omitted, and in this case, the one or more vibration generating parts 510 may be maintained with being adhered or pressed to the rear surface 531a of the base member 531, for example, by pressing of the press structure 570.

The base member 531 according to an aspect of the present disclosure may have a first thickness T1. For example, the first thickness T1 may be 0.1 mm or more. For example, the first thickness T1 may be 0.1 mm or more and 5 mm or less, but aspects of the present disclosure are not limited thereto. For example, the first thickness T1 of the base member 531 may be 0.1 mm or more, based on a resonance frequency of the display member 100 and/or a frequency of an ultrasonic USW generated based on a vibration of the display member 100. For example, the resonance frequency of the display member 100 and/or the frequency of an ultrasonic USW generated based on a vibration of the display member 100 may be changed or tuned based on a size (or area) of the one or more vibration generating parts 510 and a size (or area) and a thickness T1 of the base member 531.

The vibration transfer member 533 may be configured to transfer a vibration of the base member 531 to the display member 100. The vibration transfer member 533 may be configured between the base member 531 and the display member 100. The vibration transfer member 533 may be configured at or connected to a second surface (or front surface) 531b of the base member 531 facing the display member 100. The vibration transfer member 533 may be connected or coupled to a rear surface 100a of the display member 100 by a connection member 450. For example, the vibration transfer member 533 may be a bridge, a leg, a rib, a protrusion portion, a bending portion, a bridge line, a rib line, a protrusion line, or a vibration transfer line, but aspects of the present disclosure are not limited thereto.

The vibration transfer member 533 may have a height (or thickness) for reducing or preventing a physical contact between the display member 100 and the base member 531. For example, the vibration transfer member 533 may be configured to have a first height (or thickness) H1 from the second surface 531b of the base member 531. For example, the first height H1 may be a length (or distance) between the first surface of the base member 531 and an uppermost surface of the vibration transfer member 533, with respect to a third direction Z. For example, the first height H1 of the vibration transfer member 533 may be 0.5 mm or more, but aspects of the present disclosure are not limited thereto. For example, the first height H1 of the vibration transfer member 533 may be adjusted to 0.1 mm or more, based on a total thickness of an apparatus and the stiffness and size of the base member 531. As an example, the first height H1 of the vibration transfer member 533 may be more than 0.5 mm. For example, the third direction may be a thickness direction of the base member 531 or the display member 100 or a Z-axis direction in an XYZ coordinate system. But aspects of the present disclosure are not limited thereto.

The vibration transfer member 533 according to an aspect of the present disclosure may include a first vibration transfer member 533a and a second vibration transfer member 533b. For example, the vibration transfer member 533 may include the first vibration transfer member 533a and the second vibration transfer member 533b, which are configured at or connected to both periphery portions or both end portions of the base member 531 opposite to each other. For example, the vibration transfer member 533 may include the first vibration transfer member 533a and the second vibration transfer member 533b, which protrude from the both periphery portions or the both end portions of the base member 531 opposite to each other. For example, the vibration transfer member 533 according to an aspect of the present disclosure may include a cross-sectional structure having a U-shape, based on the base member 531 and the first and second vibration transfer members 533a and 533b. The base member 531 and the first and second vibration transfer members 533a and 533b may include a plastic material or a metal material described above, without being limited thereto.

The first vibration transfer member 533a may be configured at or connected to a first periphery portion or a first lateral end portion (or a first side end portion) of the base member 531. For example, the first vibration transfer member 533a may be bent toward the rear surface 100a of the display member 100 from the first periphery portion or the first lateral end portion of the base member 531. For example, the first vibration transfer member 533a may be configured to have the first height (or thickness) H1. But aspects of the present disclosure are not limited thereto.

The second vibration transfer member 533b may be configured at or connected to a second periphery portion or a second lateral end portion (or a second side end portion)

of the base member 531 in parallel to the first vibration transfer member 533a. For example, the second vibration transfer member 533b may be bent toward the rear surface 100a of the display member 100 from the second periphery portion or the second lateral end portion of the base member 531. For example, the second vibration transfer member 533b may be configured to have the first height (or thickness) H1. But aspects of the present disclosure are not limited thereto.

Each of the first vibration transfer member 533a and the second vibration transfer member 533b may have a certain width in a direction parallel to a first direction X and may include a line shape which extends along a second direction Y intersecting with the first direction X. For example, the first direction X may be a horizontal length direction or a lateral length direction of the base member 531 or the display member 100 or an X-axis direction of an XYZ coordinate system. For example, the second direction Y may be a vertical length direction or a longitudinal length direction of the base member 531 or the display member 100 or a Y-axis direction of the XYZ coordinate system. But aspects of the present disclosure are not limited thereto.

According to an aspect of the present disclosure, each of the first vibration transfer member 533a and the second vibration transfer member 533b may be vertically configured at or connected to the first surface of the base member 531. For example, an angle between the first surface of the base member 531 and each of the first vibration transfer member 533a and the second vibration transfer member 533b may be 90 degrees, without being limited thereto.

According to another aspect of the present disclosure, a bending portion between the base member 531 and each of the first vibration transfer member 533a and the second vibration transfer member 533b may have a curved structure having a certain curvature radius. For example, a connection portion between the base member 531 and each of the first vibration transfer member 533a and the second vibration transfer member 533b may have a curved structure having a certain curvature radius. Aspects are not limited thereto. As an example, the bending portion between the base member 531 and each of the first vibration transfer member 533a and the second vibration transfer member 533b may have an angled structure with an inflection point.

Each of the first vibration transfer member 533a and the second vibration transfer member 533b may be connected or coupled to the rear surface 100a of the display member 100 by a connection member 450. The first vibration transfer member 533a and the second vibration transfer member 533b may configure an air gap AG between the rear surface 100a of the display member 100 and the base member 531. Therefore, the first vibration transfer member 533a and the second vibration transfer member 533b may be configured at or connected to the first surface of the base member 531 in parallel with the air gap AG therebetween. For example, each of the first vibration transfer member 533a and the second vibration transfer member 533b may overlap or not overlap the one or more vibration generating parts 510, based on a size of the base member 531 and/or a size of and a location of the one or more vibration generating parts 510. But aspects of the present disclosure are not limited thereto.

According to an aspect of the present disclosure, the vibration transfer member 533 of the vibration apparatus 500 may be connected to the display member 100 by a partial connection scheme based on the connection member 450, and thus, compared to an entire connection scheme between the vibration transfer part 530 and the display member 100 by the connection member 450, a connection process (or attachment process) and connection quality (or attachment performance) between the display member 100 and the vibration apparatus 500 may be improved.

Figure 11:
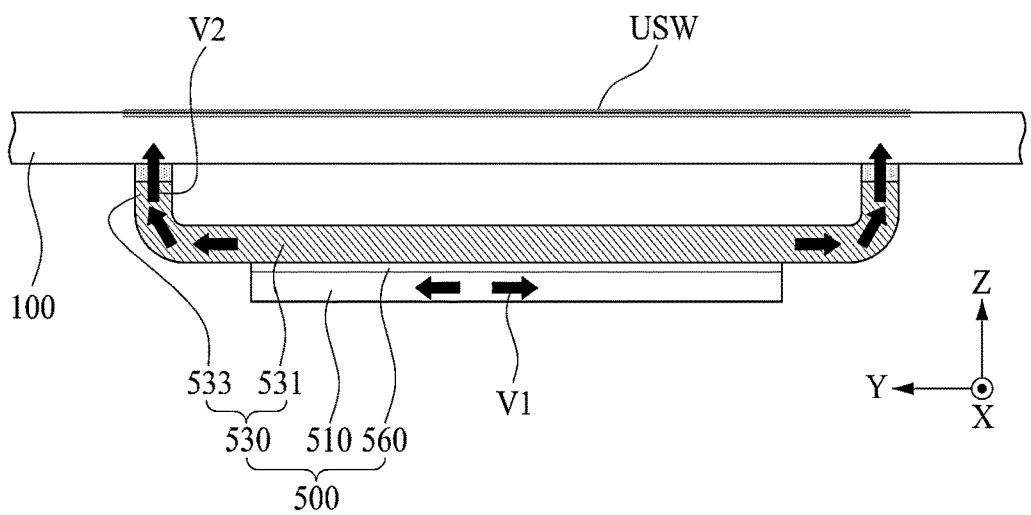
FIG. 11 illustrates vibration transmission by a vibration transfer part according to an aspect of the present disclosure.

The vibration transfer member 533 or the first and second vibration transfer members 533a and 533b according to an aspect of the present disclosure, as illustrated in FIG. 11, may convert a vibration (or lateral-direction vibration) V1 of the one or more vibration generating parts 510 into a normal-direction vibration with respect to a surface of the vibration generating part 510 or a thickness-direction vibration (or longitudinal-direction vibration) V2 of the display member 100 and may transfer the normal-direction vibration or the thickness-direction vibration V2 of the one or more vibration generating parts 510 to the display member 100, and thus, may increase the efficiency of a squeeze film effect generated based on a vibration of the display member 100. Accordingly, a vibration displacement (or vibration efficiency) of a thickness-direction of the display member 100 may be enhanced based on a longitudinal-direction vibration transferred through the vibration transfer part 530, and an intensity of the ultrasonic USW generated based on a vibration of the display member 100 may increase, thereby increasing (or maximizing) a squeeze film effect obtained based on a vibration of the display member 100. Therefore, the recognition by a user on an ultrasonic vibration or an ultrasonic haptic and/or a virtual texture may be enhanced.

Figure 12:
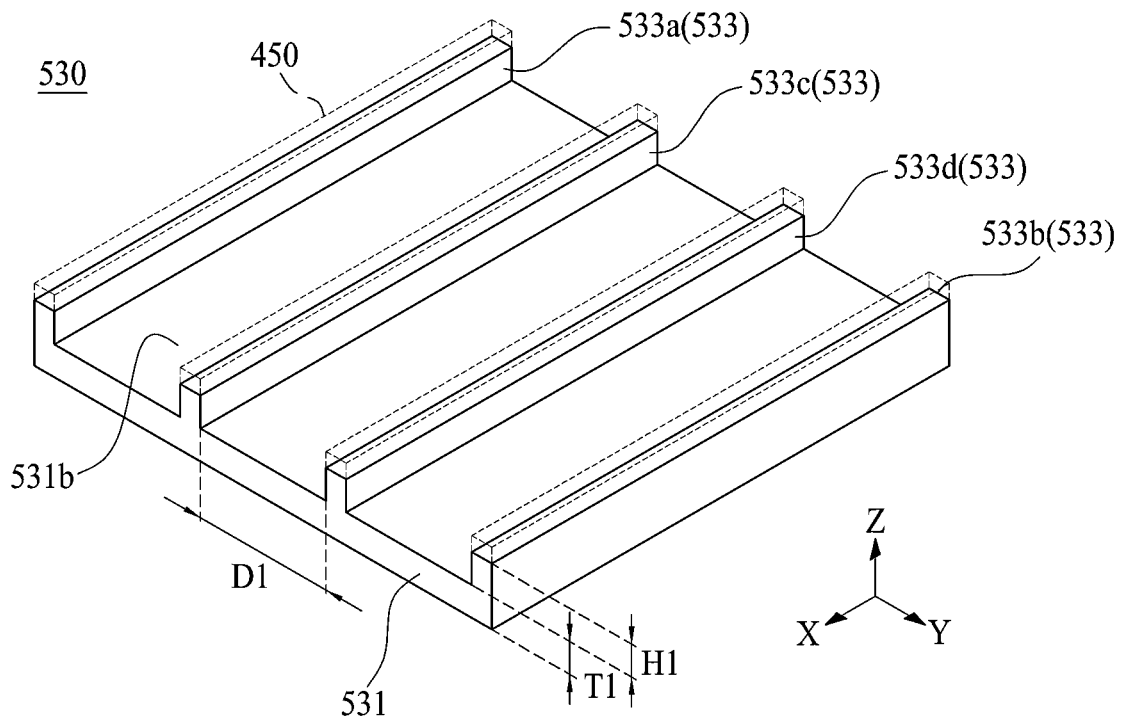
FIG. 12 is a perspective view illustrating a vibration transfer part according to another aspect of the present disclosure.

FIG. 12 is a perspective view illustrating a vibration transfer part according to another aspect of the present disclosure. FIG. 12 illustrates an aspect implemented by modifying the vibration transfer member illustrated in FIG. 10 according to another aspect of the present disclosure.

With reference to FIGS. 6, 7, and 12, a vibration transfer part 530 according to another aspect of the present disclosure may include a base member 531 and a vibration transfer member 533.

The base member 531 may be configured to support one or more vibration generating parts 510. For example, the base member 531 may be a same or substantially a same as the base member 531 described above with reference to FIG. 10, and thus, repeated descriptions thereof are omitted or briefly given. The descriptions of the base member 531 described above with reference to FIG. 10 may be included in descriptions of the base member 531 illustrated in FIG. 12.

The vibration transfer member 533 may be configured to transfer a vibration of the base member 531 based on a vibration of the one or more vibration generating parts 510 to a display member 100.

The vibration transfer member 533 according to another aspect of the present disclosure may include a plurality of vibration transfer members 533a to 533d. For example, the vibration transfer part 530 may include four vibration transfer members 533a to 533d. For example, the vibration transfer part 530 may include first to fourth vibration transfer members 533a to 533d. Each of the plurality of vibration transfer members 533a to 533d or the first to fourth vibration transfer members 533a to 533d may be connected or coupled to a rear surface 100a of the display member 100, for example, by a connection member 450. But aspects of the present disclosure are not limited thereto.

The first to fourth vibration transfer members 533a to 533d may have a certain width in a direction parallel to a second direction Y and may include a line shape which extends along a first direction X. The first to fourth vibration transfer members 533a to 533d may be spaced apart from one another in the second direction Y. The first to fourth vibration transfer members 533a to 533d may be configured at or connected to a predetermined position of a second surface 531b of the base member 531. As an example, the certain widths of the first to fourth vibration transfer members 533a to 533d in the direction Y may be the same as each other, or may be different from each other. As an example, the certain width of each of the first to fourth vibration transfer members 533a to 533d may be constant along the first direction X, or may be varied along the first direction X.

The first and second vibration transfer members 533a and 533b may be configured at or connected to both periphery portions or both end portions of the base member 531. For example, the first and second vibration transfer members 533a and 533b may be a same or substantially a same as the first and second vibration transfer members 533a and 533b described above with reference to FIG. 10, and thus, repeated descriptions thereof are omitted or briefly given. The descriptions of the first and second vibration transfer members 533a and 533b described above with reference to FIG. 10 may be included in descriptions of the first and second vibration transfer members 533a and 533b illustrated in FIG. 12.

The third and fourth vibration transfer members 533c and 533d may be configured between the first and second vibration transfer members 533a and 533b. For example, the third and fourth vibration transfer members 533c and 533d may be configured at or connected to a second surface 531b of the base member 531 corresponding to a center portion of the base member 531. The third and fourth vibration transfer members 533c and 533d may protrude from the second surface 531b of the base member 531 corresponding to a portion (e.g., the center portion) of the base member 531 between the both periphery portions or both end portions of the base member 531.

The third vibration transfer member 533c may be configured between the first and fourth vibration transfer members 533a and 533d. For example, the third vibration transfer member 533c may protrude from the second surface 531b of the base member 531 corresponding to a region between the first and fourth vibration transfer members 533a and 533d. But aspects of the present disclosure are not limited thereto.

The fourth vibration transfer member 533d may be configured between the second and third vibration transfer members 533b and 533c. For example, the fourth vibration transfer member 533d may protrude from the second surface 531b of the base member 531 corresponding to a region between the second and third vibration transfer members 533b and 533c. But aspects of the present disclosure are not limited thereto.

Distances (or intervals) DI between the first to fourth vibration transfer members 533a to 533d may be a same or differ. Each of the first to fourth vibration transfer members 533a to 533d may be configured to have a same first height (or thickness) H1, without being limited thereto. As an example, at least one of the first to fourth vibration transfer members 533a to 533d may be configured to have a different first height (or thickness) H1 from that of the other vibration transfer members.

A position of each of the first to fourth vibration transfer members 533a to 533d connected to the base member 531 may be adjusted by tuning of an ultrasonic frequency based on a number of first to fourth vibration transfer members 533a to 533d, a resonance frequency of the display member 100, and a thickness T1 of the base member 531. For example, the position of each of the first to fourth vibration transfer members 533a to 533d may be adjusted so that an offset vibration by the first to fourth vibration transfer members 533a to 533d does not occur in vibration of the display member 100 or the base member 531. But aspects of the present disclosure are not limited thereto.

Figure 13:
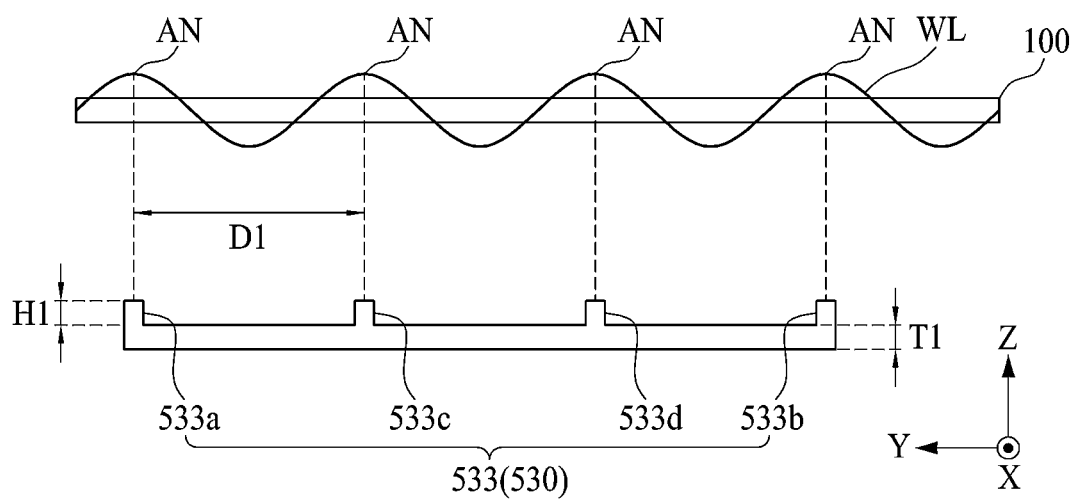
FIG. 13 illustrates the positioning of each of the plurality of vibration transfer members illustrated in FIG. 12 according to another aspect of the present disclosure.

The position of each of the first to fourth vibration transfer members 533a to 533d according to an aspect of the present disclosure, as illustrated in FIG. 13, may be adjusted to correspond to an antinode AN where a vibration displacement of each of the base member 531 or the one or more vibration generating parts 510 is the maximum. For example, the distance (or interval) DI of each of the first to fourth vibration transfer members 533a to 533d may be adjusted to correspond to an even multiple "$2n \times \lambda/2$" (where n may be a natural number) of a half wavelength (or ½ of a wavelength) "$\lambda/2$" of the display member 100, based on a wavelength length WL of the display member 100. For example, the wavelength length WL of the display member 100 may be calculated based on a wavelength speed of the display member 100. But aspects of the present disclosure are not limited thereto.

The vibration transfer member 533 according to another aspect of the present disclosure may include the first to fourth vibration transfer members 533a to 533d, and thus, may increase (or maximize) a squeeze film effect generated based on a vibration of the display member 100 like the vibration transfer member 533 according to an aspect of the present disclosure described with reference to FIG. 10, thereby enhancing the recognition of a user on an ultrasonic vibration or an ultrasonic haptic and/or a virtual texture. Moreover, the vibration transfer member 533 according to another aspect of the present disclosure may include the first to fourth vibration transfer members 533a to 533d, and thus, may increase a vibration force (or displacement force) transferred to the display member 100, based on a vibration of the one or more vibration generating parts 510 and may change a vibration mode shape of the display member 100. Accordingly, an average vibration displacement amount per unit area of the display member 100 may be maintained, and a frequency of an ultrasonic USW generated based on a vibration of the display member 100 may increase. Although it is described or illustrated that there are two or four vibration transfer members in FIGS. 12 and 14, embodiments are not limited thereto. As an example, there could be three vibration transfer members or more than four vibration transfer members. As an example, there could be three vibration transfer members or more than four vibration transfer members, such that the distance (or interval) of each of the vibration transfer members may be adjusted to correspond to an even multiple "$2n \times \lambda/2$" (where n may be a natural number) of a half wavelength (or ½ of a wavelength) "$\lambda/2$" of the display member 100, without being limited thereto.

Figure 14:
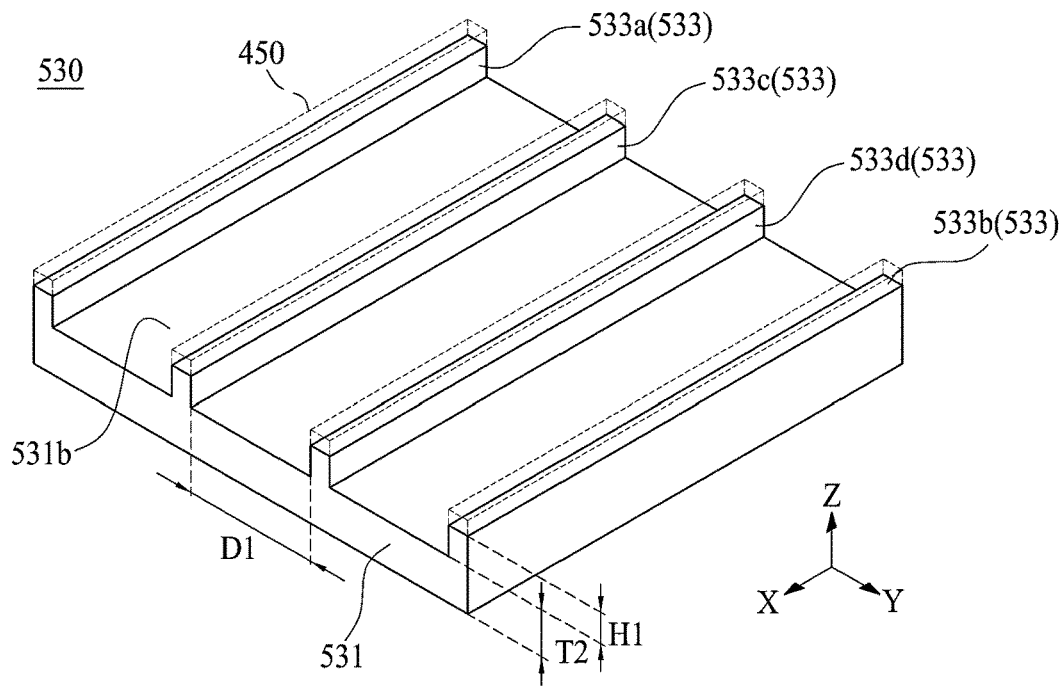
FIG. 14 is a perspective view illustrating a vibration transfer part according to another aspect of the present disclosure.

FIG. 14 is a perspective view illustrating a vibration transfer part according to another aspect of the present disclosure. FIG. 14 illustrates an aspect implemented by modifying the base member illustrated in FIG. 12 according to another aspect of the present disclosure.

With reference to FIGS. 6, 7, and 14, a vibration transfer part 530 according to another aspect of the present disclosure may include a base member 531 and a vibration transfer member 533.

The base member 531 may be configured to support one or more vibration generating parts 510. For example, except for that the base member 531 have a second thickness T2, the base member 531 may be a same or substantially a same as the base member 531 described above with reference to FIG. 10, and thus, repeated descriptions thereof are omitted or briefly given. The descriptions of the base member 531 described above with reference to FIG. 10 may be included in descriptions of the base member 531 illustrated in FIG. 14.

The second thickness T2 of the base member 531 may be adjusted by tuning of an ultrasonic frequency. For example, the second thickness T2 of the base member 531 may be thicker than the first thickness T1 of the base member 531 described above with reference to FIG. 10 or 12. For example, the first thickness T1 of the base member 531 may be 0.5 mm and the second thickness T2 of the base member 531 may be 1.0 mm, but aspects of the present disclosure are not limited thereto. For example, the second thickness T2 of the base member 531 may be any one different from the first thickness T1 of 0.1 mm to 5.0 mm.

A wavelength length of the display member 100 may decrease based on an increase in wavelength speed of the display member 100 caused by an increase in thickness of the base member 531. Accordingly, a frequency of an ultrasonic USW generated based on a vibration of the display member 100 may increase. But aspects of the present disclosure are not limited thereto.

The vibration transfer member 533 may include first to fourth vibration transfer members 533a to 533d. The first to fourth vibration transfer members 533a to 533d may be a same or substantially a same as the first to fourth vibration transfer members 533a to 533d described above with reference to FIG. 12, and thus, repeated descriptions thereof are omitted or briefly given. The descriptions of the first to fourth vibration transfer members 533a to 533d described above with reference to FIG. 12 may be included in descriptions of the first to fourth vibration transfer members 533a to 533d illustrated in FIG. 14.

The vibration transfer part 530 according to another aspect of the present disclosure may include the base member 531 having the second thickness T2 and first to fourth vibration transfer members 533a to 533d, and thus, may have a same effect as the vibration transfer member 533 according to an aspect of the present disclosure described above with reference to FIG. 10 or 12.

Figure 15:
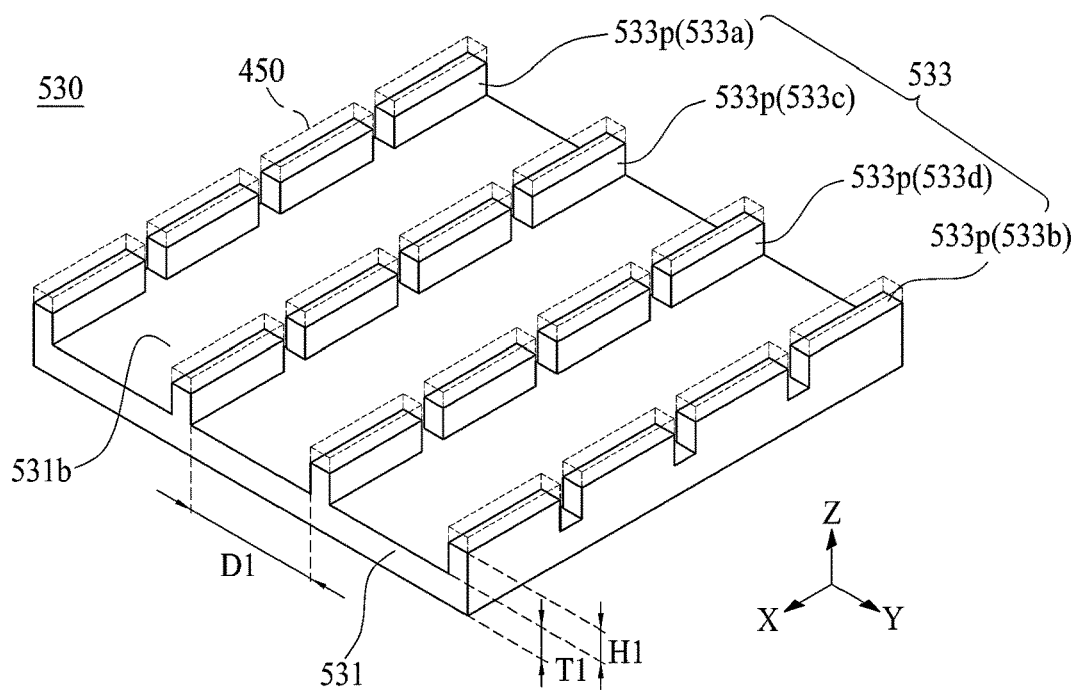
FIG. 15 is a perspective view illustrating a vibration transfer part according to another aspect of the present disclosure.

FIG. 15 is a perspective view illustrating a vibration transfer part according to another aspect of the present disclosure. FIG. 15 illustrates an aspect implemented by modifying the vibration transfer member illustrated in FIG. 12 according to another aspect of the present disclosure.

With reference to FIGS. 6, 7, and 15, a vibration transfer part 530 according to another aspect of the present disclosure may include a base member 531 and a vibration transfer member 533.

The base member 531 may be configured to support one or more vibration generating parts 510. For example, e the base member 531 may be a same or substantially a same as the base member 531 described above with reference to FIG. 10, and thus, repeated descriptions thereof are omitted or briefly given. The descriptions of the base member 531 described above with reference to FIG. 10 may be included in descriptions of the base member 531 illustrated in FIG. 15.

The vibration transfer member 533 may include a plurality of vibration transfer members 533a to 533d or first to fourth vibration transfer members 533a to 533d. Each of the plurality of vibration transfer members 533a to 533d or the first to fourth vibration transfer members 533a to 533d may connected or coupled to a rear surface 100a of a display member 100 by a connection member 450. But aspects of the present disclosure are not limited thereto.

A position of each of the first to fourth vibration transfer members 533a to 533d connected to the base member 531 and a distance (or interval) DI between the first to fourth vibration transfer members 533a to 533d may be a same as or substantially a same as the first to fourth vibration transfer members 533a to 533d described above with reference to FIG. 12, and thus, repeated descriptions thereof are omitted or briefly given. The descriptions of the first to fourth vibration transfer members 533a to 533d described above with reference to FIG. 12 may be included in descriptions of the first to fourth vibration transfer members 533a to 533d illustrated in FIG. 15.

Each of the first to fourth vibration transfer members 533a to 533d according to another aspect of the present disclosure may include at least one or more transfer portions (or transfer parts) 533p.

The at least one or more transfer portions 533p may correspond to each of the first to fourth vibration transfer members 533a to 533d. The at least one or more transfer portions 533p may be configured to have a certain interval (or distance). For example, the at least one or more transfer portions 533p may be configured to have the certain interval (or distance) and a certain length along a first direction X. As an example, the at least one or more transfer portions 533p may have a same height H1, without being limited thereto. As an example, at least one of the at least one or more transfer portions 533p may have a different height from that of the remaining transfer portions. Each of the at least one or more transfer portions 533p may be connected or coupled to the rear surface 100a of the display member 100 by a connection member 450. For example, the at least one or more transfer portions 533p may have at least one or more transfer pattern, but aspects of the present disclosure are not limited thereto.

The first to fourth vibration transfer members 533a to 533d having the at least one or more transfer portions 533p may be arranged in a lattice shape at a second surface 531b of the base member 531.

The vibration transfer member 533 according to another aspect of the present disclosure may include the first to fourth vibration transfer members 533a to 533d having the at least one or more transfer portions 533p, and thus, may increase (or maximize) a squeeze film effect generated based on a vibration of the display member 100 like the vibration transfer member 533 according to an aspect of the present disclosure described with reference to FIG. 10, thereby enhancing the recognition of a user on an ultrasonic vibration or an ultrasonic haptic and/or a virtual texture. Moreover, the vibration transfer member 533 according to another aspect of the present disclosure may include the first to fourth vibration transfer members 533a to 533d having the at least one or more transfer portions 533p, and thus, may increase a vibration force (or displacement force) transferred to the display member 100, based on a vibration of the one or more vibration generating parts 510 and may change a vibration mode shape of the display member 100. Accordingly, an average vibration displacement amount per unit area of the display member 100 may be maintained, and a frequency of an ultrasonic USW generated based on a vibration of the display member 100 may increase.

Figure 16:
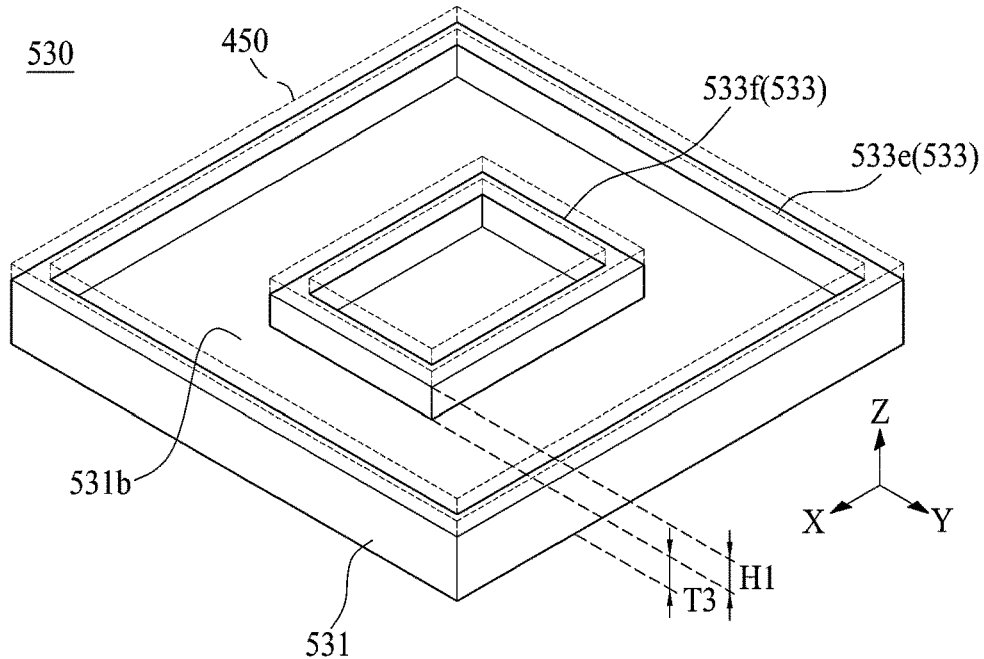
FIG. 16 is a perspective view illustrating a vibration transfer part according to another aspect of the present disclosure.

FIG. 16 is a perspective view illustrating a vibration transfer part according to another aspect of the present disclosure. FIG. 16 illustrates an aspect implemented by modifying the vibration transfer member illustrated in FIG. 10 according to another aspect of the present disclosure.

With reference to FIGS. 6, 7, and 16, a vibration transfer part 530 according to another aspect of the present disclosure may include a base member 531 and a vibration transfer member 533.

The base member 531 may be configured to support one or more vibration generating parts 510. For example, the base member 531 may be a same or substantially a same as the base member 531 described above with reference to FIG. 10, and thus, repeated descriptions thereof are omitted, or briefly given. The descriptions of the base member 531 described above with reference to FIG. 10 may be included in descriptions of the base member 531 illustrated in FIG. 16.

The base member 531 may be configured to have a third thickness T3. The third thickness T3 of the base member 531 may be a same as or different from the first thickness T1 of the base member 531 illustrated in FIG. 3. For example, the third thickness T3 of the base member 531 may be smaller or greater than the first thickness T1 of the base member 531 illustrated in FIG. 10.

The vibration transfer member 533 according to another aspect of the present disclosure may include a plurality of vibration transfer members 533e and 533f having a band shape. For example, the vibration transfer member 533 may include a first vibration transfer member 533e and a second vibration transfer member 533f. Each of the first vibration transfer member 533e and the second vibration transfer member 533f may be connected or coupled to the rear surface 100a of the display member 100 by a connection member 450. Although it is illustrated in FIG. 16 that there are two vibration transfer members, there could be more than two vibration transfer members.

The first vibration transfer member 533e may be configured along a periphery portion of the base member 531. For example, the first vibration transfer member 533e may be configured or connected to the periphery portion of the base member 531. For example, the first vibration transfer member 533e may be configured at or connected to a periphery portion of a second surface 531b of the base member 531. For example, the first vibration transfer member 533e may have a shape corresponding to the periphery portion of the base member 531. For example, the first vibration transfer member 533e may have a band shape (or a ring shape) corresponding to the periphery portion of the base member 531. For example, the first vibration transfer member 533e may have a tetragonal band shape, a tetragonal ring shape, or a tetragonal closed loop shape, but aspects of the present disclosure are not limited thereto. As an example, at least a portion of the first vibration transfer member 533e may open.

For example, the second vibration transfer member 533f may be configured at or connected to a middle portion of the base member 531. For example, the second vibration transfer member 533f may be configured at or connected to a middle portion between a center portion and a periphery portion of the base member 531. For example, the second vibration transfer member 533f may be configured at or connected to a middle portion of the base member 531. For example, the second vibration transfer member 533f may be surrounded by the first vibration transfer member 533e. For example, the second vibration transfer member 533f may be configured at the middle portion of the second surface 531b of the base member 531 to surround the center portion of the base member 531 and to be surrounded by the first vibration transfer member 533e. For example, the second vibration transfer member 533f may have a tetragonal band shape, a tetragonal ring shape, or a tetragonal closed loop shape, but aspects of the present disclosure are not limited thereto. As an example, the second vibration transfer member 533f may be configured at or connected to a portion displaced from the middle portion of the base member 531. As an example, at least a portion of the second vibration transfer member 533f may open.

According to another aspect of the present disclosure, the first vibration transfer member 533e and the second vibration transfer member 533f may be configured to have a concentric shape, without being limited thereto. For example, the first vibration transfer member 533e and the second vibration transfer member 533f may have a same center point and different sizes. As an example, the first vibration transfer member 533e and the second vibration transfer member 533f may be configured to have a concentric tetragonal ring shape. As an example, the first vibration transfer member 533e and the second vibration transfer member 533f may be configured to have a concentric circular shape. For example, the first vibration transfer member 533e and the second vibration transfer member 533f may include a circular shape or an oval shape, which has a same center point and different diameters. Accordingly, a vibration transferred to the display member 100 by the first vibration transfer member 533e and the second vibration transfer member 533f having a circular shape may have a circular mode shape, and thus, a vibration characteristic of the display member 100 may be enhanced.

The vibration transfer member 533 according to another aspect of the present disclosure may include the plurality of vibration transfer members 533e and 533f having a same shape, and thus, may increase (or maximize) a squeeze film effect generated based on a vibration of the display member 100 like the vibration transfer member 533 according to an aspect of the present disclosure described with reference to FIG. 10, thereby enhancing the recognition of a user on an ultrasonic vibration or an ultrasonic haptic and/or a virtual texture. The vibration transfer member 533 according to another aspect of the present disclosure may include the plurality of vibration transfer members 533e and 533f having the band shape, and thus, may increase (or maximize) a squeeze film effect generated based on a vibration of the display member 100 like the vibration transfer member 533 according to an aspect of the present disclosure described with reference to FIG. 10, thereby enhancing the recognition of a user on an ultrasonic vibration or an ultrasonic haptic and/or a virtual texture. Moreover, the vibration transfer member 533 according to another aspect of the present disclosure may include the plurality of vibration transfer members 533e and 533f having a same shape, and thus, may increase a vibration force (or displacement force) transferred to the display member 100, based on a vibration of the one or more vibration generating parts 510 and may change a vibration mode shape of the display member 100.

Accordingly, an average vibration displacement amount per unit area of the display member 100 may be maintained, and a frequency of an ultrasonic USW generated based on a vibration of the display member 100 may increase. Furthermore, the vibration transfer member 533 according to another aspect of the present disclosure may include the plurality of vibration transfer members 533e and 533f having the band shape, and thus, may increase a vibration force (or displacement force) transferred to the display member 100, based on a vibration of the one or more vibration generating parts 510 and may change a vibration mode shape of the display member 100. Accordingly, an average vibration displacement amount per unit area of the display member 100 may be maintained, and a frequency of an ultrasonic USW generated based on a vibration of the display member 100 may increase.

Figure 17:
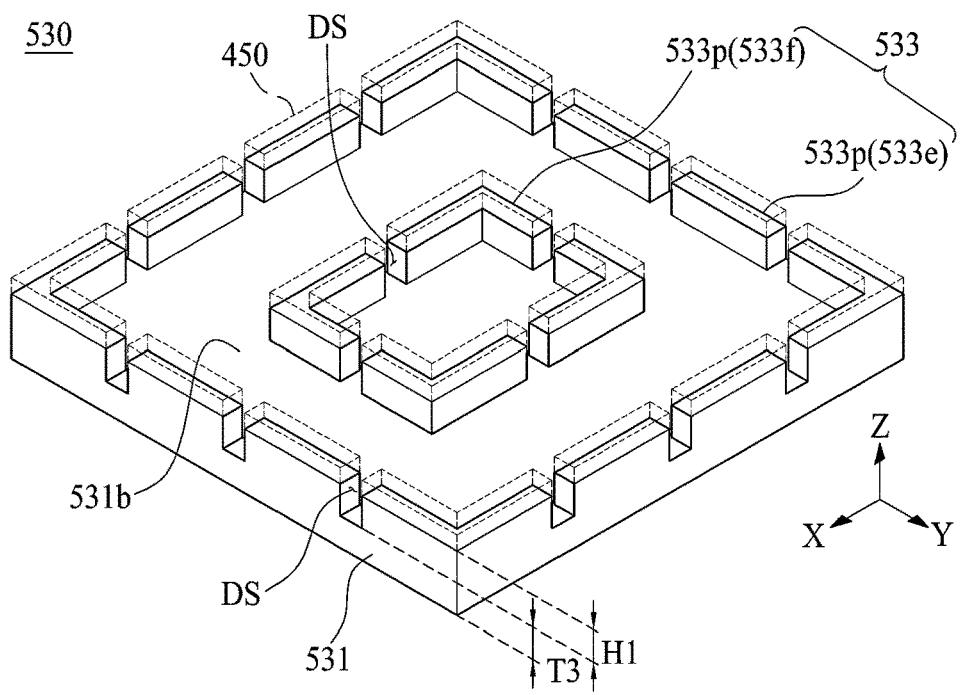
FIG. 17 illustrates a display apparatus according to another aspect of the present disclosure.

According to another aspect of the present disclosure, at least one of or each of the plurality of vibration transfer members 533e and 533f or the first and second vibration transfer members 533e and 533f, as illustrated in FIG. 17, may include at least one or more transfer portions 533p.

The at least one or more transfer portions 533p may correspond to each of the first vibration transfer member 533e and the second vibration transfer member 533f. As an example, the at least one or more transfer portions 533p may correspond to at least a portion of at least one of the first vibration transfer member 533e and the second vibration transfer member 533f. For example, the at least one or more transfer portions 533p may be configured to have a certain interval (or distance). For example, the at least one or more transfer portions 533p may be configured to have varied intervals (or distances). For example, the at least one or more transfer portions 533p may be disposed or configured to be spaced apart from each other along a length direction. Each of the at least one or more transfer portions 533p may be configured to have a line shape having a certain length, but aspects of the present disclosure are not limited thereto. As an example, the at least one or more transfer portions 533p may be configured to have a line shape having varied lengths. The at least one or more transfer portions 533p may have a same height H1, without being limited thereto. As an example, at least one of the at least one or more transfer portions 533p may have a different height from the remaining transfer portions.

A separation space DS between the at least one or more transfer portions 533p may configure an air duct or a vent area corresponding to a space surrounded by each of the first vibration transfer member 533e and the second vibration transfer member 533f. Therefore, heat concentrating on a region of the display member 100 corresponding to (or overlapping with) a space surrounded by each of the first vibration transfer member 533e and the second vibration transfer member 533f may be dispersed, and thus, an image quality defect such as smears or the like caused by an increase in temperature in a local region of the display member 100 may be reduced or prevented.

Figure 18:
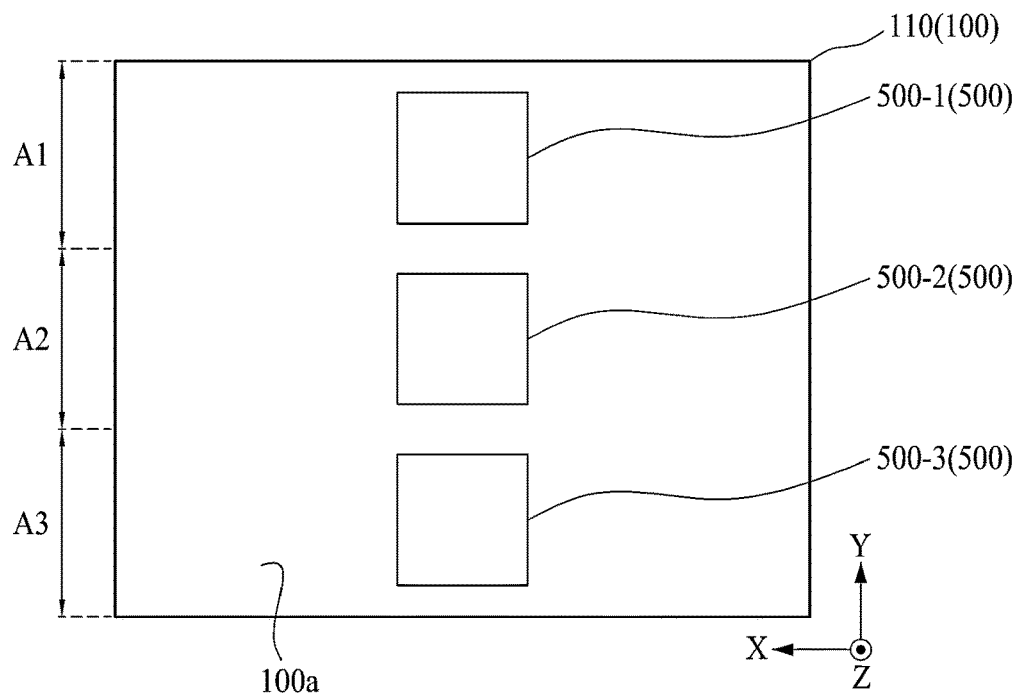
FIG. 18 illustrates a display apparatus according to another aspect of the present disclosure.

FIG. 18 illustrates a display apparatus according to another aspect of the present disclosure. FIG. 18 is a rear view illustrating a display member and a plurality of vibration apparatuses in a display apparatus according to another aspect of the present disclosure. FIG. 18 illustrates an aspect implemented by modifying the vibration apparatus described with reference to FIGS. 1 to 17. In the following descriptions, therefore, the other elements except the vibration apparatus and relevant elements are referred to by like reference numerals, and thus, repeated descriptions thereof are omitted or briefly given.

With reference to FIG. 18, in a display apparatus according to another aspect (or a third aspect) of the present disclosure, a vibration apparatus 500 may include a plurality of vibration generating apparatuses 500-1, 500-2, and 500-3. For example, the vibration apparatus 500 may include first to third vibration generating apparatuses 500-1, 500-2, and 500-3. For example, the vibration apparatus 500 may include a plurality of ultrasonic generating apparatuses or first to third ultrasonic generating apparatuses 500-1, 500-2, and 500-3. For example, according to FIGS. 2 and 18, the display apparatus according to another aspect of the present disclosure may include one or more vibration apparatuses (or vibration generating apparatuses) 500 or one or more ultrasonic generating apparatuses 500-1, 500-2, and 500-3.

The first to third vibration generating apparatuses 500-1, 500-2, and 500-3 may be configured to be connected to first to third regions (or rear regions) A, A2, and A3 of a display member 100.

In the display member 100, with respect to a second direction Y, the first region (or first rear region) A1 may be an upper region or a top region of the display member 100. The second region (or second rear region) A2 may be a center region or a middle region of the display member 100. The third region (or third rear region) A3 may be a lower region or a bottom region of the display member 100. For example, the second region A2 may be between the first region A1 and the third region A3. The display member 100 may include a plurality of haptic regions (or ultrasonic generating regions) respectively overlapping or corresponding to the first to third regions A1, A2, and A3. But aspects of the present disclosure are not limited thereto.

The first vibration generating apparatus 500-1 may be configured to generate (or output) an ultrasonic vibration or an ultrasonic haptic in the first region A1 of the display member 100. The first vibration generating apparatus 500-1 may vibrate based on a driving signal supplied from a driving circuit part to vibrate the first region A1 of the display member 100, and thus, may generate (or output) an ultrasonic USW in the first region A1 of the display member 100.

The second vibration generating apparatus 500-2 may be configured to generate (or output) an ultrasonic vibration or an ultrasonic haptic in the second region A2 of the display member 100. The second vibration generating apparatus 500-2 may vibrate based on a driving signal supplied from a driving circuit part to vibrate the second region A2 of the display member 100, and thus, may generate (or output) an ultrasonic USW in the second region A2 of the display member 100. But aspects of the present disclosure are not limited thereto.

The third vibration generating apparatus 500-3 may be configured to generate (or output) an ultrasonic vibration or an ultrasonic haptic in the third region A3 of the display member 100. The third vibration generating apparatus 500-3 may vibrate based on a driving signal supplied from a driving circuit part to vibrate the third region A3 of the display member 100, and thus, may generate (or output) an ultrasonic USW in the third region A3 of the display member 100. But aspects of the present disclosure are not limited thereto.

Each of the plurality of vibration apparatuses or the first to third vibration generating apparatuses 500-1, 500-2, and 500-3 may be connected to or supported by a rear surface 100a of the display member 100 by a fixing member (see 400 of FIG. 2) or a connection member (see 450 of FIG. 6). For example, each of the plurality of vibration apparatuses or the first to third vibration generating apparatuses 500-1, 500-1, and 500-3 may be connected to or supported by a rear surface 100a of the display panel 100 by the fixing member (see 400 of FIG. 2) or the connection member (see 450 of FIG. 6). For example, each of the plurality of vibration apparatuses or the first to third vibration generating apparatuses 500-1, 500-2, and 500-3 may be configured on a same line. For example, the plurality of vibration apparatuses or the first to third vibration generating apparatuses 500-1, 500-1, and 500-3 may be configured on the same line, with respect to the second direction Y. Aspects are not limited thereto. As an example, at least one of the first to third vibration generating apparatuses 500-1, 500-2, and 500-3 may be configured in a different line. Although it is illustrated in FIG. 18 that three vibration generating apparatuses 500-1, 500-2, and 500-3 are configured to be connected to first to third regions (or rear regions) A1, A2, and A3 of a display member 100, embodiments are not limited thereto. As an example, more than three vibration generating apparatuses may be configured, at various regions of the display member 100.

Each of the plurality of vibration apparatuses or the first to third vibration generating apparatuses 500-1, 500-2, and 500-3 may include a same as or substantially a same configuration as the vibration apparatus described above with reference to FIGS. 1 to 17, and thus, repeated descriptions thereof are omitted or briefly given. The descriptions of configurations of the vibration apparatus described above with reference to FIGS. 1 to 17 may be included in descriptions of each of the plurality of vibration apparatuses or the first to third vibration generating apparatuses 500-1, 500-2, and 500-3 illustrated in FIG. 18.

Each of the plurality of vibration apparatuses or the first to third vibration generating apparatuses 500-1, 500-2, and 500-3 may be simultaneously driven, or may be individually driven, but aspects of the present disclosure are not limited thereto. For example, one or more of the plurality of vibration apparatuses or the first to third vibration generating apparatuses 500-1, 500-2, and 500-3 may be simultaneously driven based on a user touch region. For example, two or more vibration generating apparatuses 500-1, 500-2, and 500-3 overlapping the user touch region or disposed at a periphery of the touch region among the plurality of vibration apparatuses or the first to third vibration generating apparatuses 500-1, 500-2, and 500-3 may be simultaneously driven. Accordingly, a uniform ultrasonic vibration or an ultrasonic haptic may be generated in a user touch region and at a periphery thereof, and thus, a haptic effect and/or a virtual texture having a continuous without a pause or break may be continuously provided to the user.

The display apparatus according to the third aspect of the present disclosure may provide a same effect as the display apparatus according to the first and second aspects of the present disclosure. Moreover, the display apparatus according to the third aspect of the present disclosure may provide a haptic effect and/or a virtual texture to the user in an entire region through the plurality of vibration generating apparatuses 500-1, 500-2, and 500-3 without a dead zone, with respect to a surface of the display member 100

Figure 19:
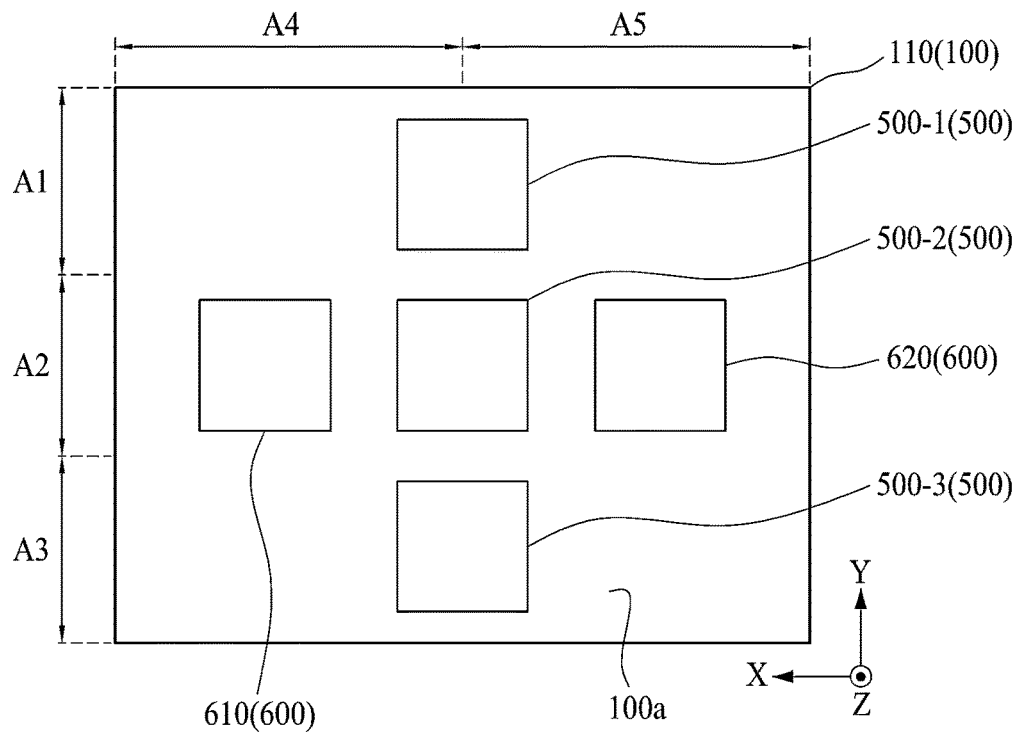
FIG. 19 illustrates a display apparatus according to another aspect of the present disclosure.

FIG. 19 illustrates a display apparatus according to another aspect of the present disclosure. FIG. 19 illustrates an aspect where an acoustic apparatus is additionally provided in the display apparatus described above with reference to FIG. 18. Therefore, in the following description, the other elements except an acoustic apparatus are referred to like reference numerals, and thus, repeated descriptions thereof are omitted or briefly given.

With reference to FIG. 19, a display apparatus according to another aspect (or a fourth aspect) of the present disclosure may further include an acoustic apparatus (or a sound apparatus) 600.

The acoustic apparatus 600 may vibrate a display member 100 to generate (or output) a sound. The acoustic apparatus 600 may be connected or coupled to a rear surface 100a of the display member 100. For example, the acoustic apparatus 600 may be connected or coupled to a rear surface 100a of the display panel 110.

The acoustic apparatus 600 according to an aspect of the present disclosure may include one or more sound generating apparatuses 610 and 620. For example, the acoustic apparatus 600 may include first and second sound generating apparatuses 610 and 620.

The acoustic apparatus 600 or the first and second sound generating apparatuses 610 and 620 may be configured to be connected to fourth and fifth regions (or rear regions) A4 and A5 of the display member 100, without being limited thereto.

In the display member 100, with respect to a first direction X, the fourth region (or fourth rear region) A4 may be a left region of the display member 100. The fifth region (or fifth rear region) A5 may be a right region of the display member 100. The display member 100 may include a plurality of sound regions (or sound generating region) which respectively overlap or correspond to the fourth and fifth regions A4 and A5. But aspects of the present disclosure are not limited thereto.

The first sound generating apparatus 610 may be disposed adjacent to the second vibration generating apparatus 500-2. For example, the first sound generating apparatus 610 may be configured to generate (or output) a sound in the fourth region A4 of the display member 100. The first sound generating apparatus 610 may vibrate based on a sound driving signal (or a voice signal) supplied from a driving circuit part to vibrate the fourth region A4 of the display member 100, and thus, may generate (or output) a first sound (or a left sound) in the fourth region A4 of the display member 100.

The second sound generating apparatus 620 may be disposed adjacent to the second vibration generating apparatus 500-2. For example, the second sound generating apparatus 620 may be configured to generate (or output) a sound in the fifth region A5 of the display member 100. The second sound generating apparatus 620 may vibrate based on a sound driving signal (or a voice signal) supplied from a driving circuit part to vibrate the fifth region A5 of the display member 100, and thus, may generate (or output) a second sound (or a right sound) in the fifth region A5 of the display member 100. But aspects of the present disclosure are not limited thereto.

The first and second sound generating apparatuses 610 and 620 may be disposed in a lateral (or left-right) symmetrical structure or a lateral (or left-right) asymmetrical structure with respect to a center portion of the display member 100. The first and second sound generating apparatuses 610 and 620 may be disposed in a lateral (or left-right) symmetrical structure or a lateral (or left-right) asymmetrical structure with respect to the second vibration generating apparatus 500-2. For example, the first sound generating apparatus 610, the second sound generating apparatus 620, and the second vibration generating apparatus 500-2 may be configured on a same line, without being limited thereto. As an example, the first sound generating apparatus 610, the second sound generating apparatus 620, and the second vibration generating apparatus 500-2 may be configured on different lines. For example, the first sound generating apparatus 610, the second sound generating apparatus 620, and the second vibration generating apparatus 500-2 may be configured on the same line, with respect to the second direction Y. For example, the first to third vibration generating apparatuses 500-1, 500-2, and 500-3 may be configured on the same line. For example, the first to third vibration generating apparatuses 500-1, 500-2, and 500-3 may be configured on the same line, with respect to the second direction Y. Although it is illustrated in FIG. 19 that there are two sound generating apparatuses respectively overlapping or corresponding to the fourth and fifth regions A4 and A5, embodiments are not limited thereto. As an example, more or less sound generating apparatuses may be disposed at any region of the display member 100.

The acoustic apparatus 600 or each of the first and second sound generating apparatuses 610 and 620 may be connected to or supported by a rear surface 100a of the display member 100 by a fixing member (see 400 of FIG. 2) or a connection member (see 450 of FIG. 6). For example, the acoustic apparatus 600 or each of the first and second sound generating apparatuses 610 and 620 may be connected to or supported by the rear surface 100a of the display panel 110 by the fixing member 400 or the connection member 450. But aspects of the present disclosure are not limited thereto.

The acoustic apparatus 600 or each of the first and second sound generating apparatuses 610 and 620 may be include a same as or substantially a same configuration as the vibration apparatus described above with reference to FIGS. 1 to 17, and thus, repeated descriptions thereof are omitted or briefly given. The descriptions of configurations of the vibration apparatus described above with reference to FIGS. 1 to 17 may be included in descriptions of the acoustic apparatus 600 or each of the first and second sound generating apparatuses 610 and 620 illustrated in FIG. 19. For example, the acoustic apparatus 600 or each of the first and second sound generating apparatuses 610 and 620 may include the vibration generating part 510 and the press structure 570 illustrated in FIG. 2. For example, the acoustic apparatus 600 or each of the first and second sound generating apparatuses 610 and 620 may include the vibration generating part 510, the vibration transfer part 530, and the press structure 570 illustrated in FIG. 6. For example, the acoustic apparatus 600 or each of the first and second sound generating apparatuses 610 and 620 may include the vibration generating part 510 and the press structure 570 illustrated in FIG. 2. For example, the acoustic apparatus 600 or each of the first and second sound generating apparatuses 610 and 620 may include the vibration generating part 510 and one or more of the press structure 570 and the vibration transfer part 530 of the vibration apparatus 500 described above with reference to FIGS. 1 to 17. Aspects are not limited thereto. As an example, the acoustic apparatus 600 or each of the first and second sound generating apparatuses 610 and 620 may include a different configuration from the vibration apparatus described above with reference to FIGS. 1 to 17. As an example, the acoustic apparatus 600 or each of the first and second sound generating apparatuses 610 and 620 may vibrate a separate vibration plate other than the display module, and/or may be a conventional speaker, without being limited thereto.

According to another aspect of the present disclosure, the acoustic apparatus 600 or each of the first and second sound generating apparatuses 610 and 620 may be configured to include only the vibration generating part 510 without the vibration transfer part 530 and/or the press structure 570 of the vibration apparatus described above with reference to FIGS. 1 to 17. For example, the acoustic apparatus 600 or each of the first and second sound generating apparatuses 610 and 620 may include the vibration generating part 510 described above with reference to FIG. 2. The vibration generating part 510 of the acoustic apparatus 600 or each of the first and second sound generating apparatuses 610 and 620 may be connected or coupled to the rear surface 100a of the display member 100 by a connection member 580.

The display apparatus according to the fourth aspect of the present disclosure may provide a same effect as the display apparatus according to the first to third aspects of the present disclosure. Moreover, the display apparatus according to the fourth aspect of the present disclosure may output a sound, generated based on a vibration of the display member 100 by a vibration of the acoustic apparatus 600 or the first and second sound generating apparatuses 610 and 620, in a forward direction of the display member 100 and may output a sound including a stereo sound in the forward direction of the display member 100, based on first and second sounds based on vibrations of the first and second sound generating apparatuses 610 and 620. But aspects of the present disclosure are not limited thereto.

Figure 20:
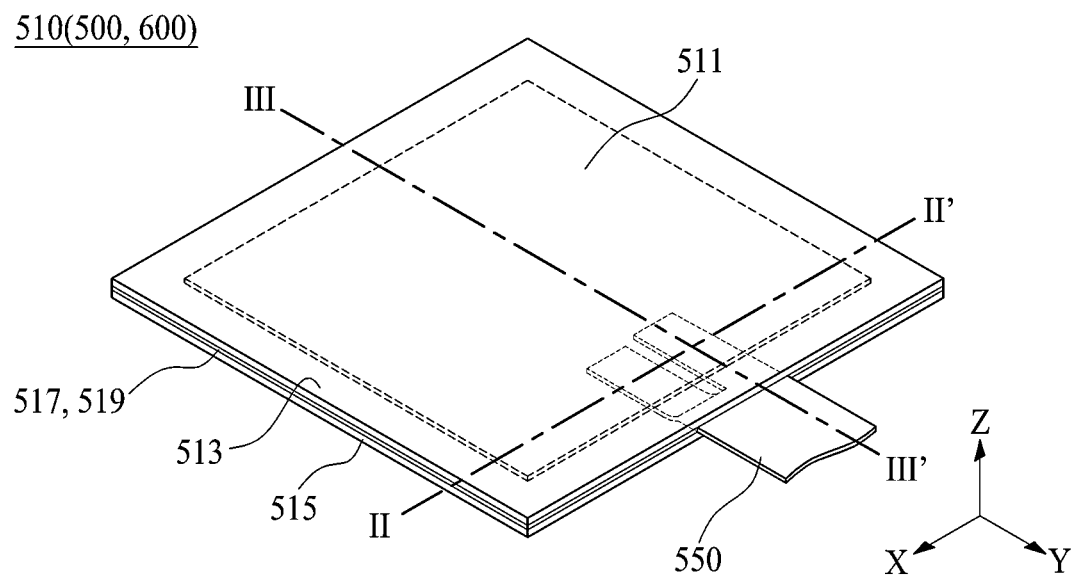
FIG. 20 illustrates a vibration generating part according to an aspect of the present disclosure.
Figure 21:
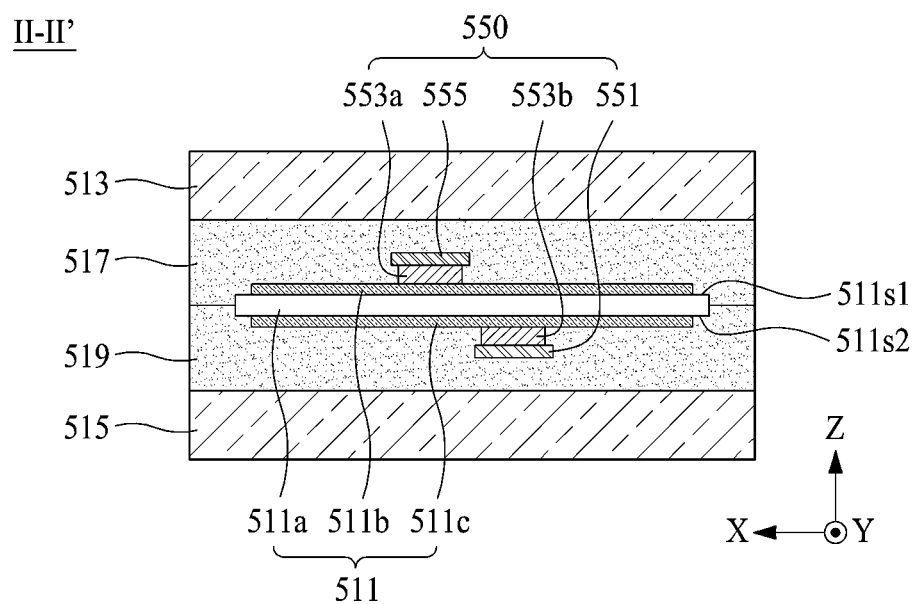
FIG. 21 is a cross-sectional view of a vibration generating part taken along line II-II' illustrated in FIG. 20 according to an aspect of the present disclosure.
Figure 22:
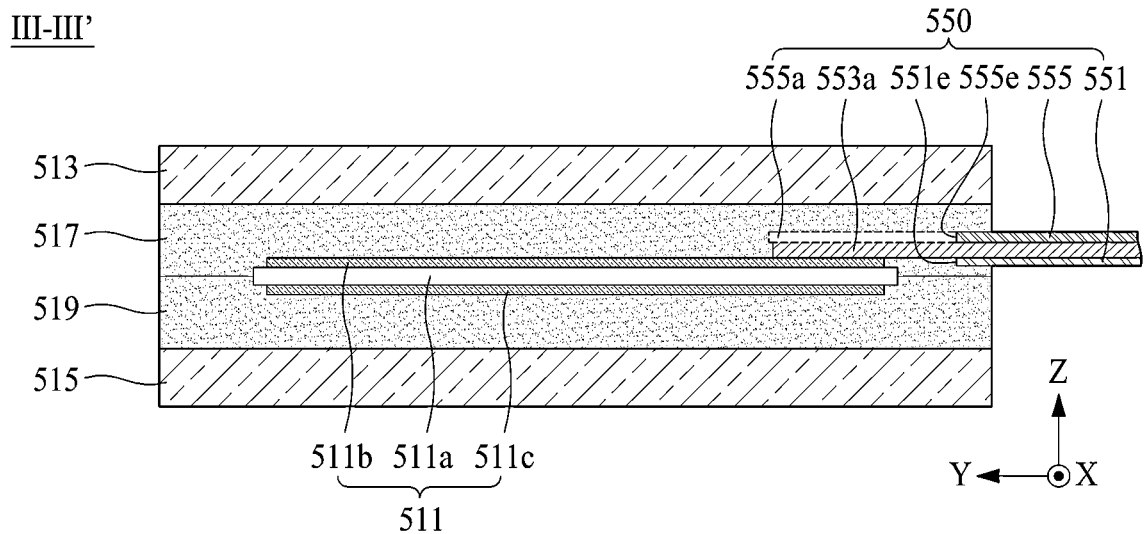
FIG. 22 is a cross-sectional view of a vibration generating part taken along line III-III' illustrated in FIG. 20 according to an aspect of the present disclosure.

FIG. 20 illustrates a vibration generating part according to an aspect of the present disclosure. FIG. 21 is a cross-sectional view of a vibration generating part taken along line II-II' illustrated in FIG. 20 according to an aspect of the present disclosure. FIG. 22 is a cross-sectional view of a vibration generating part taken along line III-III' illustrated in FIG. 20 according to an aspect of the present disclosure. FIGS. 20 to 22 illustrate the vibration generating part of each of the vibration apparatus and the acoustic apparatus described above with reference to FIGS. 1 to 19.

With reference to FIGS. 20 to 22, the vibration generating part 510 of each of the vibration apparatus 500 and the acoustic apparatus 600 according to an aspect of the present disclosure may include a vibration part 511.

The vibration part 511 may be configured to vibrate by a piezoelectric effect based on a driving signal. The vibration part 511 may include at least one or more of a piezoelectric inorganic material and a piezoelectric organic material. For example, the vibration part 511 may be a piezoelectric device, a piezoelectric device part, a piezoelectric device layer, a piezoelectric structure, a piezoelectric vibration part, or a piezoelectric vibration layer, or the like, but aspects of the present disclosure are not limited thereto.

The vibration part 511 according to an aspect of the present disclosure may include a vibration layer 511a, a first electrode layer 511b, and a second electrode layer 511c.

The vibration layer 511a may include a piezoelectric material or an electroactive material which includes a piezoelectric effect. For example, the piezoelectric material may have a characteristic in which, when pressure or twisting phenomenon is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 511a may be a piezoelectric layer, a piezoelectric material layer, an electroactive layer, a piezoelectric composite layer, a piezoelectric composite, or a piezoelectric ceramic composite, or the like, but aspects of the present disclosure are not limited thereto.

The vibration layer 511a may be configured as a ceramic-based material for implementing a relatively strong vibration, or may be configured as a piezoelectric ceramic having a perovskite-based crystalline structure, without being limited thereto. The perovskite crystalline structure may have a piezoelectric effect and/or an inverse piezoelectric effect and may be a plate-shaped structure having an orientation.

The piezoelectric ceramic may be configured as a single crystalline ceramic having a crystalline structure, or may be configured as a ceramic material having a polycrystalline structure or polycrystalline ceramic. A piezoelectric material of the single crystalline ceramic may include $\alpha$-AlPO$_4$, $\alpha$-SiO$_2$, LiNbO$_3$, Tb$_2$(MoO$_4$)$_3$, Li$_2$B$_4$O$_7$, or ZnO, but aspects of the present disclosure are not limited thereto. A piezoelectric material of the polycrystalline ceramic may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but aspects of the present disclosure are not limited thereto. For example, the vibration layer 511a may include at least one or more of calcium titanate (CaTiO₃), barium titanate (BaTiO₃), and strontium titanate (SrTiO₃), without lead (Pb), but aspects of the present disclosure are not limited thereto.

The vibration layer 511a of the vibration generating part 510 configured at the vibration apparatus 500 described above with reference to FIGS. 1 to 19 may be configured to have a first thickness. The vibration layer 511a of the vibration generating part configured at the acoustic apparatus 600 described above with reference to FIG. 19 may be configured to have a second thickness which is a same as or different from the first thickness. For example, the vibration layer 511a of the vibration generating part 510 configured at the vibration apparatus 500 may have the first thickness thicker than the second thickness of the vibration layer 511a of the vibration generating part configured at the acoustic apparatus 600 to generate an ultrasonic, but aspects of the present disclosure are not limited thereto.

The first electrode layer 511b may be disposed at a first surface (or an upper surface or a front surface) 511s1 of the vibration layer 511a. The first electrode layer 511b may have a same size as the vibration layer 511a, or may have a size which is smaller than the vibration layer 511a.

The second electrode layer 511c may be disposed at a second surface (or a lower surface or a rear surface) 511s2 which is opposite to or different from the first surface 511s1 of the vibration layer 511a. The second electrode layer 511c may have a same size as the vibration layer 511a, or may have a size which is smaller than the vibration layer 511a. For example, the second electrode layer 511c may have a same shape as the vibration layer 511a, but aspects of the present disclosure are not limited thereto.

According to an aspect of the present disclosure, in order to reduce or prevent electrical short circuit between the first electrode layer 511b and the second electrode layer 511c, each of the first electrode layer 511b and the second electrode layer 511c may be formed at the other portion, except a periphery portion, of the vibration layer 511a. For example, the first electrode layer 511b may be formed at an entire first surface 511s1, other than a periphery portion, of the vibration layer 511a. For example, the second electrode layer 511c may be formed at an entire second surface 511s2, other than a periphery portion, of the vibration layer 511a. For example, a distance between a lateral surface (or a sidewall) of each of the first electrode layer 511b and the second electrode layer 511c and a lateral surface (or a sidewall) of the vibration layer 511a may be at least 0.5 mm or more. For example, the distance between the lateral surface of each of the first electrode layer 511b and the second electrode layer 511c and the lateral surface of the vibration layer 511a may be at least 1 mm or more, but aspects of the present disclosure are not limited thereto. As an example, the distance between the lateral surface of each of the first electrode layer 511b and the second electrode layer 511c and the lateral surface of the vibration layer 511a may be less than 0.5 mm. As an example, at least one of the first electrode layer 511b and the second electrode layer 511c may have a size which is greater than the vibration layer 511a.

One or more of the first electrode layer 511b and the second electrode layer 511c according to an aspect of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but aspects of the present disclosure are not limited thereto. The opaque conductive material may include gold (Au), silver (Ag), platinum (Pt), palladium (Pd), molybdenum (Mo), magnesium (Mg), carbon, or silver (Ag) including glass frit, or the like, or may be made of an alloy thereof, but aspects of the present disclosure are not limited thereto. For example, to enhance an electrical characteristic and/or a vibration characteristic of the vibration layer 511a, each of the first electrode layer 511b and the second electrode layer 511c may include silver (Ag) having a low resistivity. For example, carbon may be carbon black, ketjen black, carbon nanotube, and a carbon material including graphite, but aspects of the present disclosure are not limited thereto.

The vibration layer 511a may be polarized (or poling) by a certain voltage applied to the first electrode layer 511b and the second electrode layer 511c in a certain temperature atmosphere, or a temperature atmosphere that may be changed from a high temperature to a room temperature, but aspects of the present disclosure are not limited thereto. For example, a polarization direction (or a poling direction) formed in the vibration layer 511a may be formed or aligned (or arranged) from the first electrode layer 511b to the second electrode layer 511c, but is not limited thereto, and a polarization direction (or a poling direction) formed in the vibration layer 511a may be formed or aligned (or arranged) from the second electrode layer 511c to the first electrode layer 511b. But aspects of the present disclosure are not limited thereto.

The vibration layer 511a may alternately and repeatedly contract and/or expand based on an inverse piezoelectric effect according to a driving signal applied to the first electrode layer 511b and the second electrode layer 511c from the outside to vibrate. For example, the vibration layer 511a may vibrate in a vertical direction (or thickness direction) and in a planar direction by the signal applied to the first electrode layer 511b and the second electrode layer 511c. The vibration layer 511a may be displaced (or vibrated or driven) by contraction and/or expansion of the planar direction, thereby improving a sound characteristic and/or a sound pressure level characteristic of each of the vibration apparatus 500 and the acoustic apparatus 600. But aspects of the present disclosure are not limited thereto.

The vibration generating part 510 of each of the vibration apparatus 500 and the acoustic apparatus 600 according to an aspect of the present disclosure may further include a first cover member 513 and a second cover member 515.

The first cover member 513 may be disposed at a first surface of the vibration part 511. For example, the first cover member 513 may be configured to cover the first electrode layer 511b of the vibration part 511. For example, the first cover member 513 may be configured to have a larger size than the vibration part 511. The first cover member 513 may be configured to protect the first surface of the vibration part 511 and the first electrode layer 511b. But aspects of the present disclosure are not limited thereto.

The second cover member 515 may be disposed at a second surface of the vibration part 511. For example, the second cover member 515 may be configured to cover the second electrode layer 511c of the vibration part 511. For example, the second cover member 515 may be configured to have a larger size than the vibration part 511 and may be configured to have a same size as the first cover member 513, without being limited thereto. As an example, the second cover member 515 may be configured to have a different size from the first cover member 513, as long as it has a larger size than the vibration part 511. The second cover member 515 may be configured to protect the second surface of the vibration part 511 and the second electrode layer 511c.

Each of the first cover member 513 and the second cover member 515 according to an aspect of the present disclosure may include a same material or different material. For example, each of the first cover member 513 and the second cover member 515 may be a polyimide film or a polyethylene terephthalate film, but aspects of the present disclosure are not limited thereto.

The first cover member 513 may be connected or coupled to the first surface of the vibration part 511 or the first electrode layer 511b by a first adhesive layer 517. For example, the first cover member 513 may be connected or coupled to the first surface of the vibration part 511 or the first electrode layer 511b by a film laminating process using the first adhesive layer 517. But aspects of the present disclosure are not limited thereto.

The second cover member 515 may be connected or coupled to the second surface of the vibration part 511 or the second electrode layer 511c by a second adhesive layer 519. For example, the second cover member 515 may be connected or coupled to the second surface of the vibration part 511 or the second electrode layer 511c by a film laminating process using the second adhesive layer 519. But aspects of the present disclosure are not limited thereto.

Each of the first adhesive layer 517 and second adhesive layer 519 according to an aspect of the present disclosure may include an electrically insulating material which has adhesiveness and is capable of compression and decompression. For example, each of the first adhesive layer 517 and the second adhesive layer 519 may include an epoxy resin, an acrylic resin, a silicone resin, or a urethane resin, but aspects of the present disclosure are not limited thereto.

The first adhesive layer 517 and second adhesive layer 519 may be configured between the first cover member 513 and the second cover member 515 to surround the vibration part 511. For example, one or more of the first adhesive layer 517 and second adhesive layer 519 may be configured to fully or partially surround the vibration part 511.

The vibration generating part 510 of each of the vibration apparatus 500 and the acoustic apparatus 600 according to an aspect of the present disclosure may further include a signal supply member 550.

The signal supply member 550 may be configured to supply the driving signal supplied from a driving circuit part to the vibration generating part 510 or the vibration part 511. The signal supply member 550 may be configured to be electrically connected to the vibration part 511 at one side of the vibration generating part 510. The signal supply member 550 may be configured to be electrically connected to the first electrode layer 511b and the second electrode layer 511c of the vibration part 511. But aspects of the present disclosure are not limited thereto.

A portion of the signal supply member 550 may be accommodated (or inserted) between the first cover member 513 and the second cover member 515. An end portion (or a distal end portion) of the signal supply member 550 may be disposed or inserted (or accommodated) between one periphery portion of the first cover member 513 and one periphery portion of the second cover member 515. The one periphery portion of the first cover member 513 and the one periphery portion of the second cover member 515 may accommodate or vertically cover the end portion (or the distal end portion or one side) of the signal supply member 550. Accordingly, the signal supply member 550 may be integrated into the vibration generating part 510. For example, the signal supply member 550 may be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but aspects of the present disclosure are not limited thereto.

The signal supply member 550 according to an aspect of the present disclosure may include a base member 551 and a plurality of signal lines 553a and 553b. For example, the signal supply member 550 may include a base member 551, a first signal line 553a, and a second signal line 553b. For example, the base member 551 may be a cable base member, but aspects of the present disclosure are not limited thereto.

As an example, the base member 551 may include a transparent or opaque material, without being limited thereto. As an example, the base member 551 may include a transparent or opaque plastic material, but aspects of the present disclosure are not limited thereto. The base member 551 may have a certain width along a first direction X and may be extended long along a second direction Y intersecting with the first direction X.

The first and second signal lines 553a and 553b may be disposed at the first surface of the base member 551 in parallel with the second direction Y, and may be spaced apart from each other or electrically separated from each other in the first direction X. The first and second signal lines 553a and 553b may be disposed in parallel to each other at the first surface of the base member 551. For example, the first and second signal lines 553a and 553b may be implemented in a line shape by patterning of a metal layer (or a conductive layer) formed or deposited at the first surface of the base member 551. But aspects of the present disclosure are not limited thereto.

End portions (or distal end portions or one sides) of the first and second signal lines 553a and 553b may be separated from each other, and thus, may be individually curved or bent.

The end portion (or a distal end portion or one sides) of the first signal line 553a may be electrically connected to the first electrode layer 511b of the vibration part 511. For example, the end portion of the first signal line 553a may be electrically connected to at least a portion of the first electrode layer 511b of the vibration part 511 at one periphery portion of the first cover member 513. For example, the end portion (or the distal end portion or one side) of the first signal line 553a may be electrically and directly connected to the first electrode layer 511b of the vibration part 511. For example, the end portion (or the distal end portion or the one side) of the first signal line 553a may be directly connected to or directly contact the first electrode layer 511b of the vibration part 511. For example, the end portion of the first signal line 553a may be electrically connected to the first electrode layer 511b by a conductive double-sided tape, without being limited thereto. Accordingly, the first signal line 553a may transfer a first driving signal, suppled from the driving circuit part, to the first electrode layer 511b of the vibration part 511. But aspects of the present disclosure are not limited thereto.

The end portion (or a distal end portion or one side) of the second signal line 553b may be electrically connected to the second electrode layer 511c of the vibration part 511. For example, the end portion of the second signal line 553b may be electrically connected to at least a portion of the second electrode layer 511c of the vibration part 511 at one periphery portion of the second cover member 515. For example, the end portion of the second signal line 553b may be electrically and directly connected to at least a portion of the second electrode layer 511c of the vibration part 511. For example, the end portion of the second signal line 553b may be directly connected to or directly contact the second electrode layer 511c of the vibration part 511. For example, the end portion of the second signal line 553b may be electrically connected to the second electrode layer 511c by a conductive double-sided tape, without being limited thereto. Accordingly, the second signal line 553b may transfer a second driving signal, supplied from the driving circuit part, to the second electrode layer 511c of the vibration part 511.

The signal supply member 550 according to an aspect of the present disclosure may further include an insulation layer 555.

The insulation layer 555 may be disposed at the first surface of the base member 551 to cover each of the first signal line 553a and the second signal line 553b other than the end portion (or one side) of the signal supply member 550.

An end portion (or one side) of the signal supply member 550 including an end portion (or one side) of the base member 551 and an end portion (or one side) 555a of the insulation layer 555 may be inserted (or accommodated) between the first cover member 513 and the second cover member 515 and may be fixed between the first cover member 513 and the second cover member 515 by the first adhesive layer 517 and the second adhesive layer 519. Accordingly, the end portion (or the one side) of the first signal line 553a may be maintained with being electrically connected to the first electrode layer 511b of the vibration part 511, and the end portion (or the one side) of the second signal line 553b may be maintained with being electrically connected to the second electrode layer 511c of the vibration part 511. Furthermore, the end portion (or the one side) of the signal supply member 550 may be inserted (or accommodated) and fixed between the vibration part 511 and the first cover member 513, and thus, a contact defect (or bad connection) between the vibration generating part 510 and the signal supply member 550 caused by the movement of the signal supply member 550 may be reduced or prevented.

In the signal supply member 550 according to an aspect of the present disclosure, each of the end portion (or the one side) of the base member 551 and an end portion (or one side) 555a of the insulation layer 555 may be removed. For example, each of the end portion of the first signal line 553a and the end portion of the second signal line 553b may be exposed at the outside without being supported or covered by each of the end portion (or the one side) of the base member 551 and the end portion (or the one side) 555a of the insulation layer 555. For example, the end portion of each of the first and second signal lines 553a and 553b may protrude (or extend) to have a certain length from an end 551e of the base member 551 or an end 555e of the insulation layer 555. Accordingly, each of the end portion (or the distal end portion or the one side) of each of the first and second signal lines 553a and 553b may be individually or independently curved (or bent). But aspects of the present disclosure are not limited thereto.

The end portion (or the one side) of the first signal line 553a, which is not supported by the end portion (or the one side) of the base member 551 and the end portion 555a of the insulation layer 555, may be directly connected to or directly contact the first electrode layer 511b of the vibration part 511. The end of the second signal line 553b, which is not supported by the end portion (or the one side) of the base member 551 and the end portion (or the one side) 555a of the insulation layer 555, may be directly connected to or directly contact the second electrode layer 511c of the vibration part 511. But aspects of the present disclosure are not limited thereto.

According to an aspect of the present disclosure, a portion of the signal supply member 550 or a portion of the base member 551 may be disposed or inserted (or accommodated) between the first cover member 513 and the second cover member 515, and thus, the signal supply member 550 may be integrated into (or configured as one body with) the vibration generating part 510. Accordingly, the vibration generating part 510 and the signal supply member 550 may be configured as one part (or one component), and thus, an effect of uni-materialization may be obtained.

According to an aspect of the present disclosure, the first signal line 553a and the second signal line 553b of the signal supply member 550 may be integrated into (or configured as one body with) the vibration generating part 510, and thus, a soldering process for an electrical connection between the vibration generating part 510 and the signal supply member 550 may not be needed. Accordingly, a manufacturing process and a structure of the vibration generating part 510 may be simplified, and thus, a hazardous process may be reduced.

Figure 23:
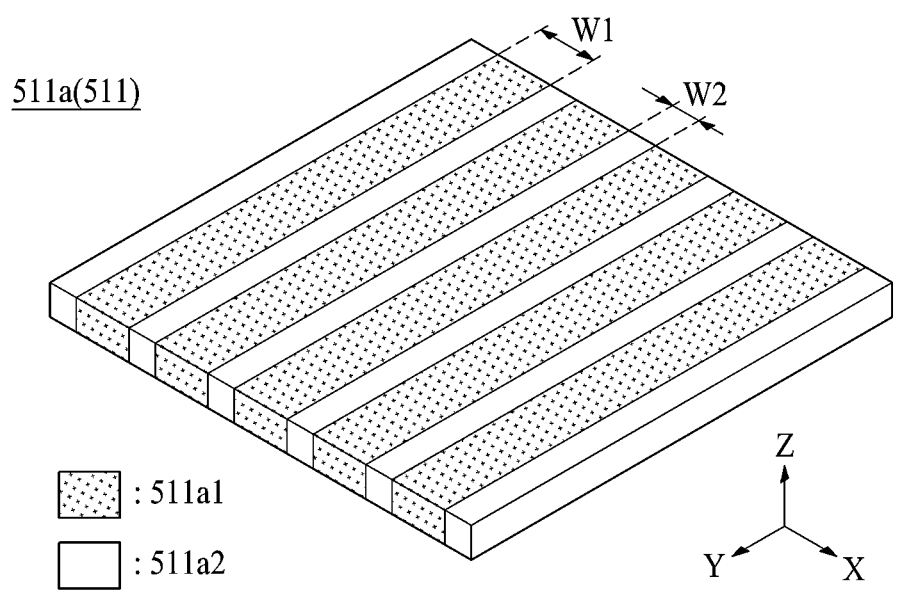
FIG. 23 illustrates a vibration layer according to an aspect of the present disclosure.

FIG. 23 illustrates a vibration layer according to another aspect of the present disclosure. FIG. 23 illustrates another aspect of the vibration layer according to another aspect of the present disclosure described above with reference to FIGS. 20 to 22.

With reference to FIGS. 21 and 23, the vibration layer 511a according to another aspect of the present disclosure may include a plurality of first portions 511a1 and a plurality of second portions 511a2. For example, the plurality of first portions 511a1 and the plurality of second portions 511a2 may be alternately and repeatedly disposed along a first direction X (or a second direction Y, or a direction between the first direction X and the second direction Y).

Each of the plurality of first portions 511a1 may include an inorganic material having a piezoelectric effect (or a piezoelectric characteristic). For example, each of the plurality of first portions 511a1 may include at least one or more of a piezoelectric inorganic material and a piezoelectric organic material. For example, each of the plurality of first portions 511a1 may be an inorganic portion, an inorganic material portion, a piezoelectric portion, a piezoelectric material portion, or an electroactive portion, but aspects of the present disclosure are not limited thereto.

According to an aspect of the present disclosure, each of the plurality of first portions 511a1 may have a first width W1 parallel to the first direction X and may be extended along the second direction Y intersecting with the first direction X. Each of the plurality of first portions 511a1 may be substantially a same as the vibration layer 511a described above with reference to FIGS. 20 to 22, and thus, repeated descriptions thereof are omitted or briefly given.

Each of the plurality of first portions 511a1 which is at vibration layer 511a of the vibration generating part 510 configured at the vibration apparatus 500 described above with reference to FIGS. 1 to 19 may be configured to have a first thickness. Each of the plurality of first portions 511a1 which is at the vibration layer 511a of the vibration generating part configured at the acoustic apparatus 600 described above with reference to FIG. 19 may be configured to have a second thickness which is a same as or different from the first thickness. For example, each of the plurality of first portions 511a1 which is at the vibration layer 511a of the vibration generating part 510 configured at the vibration apparatus 500 may have the first thickness thicker than the second thickness of each of the plurality of first portions 511a1 which is at the vibration layer 511a of the vibration generating part configured at the acoustic apparatus 600 to generate an ultrasonic, but aspects of the present disclosure are not limited thereto.

Each of the plurality of second portions 511a2 may be disposed between the plurality of first portions 511a1. For example, each of the plurality of first portions 511a1 may be disposed between two adjacent second portions 511a2 of the plurality of second portions 511a2. Each of the plurality of second portions 511a2 may have a second width W2 parallel to the first direction X (or the second direction Y) and may be extended along the second direction Y (or the first direction X). The first width W1 may be a same as or different from the second width W2. For example, the first width W1 may be greater than the second width W2. For example, the first portion 511a1 and the second portion 511a2 may include a line shape or a stripe shape which has a same size or different sizes. But aspects of the present disclosure are not limited thereto.

Each of the plurality of second portions 511a2 may be configured to fill a gap between two adjacent first portions 511a1 of the plurality of first portions 511a1. Each of the plurality of second portions 511a2 may be configured to fill a gap between two adjacent first portions 511a1 of the plurality of first portions 511a1, and thus, may be connected to or attached on lateral surfaces of the first portion 511a1 adjacent thereto. According to an aspect of the present disclosure, each of the plurality of first portions 511a1 and the plurality of second portions 511a2 may be disposed (or arranged) at a same plane (or a same layer) in parallel with each other. Therefore, the vibration layer 511a may be expanded to a desired size or length by a lateral coupling (or connection) of the first portion 511a1 and the second portion 511a2. But aspects of the present disclosure are not limited thereto.

According to an aspect of the present disclosure, each of the plurality of second portions 511a2 may absorb an impact applied to the first portions 511a1, and thus, may enhance the durability of the first portions 511a1 and provide flexibility to the vibration layer 511a. Each of the plurality of second portions 511a2 may include an organic material having a ductile characteristic. For example, each of the plurality of second portions 511a2 may include one or more of an epoxy-based polymer, an acrylic-based polymer, and a silicone-based polymer, but aspects of the present disclosure are not limited thereto. For example, each of the plurality of second portions 511a2 may be an organic portion, an organic material portion, an adhesive portion, a stretch portion, a bending portion, a damping portion, or a ductile portion, but aspects of the present disclosure are not limited thereto.

A first surface of each of the plurality of first portions 511a1 and the plurality of second portions 511a2 may be connected to the first electrode layer 511b in common. A second surface of each of the plurality of first portions 511a1 and the plurality of second portions 511a2 may be connected to the second electrode layer 511c in common. But aspects of the present disclosure are not limited thereto.

The plurality of first portions 511a1 and the plurality of second portion 511a2 may be disposed at (or connected to) a same plane, and thus, the vibration layer 511a according to another aspect of the present disclosure may implement a single thin film. Accordingly, the vibration part 511 or the vibration generating part 510 including the vibration layer 511a according to another aspect of the present disclosure may vibrate in vertically (or up and down) direction by the first portion 511a1 having a vibration characteristic and may be bent in a curved shape by the second portion 511a2 having flexibility.

Figure 24:
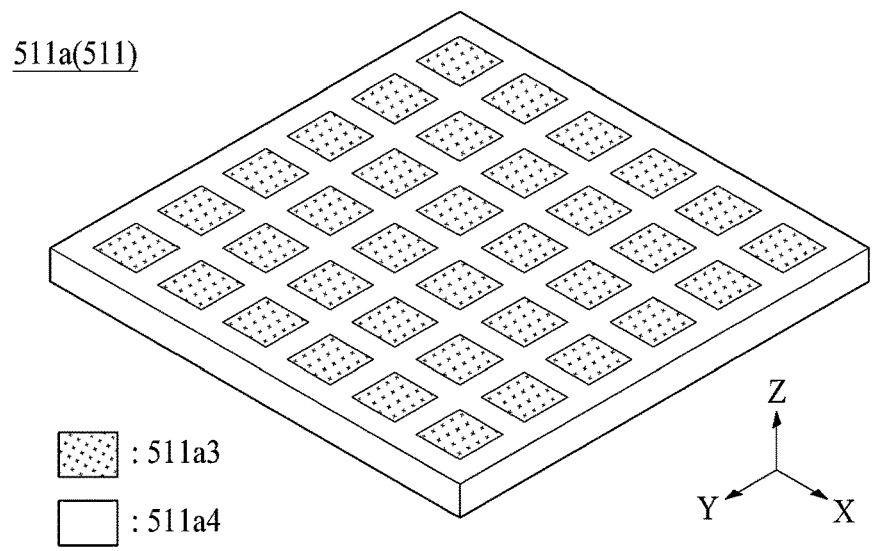
FIG. 24 illustrates a vibration layer according to another aspect of the present disclosure.

FIG. 24 illustrates a vibration layer according to another aspect of the present disclosure. FIG. 24 illustrates another aspect of the vibration layer according to another aspect of the present disclosure described above with reference to FIGS. 20 to 22.

With reference to FIGS. 21 and 24, the vibration layer 511a according to another aspect of the present disclosure may include a plurality of first portions 511a3 and a second portion 511a4 disposed between the plurality of first portions 511a3.

Each of the plurality of first portions 511a3 may be disposed to be spaced apart from one another along each of the first direction X and the second direction Y. For example, each of the plurality of first portions 511a3 may have a hexahedral shape having a same size and may be disposed in a lattice shape, but aspects of the present disclosure are not limited thereto. For example, each of the plurality of first portions 511a3 may have a circular shape plate, an oval shape plate, or a polygonal shape plate, which have a same size as each other, but aspects of the present disclosure are not limited thereto. For example, each of the plurality of first portions 511a3 may have a hexahedral shape, a circular shape plate, an oval shape plate, or a polygonal shape plate, which have different sizes from each other.

Each of the plurality of first portions 511a3 may be substantially a same as the first portion 511a1 described above with reference to FIG. 23, and thus, repeated descriptions thereof are omitted or briefly given.

The second portion 511a4 may be disposed between the plurality of first portions 511a3 along each of the first direction X and the second direction Y. The second portion 511a4 may be configured to fill a gap between two adjacent first portions 511a3 or to surround each of the plurality of first portions 511a3, and thus, the second portion 511a4 may be connected to or attached on the first portion 511a3 adjacent thereto. The second portion 511a4 may be substantially a same as the second portion 511a2 described above with reference to FIG. 23, and thus, repeated descriptions thereof are omitted or briefly given.

A first surface of each of the plurality of first portions 511a3 and the second portions 511a4 may be connected to the first electrode layer 511b in common. A second surface of each of the plurality of first portions 511a3 and the second portions 511a4 may be connected to the second electrode layer 511c in common. But aspects of the present disclosure are not limited thereto.

The plurality of first portions 511a3 and the second portion 511a4 may be disposed on (or connected to) the same plane, and thus, the vibration layer 511a according to another aspect of the present disclosure may have a single thin film-type. Accordingly, the vibration part 511 or the vibration generating part 510 including the vibration layer 511a according to another aspect of the present disclosure may vibrate in vertically (or up and down) direction by the first portion 511a3 having a vibration characteristic and may be bent in a curved shape by the second portion 511a4 having flexibility.

Figure 25:
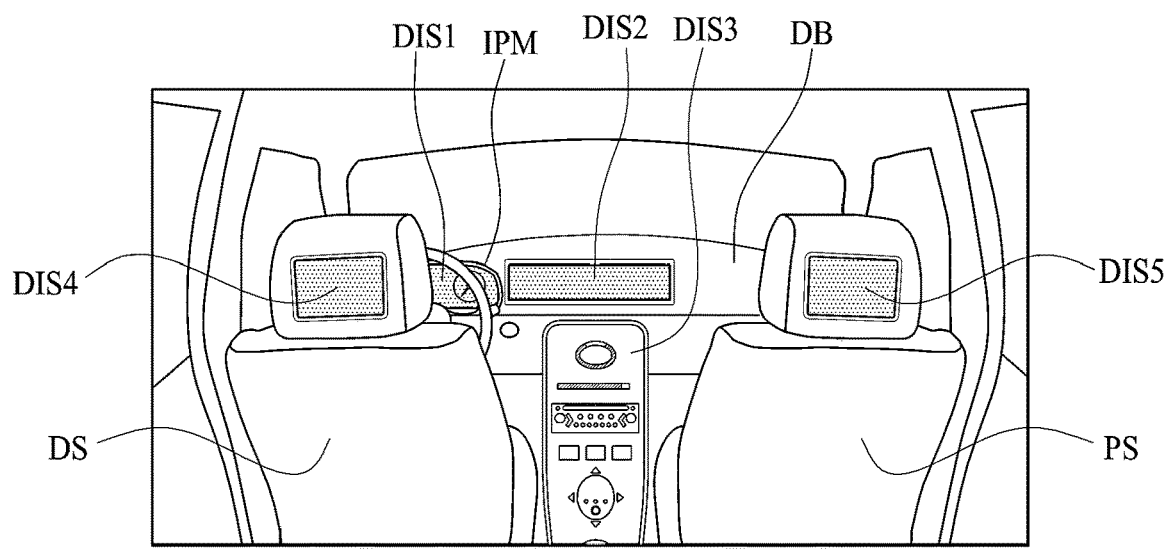
FIG. 25 illustrates a vehicular apparatus according to an aspect of the present disclosure.

FIG. 25 illustrates a vehicular apparatus according to an aspect of the present disclosure. FIG. 25 illustrates an aspect where the display apparatus described above with reference to FIGS. 1 to 24 according to an aspect of the present disclosure is applied to a vehicular apparatus (or a vehicle).

With reference to FIG. 25, a vehicular apparatus according to an aspect of the present disclosure may include a dashboard DB, an instrument panel module IPM, and an infotainment module ITM.

The dashboard DB may include a first region facing a driver seat DS, a second region facing a passenger seat PS, and a third region between the first region and the second region. The dashboard DB may include a center fascia region between the driver seat DS and the passenger seat PS. But aspects of the present disclosure are not limited thereto.

The instrument panel module IPM may include a first display DIS1 disposed at the first region of the dashboard DB. The first display DIS1 may be an instrument panel display. For example, the first display DIS1 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The first display DIS1 may provide a driver with various information such as driving-related information or the like such as velocity (or speed), fuel amount, and revolutions per minute (RPM) of the vehicle, and optionally other information in addition to the driving-related information, without being limited thereto.

The first display DIS1 may include the display apparatus described above with reference to FIGS. 1 to 24, and thus, repeated descriptions thereof are omitted or briefly given. Accordingly, the first display DIS1 may be configured to display an image corresponding to information provided, for example, from a host system, on the display panel. For example, one or more vibration apparatuses 500 and/or one or more acoustic apparatus 600 may be configured at a rear surface of the first display DIS1. Moreover, the first display DIS1 may provide a user with an ultrasonic vibration or an ultrasonic haptic based on driving (or vibration) of the vibration apparatus, for example, when a driver (or user) touch is applied thereto, without being limited thereto. As an example, the first display DIS1 may provide a user with an ultrasonic vibration or an ultrasonic haptic based on driving (or vibration) of the vibration apparatus, periodically, randomly, or based on an event in the driving-related information or the like, without being limited thereto. Furthermore, when the first display DIS1 includes the display apparatus described above with reference to FIG. 19, the first display DIS1 may directly output a sound. As an example, the first display DIS1 may directly output a sound, generated by a display member which vibrates based on driving (or vibration) of an acoustic apparatus based on a sound signal supplied, for example, from an audio system and/or a multimedia system, or a remote server, a mobile device, etc., via a bus, a wired or wireless network, etc., to a driver.

The infotainment ITM (or an infotainment system) may include one or more infotainment displays which is at one or more of the dashboard DB, the driver seat DS, and the passenger seat PS. For example, the infotainment ITM may include one or more second displays which is configured at one or more of the dashboard DB, the driver seat DS, and the passenger seat PS. For example, the infotainment ITM may include second to fifth displays DIS2 to DIS5. But aspects of the present disclosure are not limited thereto.

The second display DIS2 may be disposed or configured at the third region of the dashboard DB. For example, the second display DIS2 may have a length that is enlarged toward the second region of the dashboard DB. For example, the second display DIS2 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The second display DIS2 may be respectively connected to a navigation system and a convenience system including an audio system, an air conditioning system, and a multimedia system or the like, and may display various information provided from the convenience system and the navigation system, without being limited thereto.

The second display DIS2 may include the display apparatus described above with reference to FIGS. 1 to 24, and thus, repeated descriptions thereof are omitted or briefly given. Accordingly, the second display DIS2 may be configured to display the various information provided from the convenience system and the navigation system, on the display panel. Moreover, the second display DIS2 may transmit or receive image information or sound information through wireless communication with a wireless communication device, for example, of the driver or a passenger sitting on a passenger seat and may be configured to display the received image information on a display panel. But aspects of the present disclosure are not limited thereto.

According to an aspect of the present disclosure, one or more vibration apparatuses 500 and/or one or more acoustic apparatus 600 may be configured at a rear surface of the second display DIS2. The second display DIS2 may provide a user with an ultrasonic vibration or an ultrasonic haptic based on driving (or vibration) of the vibration apparatus, for example, when a driver (or user) touch is applied thereto. Furthermore, when the second display DIS2 includes the display apparatus described above with reference to FIG. 19, the second display DIS2 may directly output the sound, generated by the display member which vibrates based on driving (or vibration) of the acoustic apparatus based on the sound signal supplied from the audio system and/or the multimedia system, to a driver.

According to another aspect of the present disclosure, the second display DIS2 and the first display DIS1 may be configured as one display and may be disposed at the first region and the third region of the dashboard DB or may be disposed across the first to third regions of the dashboard DB.

The third display DIS3 may be disposed at the center fascia region under the third region of the dashboard DB. For example, the third display DIS3 may be disposed under the second display DIS2. The third display DIS3 may be disposed at the center fascia region which is at a region between the driver seat DS and the passenger seat PS. For example, the third display DIS3 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The third display (or center fascia display) DIS3 may be configured to display various information provided from the convenient system, without being limited thereto. The third display DIS3 and the second display DIS2 may share the various information displayed on a display panel.

The third display DIS3 may include the display apparatus described above with reference to FIGS. 1 to 24, and thus, repeated descriptions thereof are omitted or briefly given. Accordingly, the third display DIS3 may be configured to display the various information provided from the convenience system, on the display panel. For example, one or more vibration apparatuses 500 and/or one or more acoustic apparatus 600 may be configured at a rear surface of the third display DIS3. Moreover, the third display DIS3 may provide a user with an ultrasonic vibration or an ultrasonic haptic based on driving (or vibration) of the vibration apparatus. For example, the third display DIS3 may provide a user with an ultrasonic vibration or an ultrasonic haptic based on driving (or vibration) of the vibration apparatus when a driver (or user) touch is applied thereto, without being limited thereto. Furthermore, when the third display DIS3 includes the display apparatus described above with reference to FIG. 19, the third display DIS3 may directly output the sound, generated by the display member which vibrates based on driving (or vibration) of the acoustic apparatus based on the sound signal supplied, for example, from the audio system and/or the multimedia system, to a driver.

The fourth display DIS4 may be disposed or buried in a headrest of the driver seat DS. The fifth display DIS5 may be disposed or buried in a headrest of the passenger seat PS. For example, the fourth display DIS4 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto. For example, the fifth display DIS5 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The fourth and fifth display DIS4 and DIS5 may include the display apparatus described above with reference to FIGS. 1 to 24, and thus, repeated descriptions thereof are omitted or briefly given.

Each of the fourth and fifth displays DIS4 and DIS5 may share a function of the second display DIS2. Moreover, each of the fourth and fifth displays DIS4 and DIS5 may transmit or receive image information or sound information through wireless communication with a wireless communication device, for example, of a passenger, and may display the received image information on a display panel.

According to an aspect of the present disclosure, one or more vibration apparatuses 500 and/or one or more acoustic apparatus 600 may be configured at a rear surface of each of the fourth and fifth displays DIS4 and DIS5. Moreover, each of the fourth and fifth displays DIS4 and DIS5 may provide a user with an ultrasonic vibration or an ultrasonic haptic based on driving (or vibration) of the vibration apparatus, for example, when a driver (or user) touch is applied thereto. Furthermore, when the fourth and fifth displays DIS4 and DIS5 includes the display apparatus described above with reference to FIG. 19, each of the fourth and fifth displays DIS4 and DIS5 may directly output the sound, generated by the display member which vibrates based on driving (or vibration) of the acoustic apparatus based on the sound signal supplied from the audio system and/or the multimedia system, to a driver.

The vehicular apparatus according to an aspect of the present disclosure may provide a user with an ultrasonic vibration or an ultrasonic haptic when a user touch is applied to each of the first to fifth displays DIS1 to DIS5, may use each of the first to fifth displays DIS1 to DIS5 as a speaker for a sound output, and may provide a driver and/or a passenger with a 2 or more-channel stereophonic sound by using a sound generated (or output) from each of the first to fifth displays DIS1 to DIS5. But aspects of the present disclosure are not limited thereto.

A vibration apparatus, a display apparatus including the same, and a vehicular apparatus including the vibration apparatus according to an aspect of the present disclosure are described below.

A vibration apparatus according to an aspect of the present disclosure may comprise a vibration generating part, and a press structure configured at a rear surface of the vibration generating part and configured to apply pressure to the vibration generating part.

According to one or more aspects of the present disclosure, the press structure may comprise a base structure at the rear surface of the vibration generating part, and a press part between the vibration generating part and the base structure.

According to one or more aspects of the present disclosure, the base structure may comprise a base frame at the rear surface of the vibration generating part, an accommodating portion configured at a first surface of the base frame to accommodate the press part, and a first protrusion portion protruding from a second surface opposite to the first surface of the base frame and including a hole.

According to one or more aspects of the present disclosure, the first protrusion portion may overlap a center portion of the vibration generating part.

According to one or more aspects of the present disclosure, the press part may be accommodated into the accommodating portion.

According to one or more aspects of the present disclosure, the press part may comprise a press member at the rear surface of the vibration generating part, a plate between the press member and a floor surface of the accommodating portion, and a second protrusion portion protruding from the plate, the second protrusion portion being fastened to the hole of the first protrusion portion.

According to one or more aspects of the present disclosure, the press part may further comprise a groove configured at the second protrusion portion.

According to one or more aspects of the present disclosure, the press member may have a same planar shape as a planar shape of the vibration generating part.

According to one or more aspects of the present disclosure, the vibration apparatus may further comprise a vibration transfer part connected to the press structure and configured to support the vibration generating part. The vibration transfer part may be configured to convert an in-plane vibration mode of the vibration generating part into an out-plane vibration mode.

According to one or more aspects of the present disclosure, the press structure may comprise a base structure at the rear surface of the vibration generating part, and a press part between the vibration generating part and the base structure.

According to one or more aspects of the present disclosure, the vibration apparatus may further comprise a gasket between the press structure and the vibration transfer part.

According to one or more aspects of the present disclosure, the base structure may comprise a base frame at the rear surface of the vibration generating part, an accommodating portion configured at a first surface of the base frame to accommodate the press part, and a first protrusion portion protruding from a second surface opposite to the first surface of the base frame and including a hole.

According to one or more aspects of the present disclosure, the press part may be accommodated into the accommodating portion and may be configured to apply pressure to the vibration generating part.

According to one or more aspects of the present disclosure, the press part may comprise a press member at the rear surface of the vibration generating part, and a rotation member configured between the press member and a floor surface of the accommodating portion.

According to one or more aspects of the present disclosure, the base structure and the press member may comprise a metal material.

According to one or more aspects of the present disclosure, the rotation member may comprise a plate, and a second protrusion portion protruding from the plate, the second protrusion portion being fastened to the hole of the first protrusion portion.

According to one or more aspects of the present disclosure, the rotation member may further comprise a groove configured at the second protrusion portion.

According to one or more aspects of the present disclosure, the vibration transfer part may comprise a base member connected to the vibration generating part, and a plurality of vibration transfer members connected to the base member and spaced apart from one another. Each of the plurality of vibration transfer members may be configured to convert an in-plane vibration mode of the vibration generating part into an out-plane vibration mode.

According to one or more aspects of the present disclosure, each of the plurality of vibration transfer members may protrude from the base member.

According to one or more aspects of the present disclosure, the base member and the plurality of vibration transfer members may comprise a metal material or a plastic material.

According to one or more aspects of the present disclosure, each of the plurality of vibration transfer members may have a line shape.

According to one or more aspects of the present disclosure, each of the plurality of vibration transfer members may include at least one or more transfer portions.

According to one or more aspects of the present disclosure, the vibration transfer part may comprise a first vibration transfer member, and a second vibration transfer member surrounded by the first vibration transfer member.

According to one or more aspects of the present disclosure, the first vibration transfer member may be connected to a periphery portion of the base member. The second vibration transfer member may be connected to a center portion of the base member.

According to one or more aspects of the present disclosure, each of the first vibration transfer member and the second vibration transfer member may include at least one or more transfer portions.

According to one or more aspects of the present disclosure, the vibration generating part may comprise a first cover member, a second cover member, and a vibration part between the first cover member and the second cover member, the vibration part including a piezoelectric material.

According to one or more aspects of the present disclosure, the vibration generating part may further comprise a signal supply member electrically connected to the vibration part. A portion of the signal supply member may be accommodated between the first cover member and the second cover member.

According to one or more aspects of the present disclosure, the vibration generating part may comprise a first vibration generating part, a second vibration generating part stacked on the first vibration generating part, and an intermediate adhesive member between the first vibration generating part and the second vibration generating part. One of the first vibration generating part and the second vibration generating part may be connected to the vibration transfer part.

According to one or more aspects of the present disclosure, each of the first vibration generating part and the second vibration generating part may comprise a first cover member, a second cover member, and a vibration part between the first cover member and the second cover member, the vibration part including a piezoelectric material.

According to one or more aspects of the present disclosure, each of the first vibration generating part and the second vibration generating part may further comprise a signal supply member electrically connected to the vibration part. A portion of the signal supply member may be accommodated between the first cover member and the second cover member.

A display apparatus according to an aspect of the present disclosure may comprise a display member configured to display an image, and one or more vibration generating apparatuses configured to vibrate the display member. The one or more vibration generating apparatuses may comprise a vibration apparatus. The vibration apparatus may comprise a vibration generating part, and a press structure configured at a rear surface of the vibration generating part and configured to apply pressure to the vibration generating part.

According to one or more aspects of the present disclosure, the one or more vibration generating apparatuses may be configured to vibrate the display member according to a driving signal to generate an ultrasonic vibration at a surface of the display member.

According to one or more aspects of the present disclosure, the driving signal may be an amplitude modulation signal of an ultrasonic signal based on a low frequency signal.

According to one or more aspects of the present disclosure, the low frequency signal may have one or more frequencies of 100 Hz to 600 Hz.

According to one or more aspects of the present disclosure, the display member may comprise a display panel including the plurality of pixels configured to display the image, and a touch panel connected to the display panel.

According to one or more aspects of the present disclosure, the display member may comprise a front member, a display panel at a rear surface of the front member, the display panel including the plurality of pixels configured to display the image, and a touch panel between the front member and the display panel.

According to one or more aspects of the present disclosure, the display apparatus may further comprise an acoustic apparatus including one or more sound generating apparatuses configured to vibrate the display member.

According to one or more aspects of the present disclosure, the one or more sound generating apparatuses may comprise a vibration generating part, and a vibration transfer part including a plurality of vibration transfer members configured to transfer a vibration of the vibration generating part to the display member.

A vehicular apparatus according to an aspect of the present disclosure may comprise a dashboard, an instrument panel module at the dashboard, the instrument panel module including a first display, a driver seat, a passenger seat, and an infotainment module at one or more of the dashboard, the driver seat, and the passenger seat, the infotainment module including one or more second displays. One or more of the first display and the one or more second displays may comprise a display member configured to display an image, and one or more vibration generating apparatuses configured to vibrate the display member. The one or more vibration generating apparatuses may comprise a vibration apparatus. The vibration apparatus may comprise a vibration generating part, and a press structure configured at a rear surface of the vibration generating part and configured to apply pressure to the vibration generating part.

According to one or more aspects of the present disclosure, the one or more vibration generating apparatuses may be configured to vibrate the display member according to a driving signal to generate an ultrasonic vibration at a surface of the display member.

According to one or more aspects of the present disclosure, the driving signal may be an amplitude modulation signal of an ultrasonic signal based on a low frequency signal.

According to one or more aspects of the present disclosure, the display member may comprise a display panel including the plurality of pixels configured to display the image, and a touch panel connected to the display panel.

According to one or more aspects of the present disclosure, the display member may comprise a front member, a display panel at a rear surface of the front member, the display panel including the plurality of pixels configured to display the image, and a touch panel between the front member and the display panel.

According to one or more aspects of the present disclosure, one or more of the first display and the one or more second display may further comprise an acoustic apparatus including one or more sound generating apparatuses configured to vibrate the display member.

According to one or more aspects of the present disclosure, the one or more sound generating apparatuses may comprise a vibration generating part, and a vibration transfer part including a plurality of vibration transfer members configured to transfer a vibration of the vibration generating part to the display member.

A vibration apparatus according to one or more aspects of the present disclosure may be applied to or included in a vibration apparatus which is disposed in an apparatus. A display apparatus according to one or more aspects of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical apparatuses, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. Moreover, the vibration apparatus according to one or more aspects of the present disclosure may be applied to or included in an organic light-emitting lighting apparatus or an inorganic light-emitting lighting apparatus. When the vibration apparatus is applied to or included in the lighting apparatuses, the lighting apparatuses may act as lighting and a speaker. In addition, when the vibration apparatus according to one or more aspects of the present disclosure is applied to or included in the mobile apparatuses or the like, the vibration apparatus may be one or more of a speaker, a receiver, and a haptic device, but aspects of the present disclosure are not limited thereto.

It will be apparent to those skilled in the art that various modifications and variations can be made in the vibration apparatus, the display apparatus including the same, and the vehicular apparatus including the display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A vibration apparatus, comprising:
a vibration generating part; and
a press structure configured at a rear surface of the vibration generating part and configured to apply pressure to the vibration generating part based on a rotation,
wherein the press structure comprises:
a base structure at the rear surface of the vibration generating part; and
a press part between the vibration generating part and the base structure, and
wherein the press part includes a rotation plate rotatably and movably disposed between the rear surface of the vibration generating part and the base structure and configured to apply pressure to the rear surface of the vibration generating part based on the rotation.

2. The vibration apparatus of claim 1, wherein the base structure comprises:
a base frame at the rear surface of the vibration generating part;
an accommodating portion configured at a first surface of the base frame to accommodate the press part; and
a first protrusion portion protruding from a second surface opposite to the first surface of the base frame and including a hole.

3. The vibration apparatus of claim 2, wherein the first protrusion portion overlaps a center portion of the vibration generating part.

4. The vibration apparatus of claim 2, wherein the press part is accommodated into the accommodating portion.

5. The vibration apparatus of claim 2, wherein the press part further comprises:
a press member between the rear surface of the vibration generating part and the rotation plate; and
a second protrusion portion protruding from the rotation plate, the second protrusion portion being fastened to the hole of the first protrusion portion, and
wherein the rotation plate is configured between the press member and a floor surface of the accommodating portion.

6. The vibration apparatus of claim 5, wherein the press part further comprises a groove configured at the second protrusion portion.

7. The vibration apparatus of claim 1, further comprising a vibration transfer part connected to the press structure and configured to support the vibration generating part,
wherein the vibration transfer part is configured to convert an in-plane vibration mode of the vibration generating part into an out-plane vibration mode.

8. The vibration apparatus of claim 7, further comprising a gasket between the press structure and the vibration transfer part.

9. The vibration apparatus of claim 7, wherein the base structure comprises:
   a base frame at the rear surface of the vibration generating part;
   an accommodating portion configured at a first surface of the base frame to accommodate the press part; and
   a first protrusion portion protruding from a second surface opposite to the first surface of the base frame and including a hole.

10. The vibration apparatus of claim 9, wherein the press part is accommodated into the accommodating portion and is configured to apply pressure to the vibration generating part.

11. The vibration apparatus of claim 9, wherein the press part comprises:
   a press member between the rear surface of the vibration generating part and the rotation plate; and
   a rotation member configured between the press member and a floor surface of the accommodating portion and including the rotation plate.

12. The vibration apparatus of claim 11, wherein the base structure and the press member comprise a metal material.

13. The vibration apparatus of claim 11, wherein the rotation member comprises:
   the rotation plate; and
   a second protrusion portion protruding from the rotation plate, the second protrusion portion being fastened to the hole of the first protrusion portion.

14. The vibration apparatus of claim 13, wherein the rotation member further comprises a groove configured at the second protrusion portion.

15. The vibration apparatus of claim 11, wherein the press member has a same planar shape as a planar shape of the vibration generating part.

16. The vibration apparatus of claim 7, wherein the vibration transfer part comprises:
   a base member connected to the vibration generating part; and
   a plurality of vibration transfer members connected to the base member and spaced apart from one another, and
   wherein each of the plurality of vibration transfer members is configured to convert an in-plane vibration mode of the vibration generating part into an out-plane vibration mode.

17. The vibration apparatus of claim 16, wherein each of the plurality of vibration transfer members protrudes from the base member.

18. The vibration apparatus of claim 16, wherein the base member and the plurality of vibration transfer members comprise a metal material or a plastic material.

19. The vibration apparatus of claim 16, wherein each of the plurality of vibration transfer members include a line shape.

20. The vibration apparatus of claim 16, wherein each of the plurality of vibration transfer members includes at least one or more transfer portions.

21. The vibration apparatus of claim 16, wherein the vibration transfer part comprises:
   a first vibration transfer member; and
   a second vibration transfer member surrounded by the first vibration transfer member.

22. The vibration apparatus of claim 21, wherein the first vibration transfer member is connected to a periphery portion of the base member, and the second vibration transfer member is connected to a center portion of the base member.

23. The vibration apparatus of claim 16, wherein each of the first vibration transfer member and the second vibration transfer member includes at least one or more transfer portions.

24. The vibration apparatus of claim 1, wherein the vibration generating part comprises:
   a first cover member;
   a second cover member; and
   a vibration part between the first cover member and the second cover member, the vibration part including a piezoelectric material.

25. The vibration apparatus of claim 24, wherein the vibration generating part further comprises a signal supply member electrically connected to the vibration part, and
   wherein a portion of the signal supply member is accommodated between the first cover member and the second cover member.

26. The vibration apparatus of claim 7, wherein the vibration generating part comprises:
   a first vibration generating part;
   a second vibration generating part stacked on the first vibration generating part; and
   an intermediate adhesive member between the first vibration generating part and the second vibration generating part, and
   wherein one of the first vibration generating part and the second vibration generating part is connected to the vibration transfer part.

27. The vibration apparatus of claim 26, wherein each of the first vibration generating part and the second vibration generating part comprises:
   a first cover member;
   a second cover member; and
   a vibration part between the first cover member and the second cover member, the vibration part including a piezoelectric material.

28. The vibration apparatus of claim 27, wherein each of the first vibration generating part and the second vibration generating part further comprises a signal supply member electrically connected to the vibration part, and
   wherein a portion of the signal supply member is accommodated between the first cover member and the second cover member.

29. A display apparatus, comprising:
   a display member configured to display an image; and
   one or more vibration generating apparatuses configured to vibrate the display member,
   wherein the one or more vibration generating apparatuses comprise the vibration apparatus of claim 1.

30. The display apparatus of claim 29, wherein the one or more vibration generating apparatuses are configured to vibrate the display member according to a driving signal to generate an ultrasonic vibration at a surface of the display member.

31. The display apparatus of claim 30, wherein the driving signal is an amplitude modulation signal of an ultrasonic signal based on a low frequency signal.

32. The display apparatus of claim 31, wherein the low frequency signal has one or more frequencies of 100 Hz to 600 Hz.

33. The display apparatus of claim 29, wherein the display member comprises:
   a display panel including the plurality of pixels configured to display the image; and
   a touch panel connected to the display panel.

34. The display apparatus of claim 29, wherein the display member comprises:
a front member;
a display panel at a rear surface of the front member, the display panel including the plurality of pixels configured to display the image; and
a touch panel between the front member and the display panel.

35. The display apparatus of claim 29, further comprising an acoustic apparatus including one or more sound generating apparatuses configured to vibrate the display member.

36. The display apparatus of claim 35, wherein the one or more sound generating apparatuses comprises:
a vibration generating part; and
a vibration transfer part including a plurality of vibration transfer members and configured to transfer a vibration of the vibration generating part to the display member.

37. A vehicular apparatus, comprising:
a dashboard;
an instrument panel module at the dashboard, the instrument panel module including a first display;
a driver seat;
a passenger seat; and
an infotainment module at one or more of the dashboard, the driver seat, and the passenger seat, the infotainment module including one or more second displays,
wherein one or more of the first display and the one or more second displays comprise:
a display member configured to display an image; and
one or more vibration generating apparatuses configured to vibrate the display member, and
wherein the one or more vibration generating apparatuses comprise the vibration apparatus of claim 1.

38. The vehicular apparatus of claim 37, wherein the one or more vibration generating apparatuses are configured to vibrate the display member according to a driving signal to generate an ultrasonic vibration at a surface of the display member.

39. The vehicular apparatus of claim 38, wherein the driving signal is an amplitude modulation signal of an ultrasonic signal based on a low frequency signal.

40. The vehicular apparatus of claim 37, wherein the display member comprises:
a display panel including the plurality of pixels configured to display the image; and
a touch panel connected to the display panel.

41. The vehicular apparatus of claim 37, wherein the display member comprises:
a front member;
a display panel at a rear surface of the front member, the display panel including the plurality of pixels configured to display the image; and
a touch panel between the front member and the display panel.

42. The vehicular apparatus of claim 37, wherein one or more of the first display and the one or more second display further comprising an acoustic apparatus including one or more sound generating apparatuses configured to vibrate the display member.

43. The vehicular apparatus of claim 42, wherein the one or more sound generating apparatuses comprises:
a vibration generating part; and
a vibration transfer part including a plurality of vibration transfer members and configured to transfer a vibration of the vibration generating part to the display member.

* * * * *